(12) United States Patent
Lee et al.

(10) Patent No.: US 11,810,332 B2
(45) Date of Patent: *Nov. 7, 2023

(54) APPARATUS AND METHOD FOR PERFORMING ARTIFICIAL INTELLIGENCE (AI) ENCODING AND AI DECODING ON IMAGE

(71) Applicant: SAMSUNG ELECTRONICS CO., LTD., Suwon-si (KR)

(72) Inventors: Jongseok Lee, Suwon-si (KR); Jaehwan Kim, Suwon-si (KR); Youngo Park, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 120 days.

This patent is subject to a terminal disclaimer.

(21) Appl. No.: 17/495,050

(22) Filed: Oct. 6, 2021

(65) Prior Publication Data

US 2022/0028121 A1 Jan. 27, 2022

Related U.S. Application Data

(63) Continuation of application No. 17/180,358, filed on Feb. 19, 2021, now Pat. No. 11,164,340, which is a
(Continued)

(30) Foreign Application Priority Data

Oct. 28, 2019 (KR) .......................... 10-2019-0134514

(51) Int. Cl.
*G06T 9/00* (2006.01)
*G06N 3/08* (2023.01)
(Continued)

(52) U.S. Cl.
CPC ............. *G06T 9/002* (2013.01); *G06N 3/082* (2013.01); *G06T 3/4046* (2013.01)

(58) Field of Classification Search
CPC ........ G06T 9/002; G06T 3/4046; G06N 3/082
See application file for complete search history.

(56) References Cited

U.S. PATENT DOCUMENTS

2012/0275718 A1 11/2012 Takamori et al.
2015/0256828 A1 9/2015 Dong et al.
(Continued)

FOREIGN PATENT DOCUMENTS

CN 110300301 A 10/2019
KR 10-1885855 B1 8/2018
(Continued)

OTHER PUBLICATIONS

Communication dated Aug. 26, 2022, issued by European Patent Office in EP 20882383.1.
(Continued)

*Primary Examiner* — Mark Roz
(74) *Attorney, Agent, or Firm* — Sughrue Mion, PLLC

(57) ABSTRACT

An artificial intelligence (AI) decoding method including obtaining image data generated from performing first encoding on a first image and AI data related to AI down-scaling of at least one original image related to the first image; obtaining a second image corresponding to the first image by performing first decoding on the image data; obtaining, based on the AI data, deep neural network (DNN) setting information for performing AI up-scaling of the second image; and generating a third image by performing the AI up-scaling on the second image via an up-scaling DNN operating according to the obtained DNN setting information. The DNN setting information is DNN information updated for performing the AI up-scaling of at least one
(Continued)

second image via joint training of the up-scaling DNN and a down-scaling DNN used for the AI down-scaling.

16 Claims, 29 Drawing Sheets

Related U.S. Application Data continuation of application No. 17/082,442, filed on Oct. 28, 2020, now Pat. No. 11,610,341.

(51) Int. Cl.
*G06T 3/40* (2006.01)
*G06N 3/082* (2023.01)

(56) References Cited

U.S. PATENT DOCUMENTS

| | | |
|---|---|---|
| 2020/0053408 A1 | 2/2020 | Park et al. |
| 2020/0126262 A1 | 4/2020 | Kim et al. |
| 2020/0151914 A1 | 5/2020 | Dinh et al. |
| 2020/0162751 A1 | 5/2020 | Kim et al. |
| 2020/0389658 A1 | 12/2020 | Kim et al. |

FOREIGN PATENT DOCUMENTS

| | | |
|---|---|---|
| KR | 10-2022648 B1 | 9/2019 |
| WO | 2019009490 A1 | 1/2019 |
| WO | 2019087905 A1 | 5/2019 |
| WO | 2020/080623 A1 | 4/2020 |
| WO | 2020080765 A1 | 4/2020 |

OTHER PUBLICATIONS

Communication dated Jul. 26, 2021 by the Korean Intellectual Property Office in counterpart Korean Patent Application No. 10-2019-0134514.

Communication dated Apr. 27, 2021 issued by the Korean Intellectual Property Office in counterpart Korean Patent Application No. 10-2019-0134514.

International Search Report (PCT/ISA/210) and Written Opinion (PCT/ISA/237) dated May 17, 2021 by the International Searching Authority in counterpart International Patent Application No. PCT/KR2020/014830. (PCTISA/220/210/237).

Kim, Jaehwan et al., "Dynamic Frame Resizing with Convolutional Neural Network for Efficient Video Compression", Proceedings of the SPIE, vol. 10396, Sep. 19, 2017. (15 pages total).

Woojin Jeong et al., "Efficient Super-Resolution Method for Single Image based on Deep Neural Networks", Journal of the Institute of Electronics and Information Engineers, Jun. 2018, vol. 55, No. 6, pp. 89-96. (10 pages total).

FIG. 5

| IMAGE-RELATED INFORMATION | DNN SETTING INFORMATION |
|---|---|
| SD, 10Mbps, AV1 | A DNN SETTING INFORMATION |
| HD, 15Mbps, H.264 | B DNN SETTING INFORMATION |
| Full HD, 20Mbps, HEVC | C DNN SETTING INFORMATION |
| Full HD, 15Mbps, HEVC | D DNN SETTING INFORMATION |

FIG. 19A

WEIGHT DIFFERENCE MATRICES AND BIAS DIFFERENCE MATRICES — 1950, 1960

1960:
| 0.031 | 0.023 | ... | 0.003 | −0.017 |

1950:
| −0.044 | −0.045 | −0.023 | −0.035 | 0.037 | −0.040 | 0.007 | −0.004 | −0.014 | −0.038 | −0.019 | 0.288 |
| −0.041 | 0.019 | −0.013 | −0.005 | 0.044 | 0.019 | 0.011 | 0.048 | 0.045 | −0.017 | −0.012 | −0.032 |
| 0.023 | −0.002 | −0.010 | −0.021 | 0.049 | −0.037 | 0.047 | 0.044 | 0.022 | −0.049 | 0.013 | 0.050 |

OPTIMAL WEIGHT/BIAS MATRICES — 1930, 1940

1940:
| 6.832 | 0.355 | ... | −1.826 | 2.906 |

1930:
| 0.108 | 0.061 | −0.020 | 0.281 | 0.295 | 0.157 | 0.053 | 0.273 | 0.002 | 0.043 | 0.000 | −0.122 |
| −0.142 | 0.239 | 0.064 | 0.281 | 0.337 | 0.407 | 0.232 | −0.275 | −0.115 | 0.033 | −0.109 | 0.161 |
| −0.004 | −0.281 | 0.061 | 0.295 | 0.484 | 0.246 | −0.044 | −0.122 | −0.005 | 0.056 | −0.013 | −0.017 |

DEFAULT WEIGHT/BIAS MATRICES — 1910, 1920

OPTIMAL WEIGHT/BIAS MATRICES — 1970

| 0.064 | 0.016 | -0.043 | | 0.246 | 0.332 | 0.117 | | | 0.060 | 0.269 | -0.012 | | 0.005 | -0.019 | 0.166 |
|---|---|---|---|---|---|---|---|---|---|---|---|---|---|---|---|
| -0.183 | 0.258 | 0.051 | | 0.276 | 0.381 | 0.426 | | ... | 0.243 | -0.227 | -0.070 | | 0.016 | -0.121 | 0.129 |
| 0.019 | -0.283 | 0.051 | | 0.274 | 0.533 | 0.209 | | | 0.003 | -0.078 | 0.017 | | 0.007 | 0.000 | 0.033 |

1975: | 6.863 | | 0.378 | ... | -1.823 | | 2.889 |

WEIGHT MATRICES GENERATED VIA PRUNING — 1980

| 0.064 | 0.000 | -0.043 | | 0.246 | 0.332 | 0.117 | | | 0.060 | 0.269 | 0.000 | | 0.000 | 0.000 | 0.166 |
|---|---|---|---|---|---|---|---|---|---|---|---|---|---|---|---|
| -0.183 | 0.258 | 0.051 | | 0.276 | 0.381 | 0.426 | | ... | 0.243 | -0.227 | -0.070 | | 0.000 | -0.121 | 0.129 |
| 0.000 | -0.283 | 0.051 | | 0.274 | 0.533 | 0.209 | | | 0.000 | -0.078 | 0.000 | | 0.000 | 0.000 | 0.033 |

WEIGHT/BIAS MATRICES GENERATED VIA QUANTIZATION — 1990

| 8 | 0 | -6 | | 31 | 42 | 15 | | | 8 | 34 | 0 | | 0 | 0 | 21 |
|---|---|---|---|---|---|---|---|---|---|---|---|---|---|---|---|
| -23 | 33 | 7 | | 35 | 49 | 55 | | ... | 31 | -29 | -9 | | 0 | -15 | 17 |
| 0 | -36 | 7 | | 35 | 68 | 27 | | | 0 | -10 | 0 | | 0 | 0 | 4 |

1995: | 7.000 | | 0.000 | ... | -2.000 | | 3.000 |

APPARATUS AND METHOD FOR PERFORMING ARTIFICIAL INTELLIGENCE (AI) ENCODING AND AI DECODING ON IMAGE

CROSS-REFERENCE TO RELATED APPLICATION

This application is a Continuation of U.S. application Ser. No. 17/180,358, filed on Feb. 19, 2021, which is a Continuation of U.S. application Ser. No. 17/082,442 filed on Oct. 28, 2020, in the U.S. Patent and Trademark Office, which claims priority under 35 U.S.C. § 119 to Korean Patent Application No. 10-2019-0134514, filed on Oct. 28, 2019, in the Korean Intellectual Property Office, the disclosures of which are herein incorporated by reference in their entireties.

BACKGROUND

1. Field

The disclosure relates to the field of image processing and, more particularly, to methods and apparatuses for encoding and decoding an image, based on artificial intelligence (AI).

2. Description of Related Art

An image is encoded using a codec conforming to a predefined data compression standard such as a Moving Picture Expert Group (MPEG) standard, and then is stored in a recording medium or transmitted through a communication channel in the form of a bitstream.

With the development and dissemination of hardware capable of reproducing and storing high-resolution/high-definition images, there is an increasing need for a codec capable of effectively encoding and decoding high-resolution/high-definition images.

SUMMARY

According to embodiments of the disclosure, there are provided methods and apparatuses for performing artificial intelligence (AI) encoding and AI decoding on an image, whereby a low bitrate may be achieved by encoding and decoding the image based on AI.

Also, according to embodiments of the disclosure, there are provided a method and apparatus for performing AI encoding and AI decoding on an image, whereby image quality may be improved by performing up-scaling after updating, periodically or whenever necessary, up-scaling DNN setting information optimized for an original image.

Also, according to embodiments of the disclosure, there are provided a method and apparatus for performing AI encoding and AI decoding on an image, whereby the amount of information to be encoded/decoded may be effectively reduced by effectively signaling DNN setting information for updating DNN setting information of an up-scaling DNN, optimized for an original image, periodically or whenever necessary.

Additional aspects will be set forth in part in the description which follows and, in part, will be apparent from the description, or may be learned by practice of the presented embodiments of the disclosure.

According to an embodiment of the disclosure, an AI decoding apparatus includes: a memory storing one or more instructions; and a processor configured to execute the one or more instructions stored in the memory to: obtain image data generated from performing first encoding on a first image and AI data related to AI down-scaling of at least one original image related to the first image; obtain a second image corresponding to the first image by performing first decoding on the image data; obtain, based on the AI data, DNN setting information for performing AI up-scaling of the second image; and generate a third image by performing the AI up-scaling on the second image via an up-scaling DNN operating according to the obtained DNN setting information, wherein the DNN setting information is DNN information updated for performing the AI up-scaling of at least one second image corresponding to the at least one original image via joint training of the up-scaling DNN and a down-scaling DNN used for the AI down-scaling of the at least one original image, the joint training being performed using the at least one original image.

The obtained DNN setting information may include weights and biases of filter kernels in at least one convolution layer of the up-scaling DNN.

The processor may be further configured to generate a first training image via the down-scaling DNN by using the at least one original image, generate a second training image via the up-scaling DNN by using the first training image, and update the up-scaling DNN and the down-scaling DNN based on first loss information and third loss information, the first loss information and the third loss information corresponding to a result of comparing the second training image with an original image that has not undergone the AI down-scaling among the at least one original image, and second loss information generated based on the first training image.

The first loss information may be generated based on a result of comparing a quality parameter of the second training image with a quality parameter of the at least one original image.

The third loss information may be generated based on a result of comparing a feature-related parameter of the second training image with a feature-related parameter of the at least one original image.

The second loss information may be related to a spatial complexity of the first training image.

The processor may be further configured to generate a first training image via the down-scaling DNN by using the at least one original image, perform first encoding on the first training image, generate a second training image via the up-scaling DNN by using the first training image that has undergone the first encoding, and update the up-scaling DNN based on first loss information and third loss information, the first loss information and the third loss information corresponding to a result of comparing the second training image with an original image that has not undergone the AI down-scaling among the at least one original image.

The updated DNN setting information of the up-scaling DNN may include weight residual information/bias residual information indicating a difference between a weight/a bias of all or some of filter kernels in all or some of convolution layers in the up-scaling DNN before the weight/the bias are updated and a weight/a bias of the all or some of the filter kernels in the all or some of the convolution layers in the up-scaling DNN after the weight/the bias are updated.

The updated DNN setting information of the up-scaling DNN may include information about a weight residual/a bias residual obtained by performing frequency transformation, the information about the weight residual/the bias residual indicating a difference between a weight/a bias of all or some of filter kernels in all or some of convolution layers in the up-scaling DNN before the weight/the bias are updated and a weight/a bias of the all or some of the filter kernels in the all or some of the convolution layers in the up-scaling DNN after the weight/the bias are updated.

The weight residual information/bias residual information may be information encoded using one of differential pulse code modulation (DPCM), run-length coding (RLC), and Huffman coding techniques.

The weight residual information/bias residual information may be information about a weight residual/a bias residual generated via model compression.

The model compression may include at least one of pruning or quantization.

The updated DNN setting information of the up-scaling DNN may be information updated for performing the AI up-scaling obtained by entropy-encoding a weight/a bias of all or some of filter kernels in all or some of convolution layers in the up-scaling DNN after the weight/the bias are updated, based on context model information regarding a weight/a bias of the all or some of the filter kernels in the all or some of the convolution layers in the up-scaling DNN before the weight/the bias are updated.

The DNN setting information may include flag information indicating whether to perform the AI up-scaling by using a filter kernel of a convolution layer in a predetermined DNN or whether to perform the AI up-scaling by using a filter kernel of a convolution layer in a DNN updated for performing the AI up-scaling of the at least one second image corresponding to the at least one original image via joint training of the up-scaling DNN and the down-scaling DNN used for the AI down-scaling of the at least one original image, the joint training being performed using the at least one original image.

According to another embodiment of the disclosure, an AI encoding apparatus includes: a memory storing one or more instructions; and a processor configured to execute the one or more instructions stored in the memory to: obtain a first image by performing AI down-scaling on at least one original image via a down-scaling DNN; generate AI encoding data comprising the image data and AI data including information related to the AI down-scaling and DNN setting information of an up-scaling DNN for performing AI up-scaling on a second image, wherein the second image is generated by performing first decoding on the image data, and the second image is generated by performing first decoding on the image data, and wherein the DNN setting information is DNN information updated for performing the AI up-scaling of at least one second image corresponding to the at least one original image via joint training of the up-scaling DNN and the down-scaling DNN used for the AI down-scaling of the at least one original image, the joint training being performed using the at least one original image.

According to another embodiment of the disclosure, an AI decoding method includes: obtaining image data generated from performing first encoding on a first image and AI data related to AI down-scaling of at least one original image related to the first image; obtaining a second image corresponding to the first image by performing first decoding on the image data; obtaining, based on the AI data, DNN setting information for performing AI up-scaling of the second image; and generating a third image by performing the AI up-scaling on the second image via an up-scaling DNN operating according to the obtained DNN setting information, wherein the DNN setting information is DNN information updated for performing the AI up-scaling of at least one second image corresponding to the at least one original image via joint training of the up-scaling DNN and a down-scaling DNN used for the AI down-scaling of the at least one original image, the joint training being performed using the at least one original image.

According to another embodiment of the disclosure, an AI encoding method includes: obtaining a first image by performing AI down-scaling on at least one original image via a down-scaling DNN; generating image data by performing first encoding on the first image; and generating AI encoding data comprising the image data and AI data including information related to the AI down-scaling and DNN setting information of an up-scaling DNN for performing AI up-scaling on a second image, wherein the second image is generated by performing first decoding on the image data, and wherein the DNN setting information is DNN information updated for performing the AI up-scaling of at least one second image corresponding to the at least one original image via joint training of the up-scaling DNN and the down-scaling DNN used for the AI down-scaling of the at least one original image, the joint training being performed using the at least one original image.

According to another embodiment of the disclosure, a computer-readable recording medium has recorded thereon a program for executing the above-described AI decoding method and AI encoding method.

BRIEF DESCRIPTION OF THE DRAWINGS

The above and other aspects, features, and advantages of certain embodiments of the disclosure will be more apparent from the following description taken in conjunction with the accompanying drawings, in which:

FIG. 5 is a table showing a mapping relationship between image-related information and DNN setting information;

FIG. 19A illustrates examples of default weights and biases, weights and biases in an up-scaling DNN, which are optimized for an original image, and weight differences and bias differences in the up-scaling DNN, according to an embodiment of the disclosure;

FIG. 19B illustrates examples of weights and biases of an up-scaling DNN, which are optimized for an original image, and weights and biases in the up-scaling DNN, which are determined via quantization and pruning, according to an embodiment of the disclosure;

DETAILED DESCRIPTION

Figure 1:
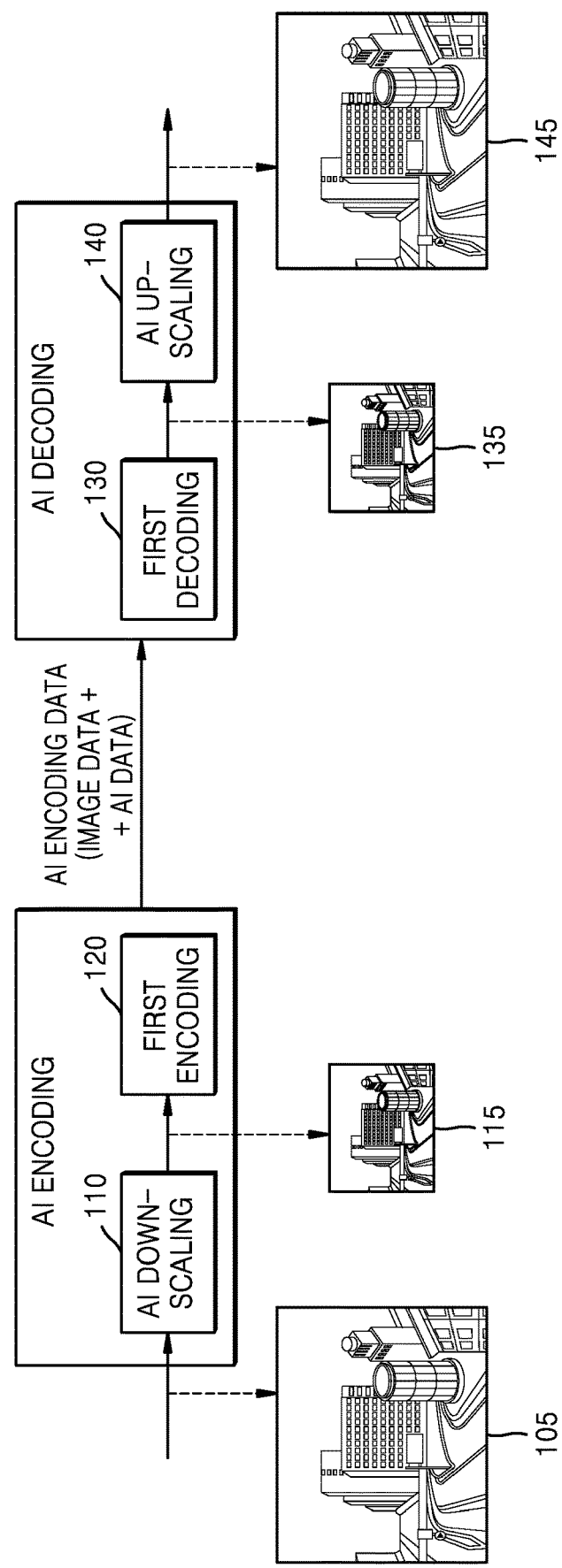
FIG. 1 is a diagram for describing an artificial intelligence (AI) encoding process and an AI decoding process, according to an embodiment.

As the disclosure allows for various changes and numerous examples, particular embodiments will be illustrated in the drawings and described in detail in the written description. However, this is not intended to limit the disclosure to particular modes of practice, and it will be understood that all changes, equivalents, and substitutes that do not depart from the spirit and technical scope of the disclosure are encompassed in the disclosure.

In the description of the embodiments, certain detailed explanations of related art are omitted when such explanations might unnecessarily obscure the essence of the disclosure. Also, numbers (for example, a first, a second, and the like) used in the description of the specification are merely identifying labels for distinguishing one element from another.

Throughout the disclosure, the expression "at least one of a, b or c" includes only a, only b, only c, both a and b, both a and c, both b and c, all of a, b, and c, or variations thereof.

Also, in the disclosure, it will be understood that when elements are "connected" or "coupled" to each other, the elements may be directly connected or coupled to each other, but may alternatively be connected or coupled to each other with an intervening element therebetween, unless specified otherwise.

In the disclosure, regarding an element represented as a "unit" or a "module," two or more elements may be combined into one element or one element may be divided into two or more elements according to subdivided functions. In addition, each element described hereinafter may additionally perform some or all of functions performed by another element, in addition to main functions of itself, and some of the main functions of each element may be performed entirely by another component.

Also, in the disclosure, an 'image' or a 'picture' may denote a still image, a moving image including a plurality of consecutive still images (or frames), or a video.

Also, in the disclosure, a deep neural network (DNN) is a representative example of an artificial neural network model simulating brain nerves, and is not limited to an artificial neural network model using a specific algorithm.

Also, in the disclosure, a 'parameter' is a value used in an operation process of each layer forming a neural network, and for example, may include a weight used when an input value is applied to a certain operation expression. Here, the parameter may be expressed in a matrix form. The parameter is a value set as a result of training or iteration of the neural network, and may be updated through separate training data when necessary.

Also, in the disclosure, a 'first DNN' indicates a DNN used for artificial intelligence (AI) down-scaling an image, and a 'second DNN' indicates a DNN used for AI up-scaling an image.

Also, in the disclosure, 'DNN setting information' includes information related to an element constituting a DNN. 'DNN setting information' includes the parameter described above as information related to the element constituting the DNN. The first DNN or the second DNN may be set by using the DNN setting information.

Also, in the disclosure, an 'original image' denotes an image that is an object of AI encoding, and a 'first image' denotes an image obtained as a result of performing AI down-scaling on the original image during an AI encoding process. Also, a 'second image' denotes an image obtained via first decoding during an AI decoding process, and a 'third image' denotes an image obtained by AI up-scaling the second image during the AI decoding process.

Also, in the disclosure, 'AI down-scale' (or downscaling) denotes a process of decreasing a resolution of an image based on AI, and 'first encoding' denotes an encoding process according to an image compression method based on frequency transformation. Also, 'first decoding' denotes a decoding process according to an image reconstruction method based on frequency transformation, and 'AI up-scale' (or upscaling) denotes a process of increasing a resolution of an image based on AI.

FIG. 1 is a diagram for describing an AI encoding process and an AI decoding process, according to an embodiment.

When resolution of an image remarkably increases, the throughput of information for encoding and decoding the image is increased. Accordingly, a method for improving the efficiency of encoding and decoding of an image is required.

As shown in FIG. 1, according to an embodiment of the disclosure, a first image 115 is obtained by performing AI down-scaling 110 on an original image 105 having high resolution. Then, first encoding 120 and first decoding 130 are performed on the first image 115 having relatively low resolution, and thus a bitrate may be significantly reduced compared to simply performing the first encoding and the first decoding on the high resolution original image 105.

In particular, in FIG. 1, the first image 115 is obtained by performing the AI down-scaling 110 on the original image 105 and the first encoding 120 is performed by an encoding apparatus, transmitting source, or the like on the first image 115 during the AI encoding process, according to an embodiment. During the AI decoding process, AI encoding data including AI data and image data, which are obtained as a result of AI encoding is received, a second image 135 is obtained via the first decoding 130, and a third image 145 is obtained by a decoding apparatus, receiving device, or the like performing AI up-scaling 140 on the second image 135.

Referring to the AI encoding process in detail, when the original image 105 is received, the AI down-scaling 110 is performed on the original image 105 to obtain the first image 115 of certain resolution or certain quality. Here, the AI down-scaling 110 is performed based on AI, and the AI model for performing the AI down-scaling 110 needs to be trained jointly with the AI model for performing the AI up-scaling 140 of the second image 135. This is because, when the AI model for the AI down-scaling 110 and the AI model for the AI up-scaling 140 are separately trained, there may exist distortion due to a difference between the original image 105 subjected to AI encoding and the third image 145 reconstructed through AI decoding.

In an embodiment of the disclosure, the AI data may be signaling used to maintain such a joint relationship during the AI encoding process and the AI decoding process. Accordingly, the AI data obtained through the AI encoding process may include information indicating an up-scaling target, and during the AI decoding process, the AI up-scaling 140 is performed on the second image 135 according to the up-scaling target verified based on the AI data.

The AI model for the AI down-scaling 110 and the AI model for the AI up-scaling 140 may be embodied as a DNN. As will be described later with reference to FIG. 9, because a first DNN and a second DNN are jointly trained by sharing loss information under a certain target, an AI encoding apparatus may provide target information used during joint training of the first DNN and the second DNN to an AI decoding apparatus, and the AI decoding apparatus may perform the AI up-scaling 140 on the second image 135 to target resolution based on the provided target information.

Regarding the first encoding 120 and the first decoding 130 of FIG. 1, an information amount of the first image 115 obtained by performing AI down-scaling 110 on the original image 105 may be reduced through the first encoding 120. The first encoding 120 may include: a process of generating prediction data by predicting the first image 115, a process of generating residual data corresponding to a difference between the first image 115 and the prediction data, a process of transforming the residual data of a spatial domain component to a frequency domain component, a process of quantizing the residual data transformed to the frequency domain component, and a process of entropy-encoding the quantized residual data. Such first encoding 120 may be performed via one of image compression methods using frequency transformation, such as MPEG-2, H.264 Advanced Video Coding (AVC), MPEG-4, H.265/High Efficiency Video Coding (HEVC), VC-1, VP8, VP9, and AOMedia Video 1 (AV1).

The second image 135 corresponding to the first image 115 may be reconstructed by performing the first decoding 130 on the image data. The first decoding 130 may include: a process of generating the quantized residual data by entropy-decoding the image data, a process of inverse-quantizing the quantized residual data, a process of transforming the residual data of the frequency domain component to the spatial domain component, a process of generating the prediction data, and a process of reconstructing the second image 135 by using the prediction data and the residual data. Such first decoding 130 may be performed via a corresponding image reconstruction method corresponding to one of image compression methods using frequency transformation, such as MPEG-2, H.264 AVC, MPEG-4, H.265/HEVC, VC-1, VP8, VP9, and AV1, which is used in the first encoding 120.

The AI encoding data obtained through the AI encoding process may include the image data obtained as a result of performing the first encoding 120 on the first image 115, and the AI data related to the AI down-scaling 110 of the original image 105. The image data may be used during the first decoding 130 and the AI data may be used during the AI up-scaling 140.

The image data may be transmitted in a form of a bitstream. The image data may include data obtained based on pixel values in the first image 115, for example, residual data that is a difference between the first image 115 and prediction data of the first image 115. Also, the image data includes information used during the first encoding 120 performed on the first image 115. For example, the image data may include prediction mode information, motion information, and information related to a quantization parameter used during the first encoding 120. The image data may be generated according to a rule, for example, according to a syntax, of an image compression method used during the first encoding 120, among MPEG-2, H.264 AVC, MPEG-4, H.265/HEVC, VC-1, VP8, VP9, and AV1.

The AI data is used in the AI up-scaling 140 based on the second DNN. As described above, because the first DNN and the second DNN are jointly trained, the AI data includes information enabling the AI up-scaling 140 to be consistently performed on the second image 135 through the second DNN. During the AI decoding process, the AI up-scaling 140 may be performed on the second image 135 to have targeted resolution and/or quality, based on the AI data.

The AI data may be transmitted together with the image data in a form of a bitstream. Alternatively, according to an embodiment, the AI data may be transmitted separately from the image data, in a form of a frame or a packet. The AI data and the image data obtained as a result of the AI encoding may be transmitted through the same network or through different networks.

Figure 2:
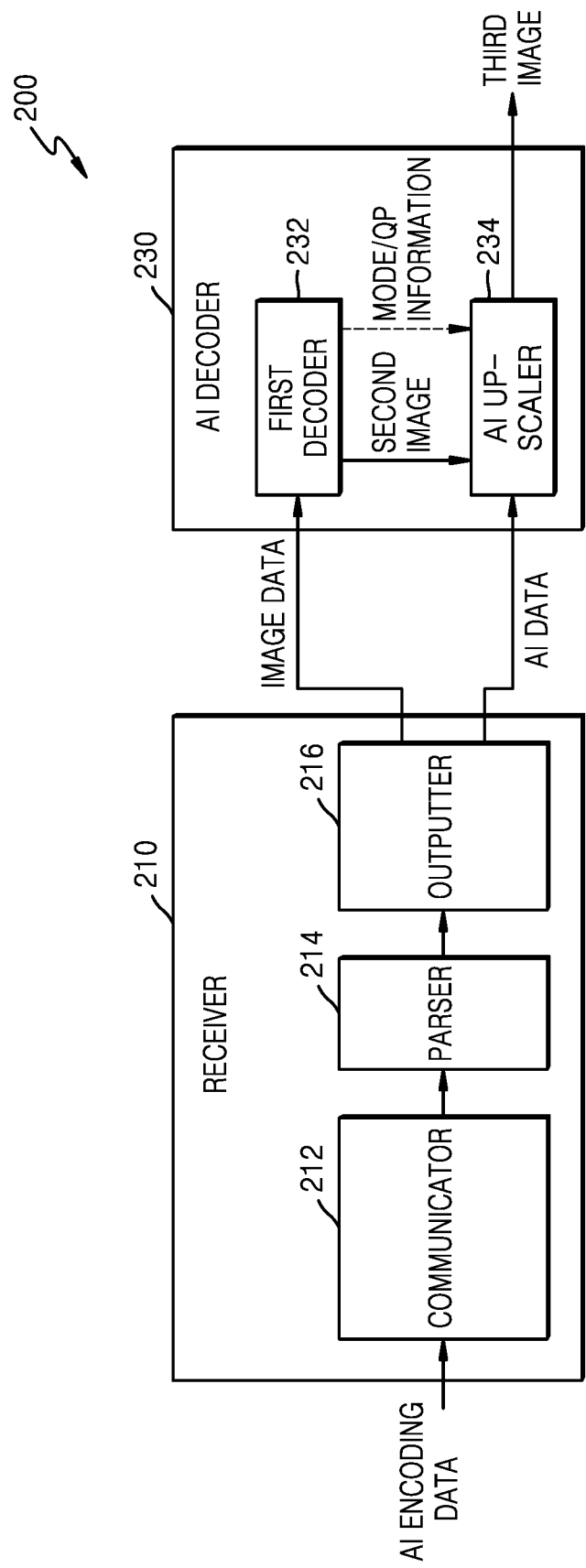
FIG. 2 is a block diagram of an AI decoding apparatus according to an embodiment.

FIG. 2 is a block diagram of an AI decoding apparatus according to an embodiment.

Referring to FIG. 2, the AI decoding apparatus 200 according to an embodiment may include a receiver 210 and an AI decoder 230. The receiver 210 may include a communicator 212, a parser 214, and an outputter 216. The AI decoder 230 may include a first decoder 232 and an AI up-scaler 234.

The receiver 210 receives and parses AI encoding data obtained as a result of AI encoding, and outputs image data and AI data to the AI decoder 230.

In particular, the communicator 212 receives the AI encoding data obtained as the result of AI encoding through a wireless network. The AI encoding data obtained as the result of performing AI encoding includes the image data and the AI data. The image data and the AI data may be received through a same type of network or different types of networks.

The parser 214 receives the AI encoding data received through the communicator 212 and parses the AI encoding data to segment the image data from the AI data. For example, the parser 214 may distinguish the image data and the AI data by reading a header of data obtained from the communicator 212 that describes the payload including the image data and the AI data or a configuration of the AI data. According to an embodiment, the parser 214 transmits the image data and the AI data to the outputter 216 via the header of the data received through the communicator 212, and the outputter 216 transmits the image data and AI data respectively to the first decoder 232 and the AI up-scaler 234. At this time, the image data included in the AI encoding data may be verified to be image data generated via a certain codec (for example, MPEG-2, H.264 AVC, MPEG-4, HEVC, VC-1, VP8, VP9, or AV1). In this case, corresponding information may be transmitted to the first decoder 232 through the outputter 216 such that the image data is processed via the appropriate codec.

According to an embodiment, the AI encoding data parsed by the parser 214 may be obtained from a data storage medium including a magnetic medium such as a hard disk, a floppy disk, or a magnetic tape, an optical recording medium such as CD-ROM or DVD, or a magneto-optical medium such as a floptical disk.

The first decoder 232 reconstructs the second image 135 corresponding to the first image 115, based on the image data. The second image 135 obtained by the first decoder 232 is provided to the AI up-scaler 234. According to an embodiment, first decoding related information, such as prediction mode information, motion information, quantization parameter information, or the like included in the image data may be further provided to the AI up-scaler 234.

Upon receiving the AI data, the AI up-scaler 234 performs AI up-scaling on the second image 135, based on the AI data. According to an embodiment, the AI up-scaling may be performed by further using the first decoding related information, such as the prediction mode information, the quantization parameter information, or the like included in the image data.

The receiver 210 and the AI decoder 230 according to an embodiment are described as individual components or devices, but may be jointly implemented through one processor for controlling the joint functionality of the receiver 210 and the decoder 230. In this case, the receiver 210 and the AI decoder 230 may be implemented through a dedicated processor or through a combination of software and a general-purpose processor such as application processor (AP), central processor (CPU) or graphic processor (GPU). The dedicated processor may be implemented by including a memory for implementing an embodiment of the disclosure or by including a memory processor for using an external memory. The communicator 212 may include a communication interface, such as a wireless communication interface including a radio and/or an antenna or a wired communication interface such as HDMI, Ethernet, and the like, for receiving the AI encoding data over a network or from a data storage medium including a magnetic medium such as a hard disk, a floppy disk, or a magnetic tape, an optical recording medium such as CD-ROM or DVD, or a magneto-optical medium such as a floptical disk. Alternatively, the communicator 212 may include a portion or component of a dedicated processor or through a combination of software and a general-purpose processor such as application processor (AP), central processor (CPU) or graphic processor (GPU) for receiving the AI encoding data.

Also, the receiver 210 and the AI decoder 230 may be configured by a plurality of processors. In this case, the receiver 210 and the AI decoder 230 may be implemented through a combination of dedicated processors or through a combination of software and general-purpose processors such as AP, CPU or GPU. Similarly, the AI up-scaler 234 and the first decoder 232 may be implemented by different processors.

The AI data provided to the AI up-scaler 234 includes information enabling the second image 135 to be processed via AI up-scaling. Here, an up-scaling target or ratio should correspond to down-scaling target or ratio of a first DNN. Accordingly, the AI data includes information for verifying a down-scaling target of the first DNN.

Examples of the information included in the AI data include difference information between resolution of the original image 105 and resolution of the first image 115, and information related to the first image 115.

The difference information may be expressed as information about a resolution conversion degree of the first image 115 compared to the original image 105 (for example, resolution conversion rate information). Also, because the resolution of the first image 115 is verified through the resolution of the reconstructed second image 135 and the resolution conversion degree is verified accordingly, the difference information may be expressed only as resolution information of the original image 105. Here, the resolution information may be expressed as vertical/horizontal sizes or as a ratio (16:9, 4:3, or the like) and a size of one axis. Also, when there is pre-set resolution information, the resolution information may be expressed in a form of an index or flag through one or more signaled bits.

The information related to the first image 115 may include information about at least one of a bitrate of the image data obtained as the result of performing first encoding on the first image 115 or a codec type used during the first encoding of the first image 115.

The AI up-scaler 234 may determine the up-scaling target of the second image 135, based on at least one of the difference information or the information related to the first image 115, which is included in the AI data. The up-scaling target may indicate, for example, to what degree resolution is to be up-scaled for the second image 135. When the up-scaling target is determined, the AI up-scaler 234 performs AI up-scaling on the second image 135 through a second DNN to obtain the third image 145 corresponding to the up-scaling target.

Before describing a method, performed by the AI up-scaler 234, of performing AI up-scaling on the second image 135 according to the up-scaling target, an AI up-scaling process through the second DNN will be described with reference to FIGS. 3 and 4.

Figure 3:
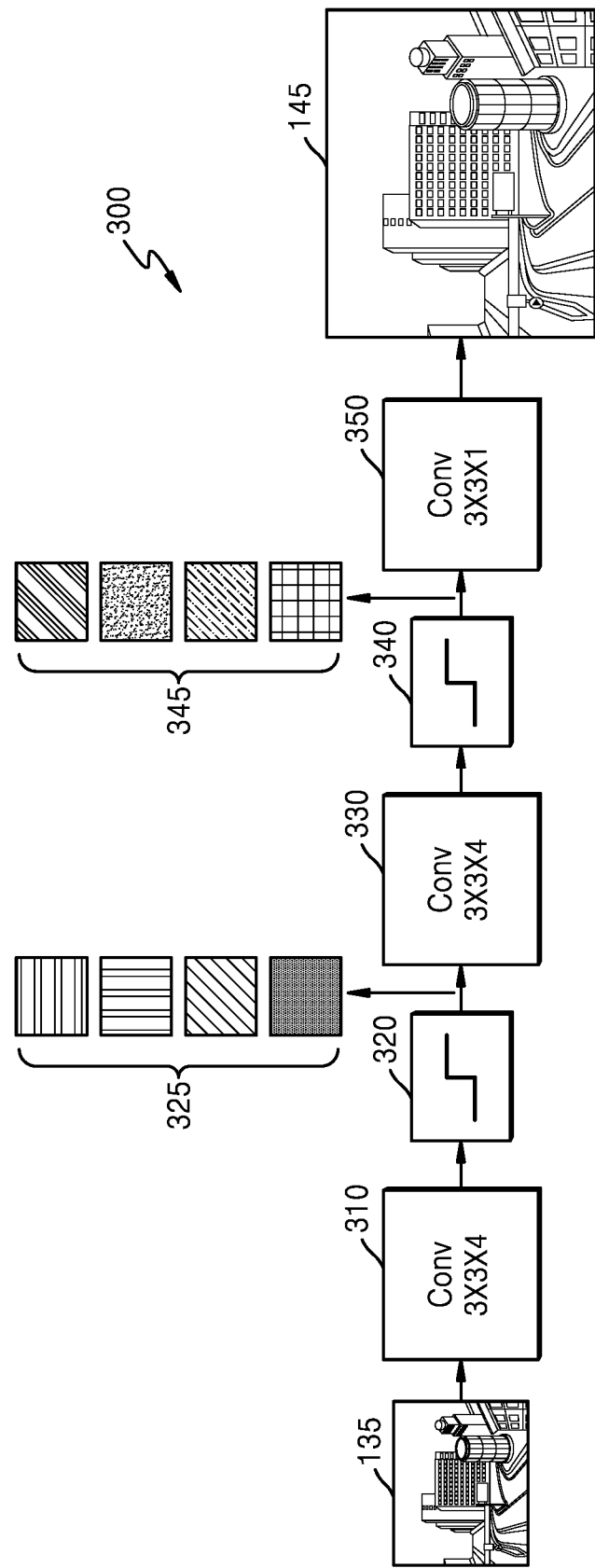
FIG. 3 is a diagram showing a deep neural network (DNN) for performing AI up-scaling on an image.
Figure 4:
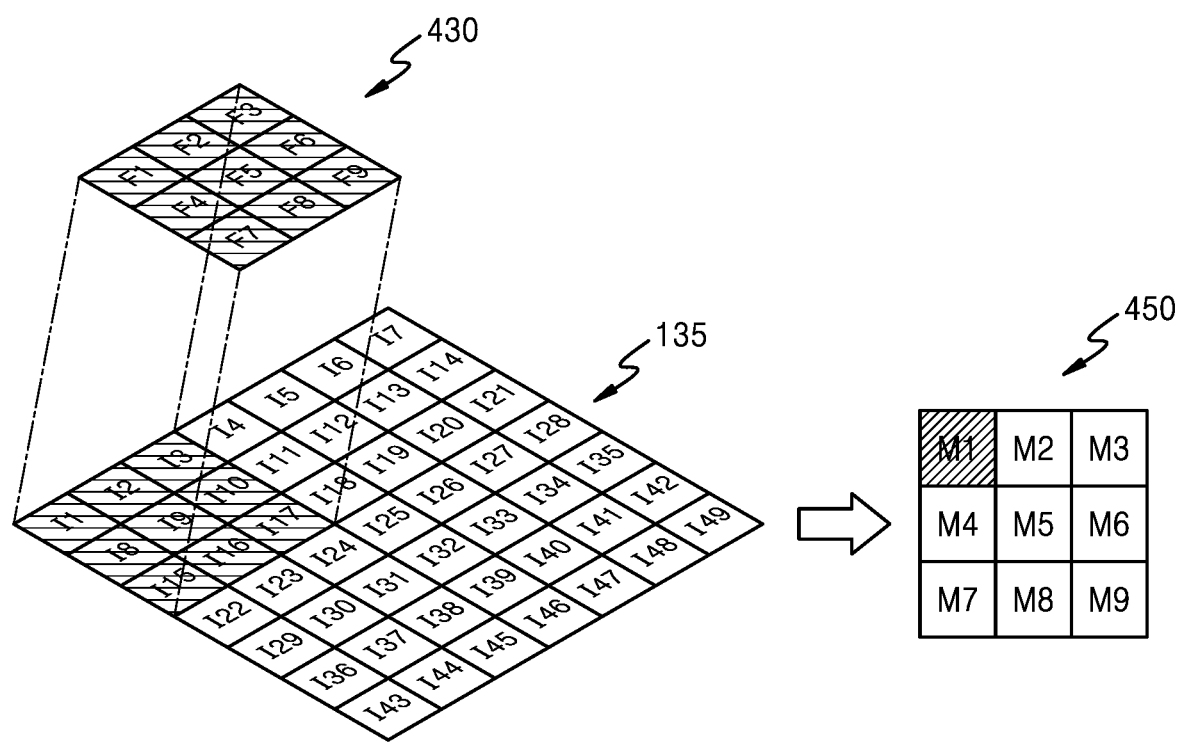
FIG. 4 is a diagram for describing a convolution operation by a convolution layer.

FIG. 3 is a diagram showing a DNN 300 for performing AI up-scaling on the second image 135, and FIG. 4 is a diagram for describing a convolution operation in a first convolution layer 310 of FIG. 3.

As shown in FIG. 3, the second image 135 is input to the first convolution layer 310. The label 3X3X4 indicated in the first convolution layer 310 shown in FIG. 3 indicates that a convolution process is performed on one input image by using four filter kernels having a size of 3×3. Four feature maps are generated by the four filter kernels as a result of the convolution process. Each feature map indicates inherent characteristics of the second image 135. For example, each feature map may represent a vertical direction characteristic, a horizontal direction characteristic, or an edge characteristic, etc. of the second image 135.

A convolution operation in the first convolution layer 310 will be described in detail with reference to FIG. 4.

One feature map 450 may be generated through multiplication and addition between parameters of a filter kernel 430 having a size of 3×3 used in the first convolution layer 310 and corresponding pixel values in the second image 135. Because four filter kernels are used in the first convolution layer 310, four feature maps may be generated through the convolution operation using the four filter kernels.

In the second image 135 in FIG. 4, I1 through I49 indicate pixels in the second image 135, and F1 through F9 indicated in the filter kernel 430 indicate parameters of the filter kernel 430. Also, M1 through M9 indicated in the feature map 450 indicate samples of the feature map 450.

In FIG. 4, the second image 135 includes 49 pixels, but the number of pixels is only a simplified example and when the second image 135 has a resolution of 4 K, the second image 135 may include, for example, 3840×2160 pixels.

During a convolution operation process, pixel values of I1, I2, I3, I8, I9, I10, I15, I16, and I17 of the second image 135 and F1 through F9 of the filter kernels 430 are respectively multiplied, and a value of the combination (for example, addition) of result values of the multiplication may be assigned as a value of M1 of the feature map 450. When a stride of the convolution operation is 2, pixel values of I3, I4, I5, I10, I11, I12, I17, I18, and I19 of the second image 135 and F1 through F9 of the filter kernels 430 are respectively multiplied, and the value of the combination of the result values of the multiplication may be assigned as a value of M2 of the feature map 450.

While the filter kernel 430 proceeds according to the stride to the last pixel of the second image 135, the convolution operation is performed between the pixel values in the second image 135 and the parameters of the filter kernel 430, and thus the feature map 450 having a certain size may be generated.

According to the present disclosure, values of parameters of a second DNN, for example, values of parameters of a filter kernel used in convolution layers of the second DNN (for example, F1 through F9 of the filter kernel 430), may be optimized through joint training of a first DNN and the second DNN. As described above, the AI up-scaler 234 may determine an up-scaling target corresponding to a down-scaling target of the first DNN based on AI data, and determine parameters corresponding to the determined up-scaling target as the parameters of the filter kernel used in the convolution layers of the second DNN.

Convolution layers included in the first DNN and the second DNN may perform processes according to the convolution operation process described with reference to FIG. 4, but the convolution operation process described with reference to FIG. 4 is only an example and the convolution operation process is not limited thereto.

Referring back to FIG. 3, the feature maps output from the first convolution layer 310 may be input to a first activation layer 320.

The first activation layer 320 may assign a non-linear feature to each feature map. The first activation layer 320 may include a sigmoid function, a Tan h function, a rectified linear unit (ReLU) function, or the like, but the first activation layer 320 is not limited thereto.

The first activation layer 320 assigning the non-linear feature indicates that at least one sample value of the feature map, which is an output of the first convolution layer 310, is changed. Here, the change is performed by applying the non-linear feature.

The first activation layer 320 determines whether to transmit sample values of the feature maps output from the first convolution layer 310 to the second convolution layer 330. For example, some of the sample values of the feature maps are activated by the first activation layer 320 and transmitted to the second convolution layer 330, and some of the sample values are deactivated by the first activation layer 320 and not transmitted to the second convolution layer 330. The intrinsic characteristics of the second image 135 represented by the feature maps are emphasized by the first activation layer 320.

Feature maps 325 output from the first activation layer 320 are input to the second convolution layer 330. One of the feature maps 325 shown in FIG. 3 is a result of processing the feature map 450 described with reference to FIG. 4 in the first activation layer 320.

The label 3X3X4 indicated in the second convolution layer 330 indicates that a convolution process is performed on the feature maps 325 by using four filter kernels having a size of 3×3. An output of the second convolution layer 330 is input to a second activation layer 340. The second activation layer 340 may assign a non-linear feature to input data.

Feature maps 345 output from the second activation layer 340 are input to a third convolution layer 350. The label 3X3X1 indicated in the third convolution layer 350 shown in FIG. 3 indicates that a convolution process is performed to generate one output image by using one filter kernel having a size of 3×3. The third convolution layer 350 is a layer for outputting a final image and generates one output by using one filter kernel. According to an embodiment of the disclosure, the third convolution layer 350 may output the third image 145 as a result of a convolution operation.

There may be a plurality of pieces of DNN setting information indicating the numbers of filter kernels of the first, second, and third convolution layers 310, 330, and 350 of the second DNN 300, a parameter of filter kernels of the first, second, and third convolution layers 310, 330, and 350 of the second DNN 300, and the like, as will be described later, and the plurality of pieces of DNN setting information should be connected to a plurality of pieces of DNN setting information of a first DNN. The association between the plurality of pieces of DNN setting information of the second DNN and the plurality of pieces of DNN setting information of the first DNN may be realized via joint training of the first DNN and the second DNN.

In FIG. 3, the second DNN 300 includes three convolution layers (the first, second, and third convolution layers 310, 330, and 350) and two activation layers (the first and second activation layers 320 and 340), but this is only an example, and the configurations and quantities of convolution layers and activation layers may vary according to an embodiment. Also, according to an embodiment, the second DNN 300 may be implemented as a recurrent neural network (RNN). In this case, a convolutional neural network (CNN) structure of the second DNN 300 according to an embodiment of the disclosure is changed to an RNN structure.

According to an embodiment, the AI up-scaler 234 may include at least one arithmetic logic unit (ALU) for the convolution operation and the operation of the activation layer described above. The ALU may be implemented as a processor. For the convolution operation, the ALU may include a multiplier that performs multiplication between sample values of the second image 135 or the feature map output from previous layer and sample values of the filter kernel, and an adder that adds result values of the multiplication. Also, for the operation of the activation layer, the ALU may include a multiplier that multiplies an input sample value by a weight used in a pre-determined sigmoid function, a Tan h function, or an ReLU function, and a comparator that compares a multiplication result and a certain value to determine whether to transmit the input sample value to a next layer.

Hereinafter, a method, performed by the AI up-scaler 234, of performing the AI up-scaling on the second image 135 according to the up-scaling target will be described.

According to an embodiment, the AI up-scaler 234 may store a plurality of pieces of DNN setting information configurable in a second DNN.

Here, the DNN setting information may include information about at least one of the number of convolution layers included in the second DNN, the number of filter kernels for each convolution layer, or a parameter of each filter kernel. The plurality of pieces of DNN setting information may respectively correspond to various up-scaling targets, and the second DNN may operate based on DNN setting information corresponding to a certain up-scaling target. The second DNN may have different structures based on the DNN setting information. For example, the second DNN may include three convolution layers based on any piece of DNN setting information, and may include four convolution layers based on another piece of DNN setting information.

According to an embodiment, the DNN setting information may only include a parameter of a filter kernel used in the second DNN. In this case, the structure of the second DNN does not change, but only the parameter of the internal filter kernel may change based on the DNN setting information.

The AI up-scaler 234 may obtain the DNN setting information for performing AI up-scaling on the second image 135, among the plurality of pieces of DNN setting information. Each of the plurality of pieces of DNN setting information may be information for obtaining the third image 145 of pre-determined resolution and/or pre-determined quality, and is trained jointly with a first DNN.

For example, one piece of DNN setting information among the plurality of pieces of DNN setting information may include information for obtaining the third image 145 of resolution twice the resolution of the second image 135, for example, the third image 145 of 4 K (4096×2160) resolution twice the 2 K (2048×1080) resolution of the second image 135, and another piece of DNN setting information may include information for obtaining the third image 145 of resolution four times higher than the resolution of the second image 135, for example, the third image 145 of 8 K (8192×4320) resolution four times higher than the 2 K (2048×1080) resolution of the second image 135.

Figure 6:
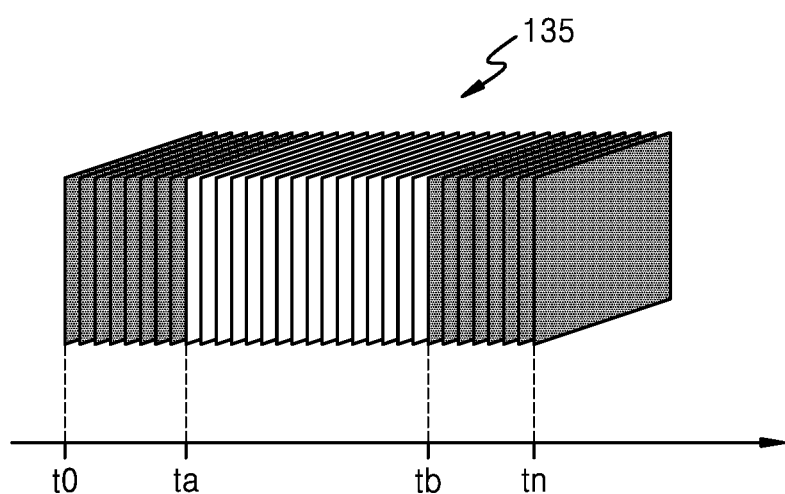
FIG. 6 is a diagram showing an image including a plurality of frames.

Each of the plurality of pieces of DNN setting information is obtained jointly with DNN setting information of the first DNN of an AI encoding apparatus 600 of FIG. 6, and the AI up-scaler 234 obtains one piece of DNN setting information among the plurality of pieces of DNN setting information according to an enlargement ratio corresponding to a reduction ratio of the DNN setting information of the first DNN. In this regard, the AI up-scaler 234 may verify information of the first DNN. In order for the AI up-scaler 234 to verify the information of the first DNN, the AI decoding apparatus 200 according to an embodiment receives AI data including the information of the first DNN from the AI encoding apparatus 600.

In other words, the AI up-scaler 234 may verify information targeted by DNN setting information of the first DNN used to obtain the first image 115 and obtain the DNN setting information of the second DNN trained jointly with the DNN setting information of the first DNN, by using information received from the AI encoding apparatus 600.

When DNN setting information for performing the AI up-scaling on the second image 135 is obtained from among the plurality of pieces of DNN setting information, input data may be processed based on the second DNN operating according to the obtained DNN setting information.

For example, when any one piece of DNN setting information is obtained, the number of filter kernels included in each of the first, second, and third convolution layers 310, 330, and 350 of the second DNN 300 of FIG. 3, and the parameters of the filter kernels are set to values included in the obtained DNN setting information.

In particular, parameters of a filter kernel of 3×3 used in any one convolution layer of the second DNN of FIG. 4 are set to {1, 1, 1, 1, 1, 1, 1, 1, 1}, and when DNN setting information is changed afterwards, the parameters are replaced by {2, 2, 2, 2, 2, 2, 2, 2, 2} that are parameters included in the changed DNN setting information.

The AI up-scaler 234 may obtain the DNN setting information for AI up-scaling from among the plurality of pieces of DNN setting information, based on information included in the AI data, and the AI data used to obtain the DNN setting information will now be described.

According to an embodiment, the AI up-scaler 234 may obtain the DNN setting information for AI up-scaling from among the plurality of pieces of DNN setting information, based on difference information included in the AI data. For example, when the resolution (for example, 4 K (4096×2160)) of the original image 105 is twice the resolution (for example, 2 K (2048×1080)) of the first image 115, based on the difference information, the AI up-scaler 234 may obtain the DNN setting information for increasing the resolution of the second image 135 two times.

According to another embodiment, the AI up-scaler 234 may obtain the DNN setting information for AI up-scaling the second image 135 from among the plurality of pieces of DNN setting information, based on information related to the first image 115 included in the AI data. The AI up-scaler 234 may pre-determine a mapping relationship between image-related information and DNN setting information, and obtain the DNN setting information mapped to the information related to the first image 115.

FIG. 5 is a table showing a mapping relationship between image-related information and DNN setting information.

According to FIG. 5, it the AI encoding and AI decoding processes according to embodiments of the disclosure may consider more than only a change of resolution. As shown in FIG. 5, DNN setting information may be selected considering resolution, such as standard definition (SD), high definition (HD), or full HD, a bitrate, such as 10 Mbps, 15 Mbps, or 20 Mbps, and codec information, such as AV1, H.264, or HEVC, individually or collectively. For such consideration of the resolution, the bitrate and the codec information, training in consideration of each element should be jointly performed with encoding and decoding processes during an AI training process (see FIG. 9).

Accordingly, when a plurality of pieces of DNN setting information are provided based on image-related information including a codec type, resolution of an image, and the like, as shown in FIG. 5 according to training, the DNN setting information for AI up-scaling the second image 135 may be obtained based on the information related to the first image 115 received during the AI decoding process.

In other words, the AI up-scaler 234 is capable of using DNN setting information according to image-related information by correlating the image-related information at the left of a table of FIG. 5 and the DNN setting information at the right of the table.

As shown in FIG. 5, when it is verified, from the information related to the first image 115, that the resolution of the first image 115 is SD, a bitrate of image data obtained as a result of performing first encoding on the first image 115 is 10 Mbps, and the first encoding is performed on the first image 115 via AV1 codec, the AI up-scaler 234 may use A DNN setting information among the plurality of pieces of DNN setting information.

Also, when it is verified, from the information related to the first image 115, that the resolution of the first image 115 is HD, the bitrate of the image data obtained as the result of performing the first encoding is 15 Mbps, and the first encoding is performed via H.264 codec, the AI up-scaler 234 may use B DNN setting information among the plurality of pieces of DNN setting information.

Also, when it is verified, from the information related to the first image 115, that the resolution of the first image 115 is full HD, the bitrate of the image data obtained as the result of performing the first encoding is 20 Mbps, and the first encoding is performed via HEVC codec, the AI up-scaler 234 may use C DNN setting information among the plurality of pieces of DNN setting information. Last, when it is verified that the resolution of the first image 115 is full HD, the bitrate of the image data obtained as the result of performing the first encoding is 15 Mbps, and the first encoding is performed via HEVC codec, the AI up-scaler 234 may use D DNN setting information among the plurality of pieces of DNN setting information. One of the C DNN setting information and the D DNN setting information may be selected based on whether the bitrate of the image data obtained as the result of performing the first encoding on the first image 115 is 20 Mbps or 15 Mbps. The different bitrates of the image data, obtained when the first encoding is performed on the first image 115 of the same resolution via the same codec, indicates different qualities of reconstructed images. Accordingly, a first DNN and a second DNN may be jointly trained based on certain image quality, and accordingly, the AI up-scaler 234 may obtain DNN setting information according to a bitrate of image data indicating the quality of the second image 135.

According to another embodiment, the AI up-scaler 234 may obtain the DNN setting information for performing AI up-scaling on the second image 135 from among the plurality of pieces of DNN setting information considering both information (prediction mode information, motion information, quantization parameter information, and the like) provided from the first decoder 232 and the information related to the first image 115 included in the AI data. For example, the AI up-scaler 234 may receive quantization parameter information used during a first encoding process of the first image 115 from the first decoder 232, verify a bitrate of image data obtained as an encoding result of the first image 115 from AI data, and obtain DNN setting information corresponding to the quantization parameter information and the bitrate. Even when the bitrates are the same, the quality of reconstructed images may vary according to the complexity of an image. A bitrate is a value representing the entire first image 115 on which first encoding is performed, and the quality of each frame may vary even within the first image 115. Accordingly, DNN setting information more suitable for the second image 135 may be obtained when prediction mode information, motion information, and/or a quantization parameter obtainable for each frame from the first decoder 232 are considered together, compared to when only the AI data is used.

Also, according to an embodiment, the AI data may include an identifier of mutually agreed DNN setting information. An identifier of DNN setting information is information for distinguishing a pair of pieces of DNN setting information jointly trained between the first DNN and the second DNN, such that AI up-scaling is performed on the second image 135 to the up-scaling target corresponding to the down-scaling target of the first DNN. The AI up-scaler 234 may perform AI up-scaling on the second image 135 by using the DNN setting information corresponding to the identifier of the DNN setting information, after obtaining the identifier of the DNN setting information included in the AI data. For example, identifiers indicating each of the plurality of DNN setting information configurable or selectable in the first DNN and identifiers indicating each of the plurality of DNN setting information configurable or selectable in the second DNN may be previously designated. In this case, the same identifier may be designated for a pair of DNN setting information configurable or selectable in each of the first DNN and the second DNN. The AI data may include an identifier of DNN setting information set in the first DNN for AI down-scaling of the original image 105. The AI up-scaler 234 that receives the AI data may perform AI up-scaling on the second image 135 by using the DNN setting information indicated by the identifier included in the AI data among the plurality of DNN setting information.

Also, according to an embodiment, the AI data may include the DNN setting information. The AI up-scaler 234 may perform AI up-scaling on the second image 135 by using the DNN setting information after obtaining the DNN setting information included in the AI data.

According to an embodiment, when pieces of information (for example, the number of convolution layers, the number of filter kernels for each convolution layer, a parameter of each filter kernel, and the like) constituting the DNN setting information are stored in a form of a lookup table, the AI up-scaler 234 may obtain the DNN setting information by combining some values selected from values in the lookup table, based on information included in the AI data, and perform AI up-scaling on the second image 135 by using the obtained DNN setting information.

According to an embodiment, when a structure of DNN corresponding to the up-scaling target is determined, the AI up-scaler 234 may obtain the DNN setting information, for example, parameters of a filter kernel, corresponding to the structure of the DNN.

The AI up-scaler 234 obtains the DNN setting information of the second DNN through the AI data including information related to the first DNN, and performs AI up-scaling on the second image 135 through the second DNN set based on the obtained DNN setting information. As a result, memory usage and required throughput may be reduced as compared to when features of the second image 135 are directly analyzed for up-scaling.

According to an embodiment, when the second image 135 includes a plurality of frames, the AI up-scaler 234 may independently obtain DNN setting information for a certain number of frames, or may obtain common DNN setting information for entire frames.

FIG. 6 is a diagram showing an image including a plurality of frames.

As shown in FIG. 6, the second image 135 may include frames t0 through tn.

According to an embodiment, the AI up-scaler 234 may obtain DNN setting information of a second DNN through AI data, and perform AI up-scaling on the frames t0 through tn based on the DNN setting information. In other words, the frames t0 through tn may be processed via AI up-scaling based on common DNN setting information.

According to another embodiment, the AI up-scaler 234 may perform AI up-scaling on some of the frames t0 through tn, for example, the frames t0 through ta, by using 'A' DNN setting information obtained from AI data, and perform AI up-scaling on the frames ta+1 through tb by using 'B' DNN setting information obtained from the AI data. Also, the AI up-scaler 234 may perform AI up-scaling on the frames tb+1 through tn by using 'C' DNN setting information obtained from the AI data. In other words, the AI up-scaler 234 may independently obtain DNN setting information for each group of frames including a certain number of frames among the plurality of frames, and perform AI up-scaling on frames included in each group by using the independently obtained DNN setting information.

According to another embodiment, the AI up-scaler 234 may independently obtain DNN setting information for each frame forming the second image 135. In other words, when the second image 135 includes three frames, the AI up-scaler 234 may perform AI up-scaling on a first frame by using DNN setting information obtained in relation to the first frame, perform AI up-scaling on a second frame by using DNN setting information obtained in relation to the second frame, and perform AI up-scaling on a third frame by using DNN setting information obtained in relation to the third frame. DNN setting information may be independently obtained for each frame included in the second image 135, according to a method of obtaining DNN setting information based on information (prediction mode information, motion information, quantization parameter information, or the like) provided from the first decoder 232 and information related to the first image 115 included in the AI data described above. This is because the mode information, the quantization parameter information, or the like may be determined independently for each frame included in the second image 135.

According to another embodiment, the AI data may include information about to which frame DNN setting information obtained based on the AI data is applicable. For example, when the AI data includes information indicating that DNN setting information is valid up to the frame ta, the AI up-scaler 234 performs AI up-scaling on the frames t0 through ta by using DNN setting information obtained based on the AI data. Also, when another piece of AI data includes information indicating that DNN setting information is valid up to the frame tn, the AI up-scaler 234 performs AI up-scaling on the frames ta+1 through tn by using DNN setting information obtained based on the other piece of AI data.

Hereinafter, the AI encoding apparatus 600 for performing AI encoding on the original image 105 will be described with reference to FIG. 7.

Figure 7:
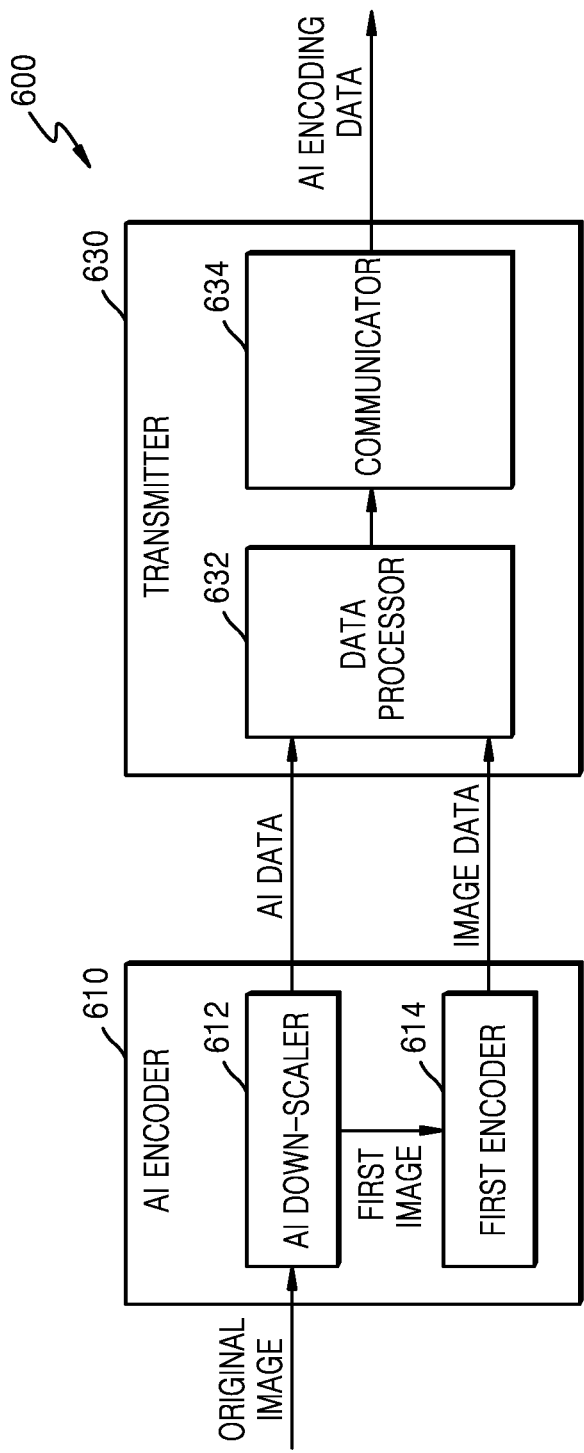
FIG. 7 is a block diagram of an AI encoding apparatus according to an embodiment.

FIG. 7 is a block diagram of the AI encoding apparatus according to an embodiment.

Referring to FIG. 7, the AI encoding apparatus 600 may include an AI encoder 610 and a transmitter 630. The AI encoder 610 may include an AI down-scaler 612 and a first encoder 614. The transmitter 630 may include a data processor 632 and a communicator 634.

In FIG. 7, the AI encoder 610 and the transmitter 630 are illustrated as separate components or devices, but the AI encoder 610 and the transmitter 630 may be jointly implemented through one processor for controlling the joint functionality of the AI encoder 610 and the transmitter 630. In this case, the AI encoder 610 and the transmitter 630 may be implemented through a dedicated processor or through a combination of software and a general-purpose processor such as AP, CPU or graphics processor GPU. The dedicated processor may be implemented by including a memory for implementing an embodiment of the disclosure or by including a memory processor for using an external memory.

Also, the AI encoder 610 and the transmitter 630 may be configured by a plurality of processors. In this case, the AI encoder 610 and the transmitter 630 may be implemented through a combination of dedicated processors or through a combination of software and a plurality of general-purpose processors such as AP, CPU or GPU. The AI down-scaler 612 and the first encoder 614 may be implemented through different processors.

The AI encoder 610 performs AI down-scaling on the original image 105 and first encoding on the first image 115, and transmits AI data and image data to the transmitter 630. The transmitter 630 transmits the AI data and the image data to the AI decoding apparatus 200. The transmitter 630 may include a communication interface, such as a wireless communication interface including a radio and/or an antenna or a wired communication interface such as HDMI, Ethernet, and the like. Alternatively, the transmitter 630 may include a portion or component of a dedicated processor or through a combination of software and a general-purpose processor such as application processor (AP), central processor (CPU) or graphic processor (GPU).

The image data includes data obtained as a result of performing the first encoding on the first image 115. The image data may include data obtained based on pixel values in the first image 115, for example, residual data that is a difference between the first image 115 and prediction data of the first image 115. Also, the image data includes information used during a first encoding process of the first image 115. For example, the image data may include prediction mode information, motion information, quantization parameter information used to perform the first encoding on the first image 115, and the like.

The AI data includes information enabling AI up-scaling to be performed on the second image 135 to an up-scaling target corresponding to a down-scaling target of a first DNN. According to an embodiment, the AI data may include difference information between the original image 105 and the first image 115. Also, the AI data may include information related to the first image 115. The information related to the first image 115 may include information about at least one of resolution of the first image 115, a bitrate of the image data obtained as the result of performing the first encoding on the first image 115, or a codec type used during the first encoding of the first image 115.

According to an embodiment, the AI data may include an identifier of mutually agreed DNN setting information such that the AI up-scaling is performed on the second image 135 to the up-scaling target corresponding to the down-scaling target of the first DNN.

Also, according to an embodiment, the AI data may include DNN setting information configurable in a second DNN.

The AI down-scaler 612 may obtain the first image 115 obtained by performing the AI down-scaling on the original image 105 through the first DNN. The AI down-scaler 612 may determine the down-scaling target of the original image 105, based on a pre-determined standard.

In order to obtain the first image 115 matching the down-scaling target, the AI down-scaler 612 may store a plurality of pieces of DNN setting information settable in the first DNN. The AI down-scaler 612 obtains DNN setting information corresponding to the down-scaling target from among the plurality of pieces of DNN setting information, and performs the AI down-scaling on the original image 105 through the first DNN set in the DNN setting information.

Each of the plurality of pieces of DNN setting information may be trained to obtain the first image 115 of pre-determined resolution and/or pre-determined quality. For example, any one piece of DNN setting information among the plurality of pieces of DNN setting information may include information for obtaining the first image 115 of resolution that is half the resolution of the original image 105, for example, the first image 115 of 2 K (2048×1080) resolution that is half 4 K (4096×2160) resolution of the original image 105, and another piece of DNN setting information may include information for obtaining the first image 115 of resolution that is a quarter the resolution of the original image 105, for example, the first image 115 of 2 K (2048×1080) resolution that is a quarter 8 K (8192×4320) resolution of the original image 105.

According to an embodiment, when pieces of information (for example, the number of convolution layers, the number of filter kernels for each convolution layer, a parameter of each filter kernel, and the like) constituting the DNN setting information are stored in a form of a lookup table, the AI down-scaler 612 may obtain the DNN setting information by combining some values selected from values in the lookup table, based on the down-scaling target, and perform AI down-scaling on the original image 105 by using the DNN setting information.

According to an embodiment, the AI down-scaler 612 may determine a structure of DNN corresponding to the down-scaling target, and obtain DNN setting information corresponding to the structure of DNN, for example, to configure parameters of a filter kernel.

The plurality of pieces of DNN setting information for performing the AI down-scaling on the original image 105 may have an optimized value as the first DNN and the second DNN are jointly trained. Here, each piece of DNN setting information includes at least one of the number of convolution layers included in the first DNN, the number of filter kernels for each convolution layer, or a parameter of each filter kernel.

The AI down-scaler 612 may set the first DNN with the DNN setting information obtained for performing the AI down-scaling on the original image 105 to obtain the first image 115 of certain resolution and/or certain quality through the first DNN. When the DNN setting information for performing the AI down-scaling on the original image 105 is obtained from the plurality of pieces of DNN setting information, each layer in the first DNN may process input data based on information included in the DNN setting information.

Hereinafter, a method, performed by the AI down-scaler 612, of determining the down-scaling target will be described. The down-scaling target may indicate, for example, by how much resolution is decreased from the original image 105 to obtain the first image 115.

According to an embodiment, the AI down-scaler 612 may determine the down-scaling target based on at least one of a compression ratio (for example, a resolution difference between the original image 105 and the first image 115, target bitrate, or the like), compression quality (for example, type of bitrate), compression history information, or a type of the original image 105.

For example, the AI down-scaler 612 may determine the down-scaling target based on the compression ratio, the compression quality, or the like, which is pre-set or input from a user.

As another example, the AI down-scaler 612 may determine the down-scaling target by using the compression history information stored in the AI encoding apparatus 600. For example, according to the compression history information usable by the AI encoding apparatus 600, encoding quality, a compression ratio, or the like preferred by the user may be determined, and the down-scaling target may be determined according to the encoding quality determined based on the compression history information. For example, the resolution, quality, or the like of the first image 115 may be determined according to the encoding quality that has been used most often according to the compression history information.

As another example, the AI down-scaler 612 may determine the down-scaling target based on the encoding quality that has been used more frequently than a certain threshold value (for example, average quality of the encoding quality that has been used more frequently than the certain threshold value), according to the compression history information.

As another example, the AI down-scaler 612 may determine the down-scaling target, based on the resolution, type (for example, a file format), or the like of the original image 105.

According to an embodiment, when the original image 105 includes a plurality of frames, the AI down-scaler 612 may independently determine a down-scaling target for a certain number of frames, or may determine a down-scaling target for entire frames.

According to an embodiment, the AI down-scaler 612 may divide the frames included in the original image 105 into a certain number of groups or subsets, and independently determine the down-scaling target for each group. The same or different down-scaling targets may be determined for each group. The number of frames included in the groups may be the same or different according to the each group.

According to another embodiment, the AI down-scaler 612 may independently determine a down-scaling target for each frame included in the original image 105. The same or different down-scaling targets may be determined for each frame.

Hereinafter, an example of a structure of a first DNN 700 on which AI down-scaling is based will be described.

Figure 8:
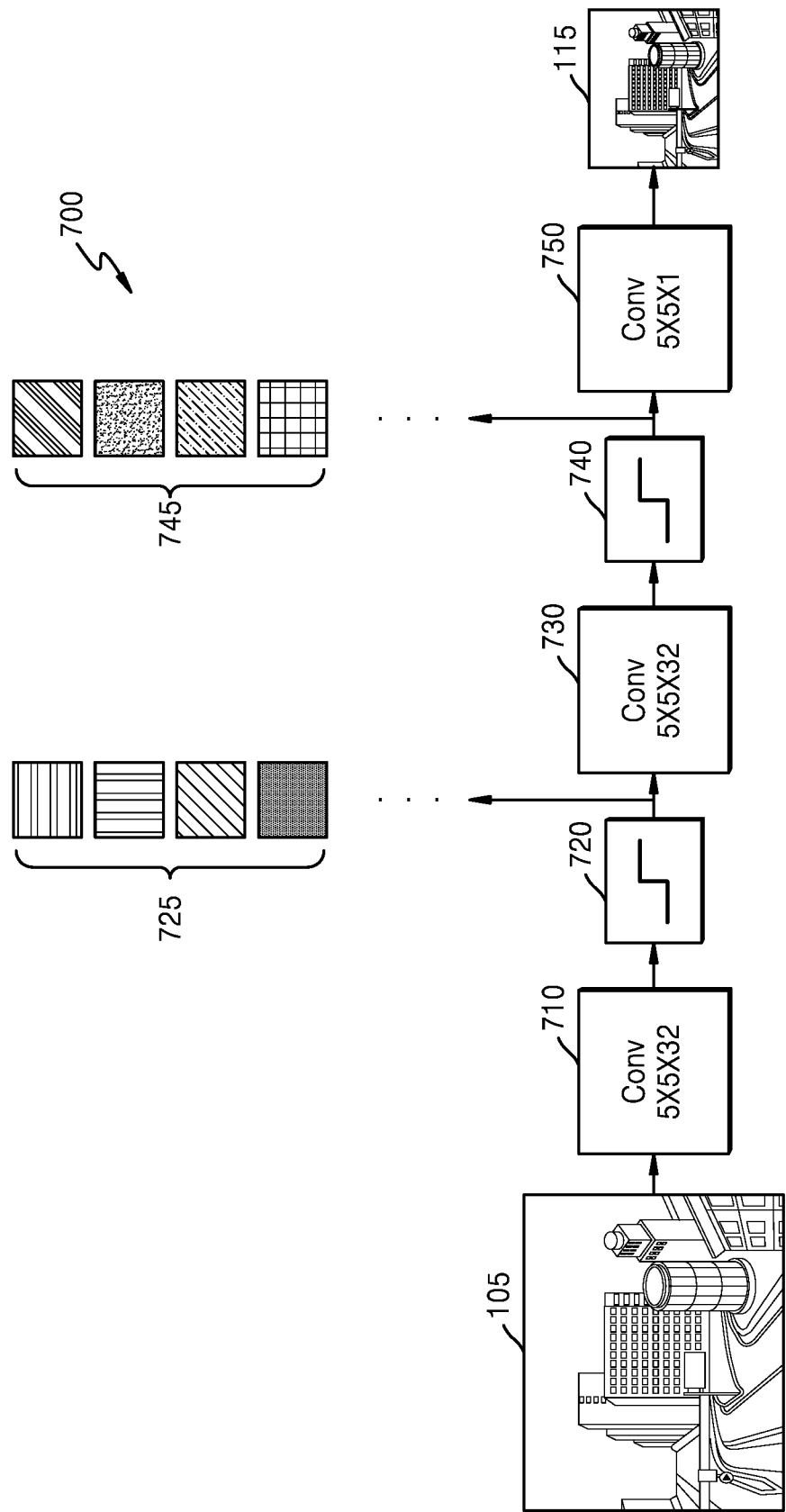
FIG. 8 is a diagram showing a DNN for performing AI down-scaling on an original image.

FIG. 8 is a diagram showing the DNN for performing AI down-scaling on the original image.

As shown in FIG. 8, the original image 105 is input to a first convolution layer 710 of the first DNN 700. The first convolution layer 710 performs a convolution process on the original image 105 by using 32 filter kernels having a size of 5×5. Accordingly, 32 feature maps generated as a result of the convolution process are input to a first activation layer 720. The first activation layer 720 may assign a non-linear feature to the 32 feature maps.

The first activation layer 720 determines whether to transmit sample values of the feature maps output from the first convolution layer 710 to the second convolution layer 730. For example, some of the sample values of the feature maps are activated by the first activation layer 720 and transmitted to the second convolution layer 730, and some of the sample values are deactivated by the first activation layer 720 and not transmitted to the second convolution layer 730. Information represented by the feature maps output from the first convolution layer 710 is emphasized by the first activation layer 720.

An output 725 of the first activation layer 720 is input to a second convolution layer 730. The second convolution layer 730 performs a convolution process on input data by using 32 filter kernels having a size of 5×5. Therefore, 32 feature maps output as a result of the convolution process are input to a second activation layer 740, and the second activation layer 740 may assign a non-linear feature to the 32 feature maps.

An output 745 of the second activation layer 740 is input to a third convolution layer 750. The third convolution layer 750 performs a convolution process on input data by using one filter kernel having a size of 5×5. As a result of the convolution process, one image may be output from the third convolution layer 750. The third convolution layer 750 generates one output by using the one filter kernel as a layer for outputting a final image. According to an embodiment of the disclosure, the third convolution layer 750 may output the first image 115 as a result of a convolution operation.

There may be a plurality of pieces of DNN setting information indicating the numbers of filter kernels of the first, second, and third convolution layers 710, 730, and 750 of the first DNN 700, a parameter of each filter kernel of the first, second, and third convolution layers 710, 730, and 750 of the first DNN 700, and the like, and the plurality of pieces of DNN setting information may be connected to a plurality of pieces of DNN setting information of a second DNN. The connection between the plurality of pieces of DNN setting information of the first DNN and the plurality of pieces of DNN setting information of the second DNN may be realized via joint training of the first DNN and the second DNN.

In FIG. 8, the first DNN 700 includes three convolution layers (the first, second, and third convolution layers 710, 730, and 750) and two activation layers (the first and second activation layers 720 and 740), but this is only an example configuration, and the quantities and configurations of convolution layers and activation layers may vary according to an embodiment. Also, according to an embodiment, the first DNN 700 may be implemented as an RNN. In this case, a CNN structure of the first DNN 700 according to an embodiment of the disclosure is changed to an RNN structure.

According to an embodiment, the AI down-scaler 612 may include at least one ALU for the convolution operation and the operation of the activation layer described above. The ALU may be implemented as a processor. For the convolution operation, the ALU may include a multiplier that performs multiplication between sample values of the original image 105 or the feature map output from previous layer and sample values of the filter kernel, and an adder that adds result values of the multiplication. Also, for the operation of the activation layer, the ALU may include a multiplier that multiplies an input sample value by a weight used in a pre-determined sigmoid function, a Tan h function, or an ReLU function, and a comparator that compares a multiplication result and a certain value to determine whether to transmit the input sample value to a next layer.

Referring back to FIG. 7, upon receiving the first image 115 from the AI down-scaler 612, the first encoder 614 may reduce an information amount or quantity and size of data of the first image 115 by performing first encoding on the first image 115. The image data corresponding to the first image 115 may be obtained as a result of performing the first encoding by the first encoder 614.

The data processor 632 processes at least one of the AI data or the image data to be transmitted in a certain form. For example, when the AI data and the image data are to be transmitted in a form of a bitstream, the data processor 632 may process the AI data to be expressed in a form of a bitstream, and transmit the image data and the AI data in a form of one bitstream through the communicator 634. As another example, the data processor 632 may process the AI data to be expressed in a form of bitstream, and transmit each of a bitstream corresponding to the AI data and a bitstream corresponding to the image data through the communicator 634. As another example, the data processor 632 may process the AI data to be expressed in a form of a frame or packet, and transmit the image data in a form of a bitstream and the AI data in a form of a frame or packet through the communicator 634.

The communicator 634 transmits AI encoding data obtained as a result of performing AI encoding, through a network. The AI encoding data obtained as the result of performing AI encoding includes the image data and the AI data. The image data and the AI data may be transmitted through a same type of network or different types of networks.

According to an embodiment, the AI encoding data obtained as a result of processes of the data processor 632 may be stored in a data storage medium including a magnetic medium such as a hard disk, a floppy disk, or a magnetic tape, an optical recording medium such as CD-ROM or DVD, or a magneto-optical medium such as a floptical disk.

Hereinafter, a method of jointly training the first DNN 700 and the second DNN 300 will be described with reference to FIG. 9.

Figure 9:
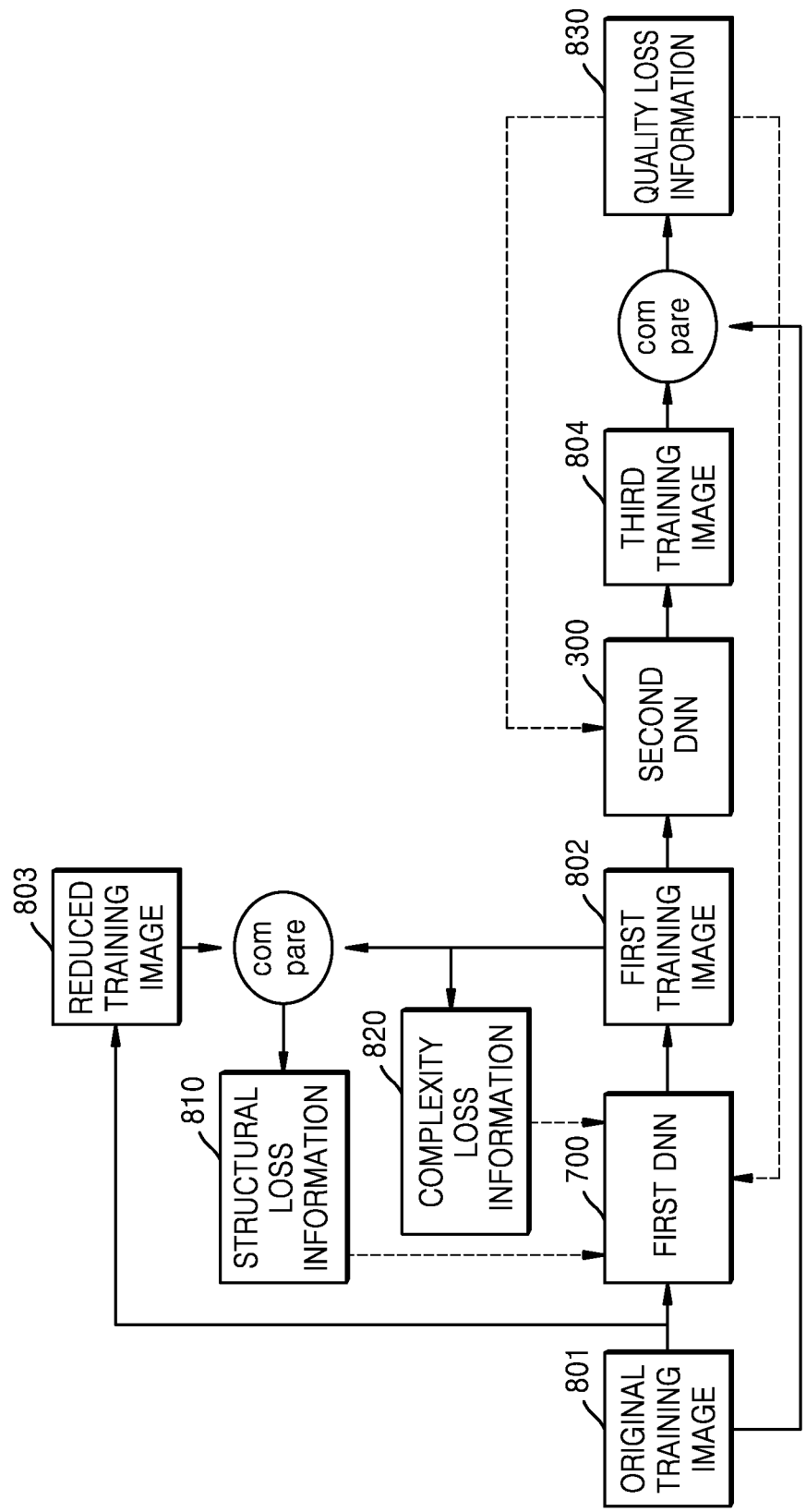
FIG. 9 is a diagram for describing a method of training a first DNN and a second DNN.

FIG. 9 is a diagram for describing a method of training the first DNN and the second DNN.

In an embodiment, the original image 105 on which AI encoding is performed through an AI encoding process is reconstructed to the third image 145 via an AI decoding process, and in order to maintain consistency between the original image 105 and the third image 145 obtained as a result of AI decoding, coordination between the AI encoding process and the AI decoding process is required. In other words, information lost in the AI encoding process needs to be reconstructed during the AI decoding process, and in this regard, the first DNN 700 and the second DNN 300 need to be jointly trained to similarly account for the information loss.

For accurate AI decoding, ultimately, quality loss information 830 corresponding to a result of comparing a third training image 804 and an original training image 801 shown in FIG. 9 should be reduced. Accordingly, the quality loss information 830 is used to train both of the first DNN 700 and the second DNN 300.

First, a training process shown in FIG. 9 will be described.

In FIG. 9, the original training image 801 is an image on which AI down-scaling is to be performed and a first training image 802 is an image obtained by performing AI down-scaling on the original training image 801. Also, the third training image 804 is an image obtained by performing AI up-scaling on the first training image 802.

The original training image 801 includes a still image or a moving image including a plurality of frames. According to an embodiment, the original training image 801 may include a luminance image extracted from the still image or the moving image including the plurality of frames. Also, according to an embodiment, the original training image 801 may include a patch image extracted from the still image or the moving image including the plurality of frames. When the original training image 801 includes the plurality of frames, the first training image 802, the second training image, and the third training image 804 also each include a plurality of frames. When the plurality of frames of the original training image 801 are sequentially input to the first DNN 700, the plurality of frames of the first training image 802, the second training image and the third training image 804 may be sequentially obtained through the first DNN 700 and the second DNN 300.

For joint training of the first DNN 700 and the second DNN 300, the original training image 801 is input to the first DNN 700. The original training image 801 input to the first DNN 700 is output as the first training image 802 via the AI down-scaling, and the first training image 802 is input to the second DNN 300. The third training image 804 is output as a result of performing the AI up-scaling on the first training image 802.

Referring to FIG. 9, the first training image 802 is input to the second DNN 300, and according to an embodiment, a second training image obtained as first encoding and first decoding are performed on the first training image 802 may be input to the second DNN 300. In order to input the second training image to the second DNN 300, any one codec among MPEG-2, H.264, MPEG-4, H.265/HEVC, VC-1, VP8, VP9, and AV1 may be used. In particular, any one codec among MPEG-2, H.264, MPEG-4, H.265/HEVC, VC-1, VP8, VP9, and AV1 may be used to perform first encoding on the first training image 802 and first decoding on image data corresponding to the first training image 802.

Referring to FIG. 9, separate from the first training image 802 being output through the first DNN 700, a reduced training image 803 obtained by performing legacy down-scaling on the original training image 801 is obtained. Here, the legacy down-scaling may include at least one of bilinear scaling, bicubic scaling, lanczos scaling, or stair step scaling.

In order to prevent a structural feature of the first image 115 from deviating greatly from a structural feature of the original image 105, the reduced training image 803 is obtained to preserve the structural feature of the original training image 801.

Before training is performed, the first DNN 700 and the second DNN 300 may be configured according to pre-determined DNN setting information. When the training is performed, structural loss information 810, complexity loss information 820, and the quality loss information 830 may be determined.

The structural loss information 810 may be determined based on a result of comparing the reduced training image 803 and the first training image 802. For example, the structural loss information 810 may correspond to a difference between structural information of the reduced training image 803 and structural information of the first training image 802. Structural information may include various features extractable from an image, such as luminance, contrast, histogram, or the like of the image. The structural loss information 810 indicates how much structural information of the original training image 801 is maintained in the first training image 802. When the structural loss information 810 is small, the structural information of the first training image 802 is similar to the structural information of the original training image 801.

The complexity loss information 820 may be determined based on spatial complexity of the first training image 802. For example, a total variance value of the first training image 802 may be used as the spatial complexity. The complexity loss information 820 is related to a bitrate of image data obtained by performing first encoding on the first training image 802. It is defined that the bitrate of the image data is low when the complexity loss information 820 is small.

The quality loss information 830 may be determined based on a result of comparing the original training image 801 and the third training image 804. The quality loss information 830 may include at least one of an L1-norm value, an L2-norm value, a Structural Similarity (SSIM) value, a Peak Signal-To-Noise Ratio-Human Vision System (PSNR-HVS) value, a Multiscale SSIM (MS-SSIM) value, a Variance Inflation Factor (VIF) value, or a Video Multimethod Assessment Fusion (VMAF) value regarding the difference between the original training image 801 and the third training image 804. The quality loss information 830 indicates how similar the third training image 804 is to the original training image 801. The third training image 804 is more similar to the original training image 801 when the quality loss information 830 is small.

Referring to FIG. 9, the structural loss information 810, the complexity loss information 820 and the quality loss information 830 are used to train the first DNN 700, and the quality loss information 830 is used to train the second DNN 300. In other words, the quality loss information 830 is used to train both the first DNN 700 and the second DNN 300.

The first DNN 700 may update a parameter such that final loss information determined based on the structural loss information 810, the complexity loss information 820, and the quality loss information 830 is reduced or minimized. Also, the second DNN 300 may update a parameter such that the quality loss information 830 is reduced or minimized.

The final loss information for training the first DNN 700 and the second DNN 300 may be determined as Equation 1 below.

LossDS=$a$×Structural loss information+$b$×Complexity loss information+$c$×Quality loss information [Equation 1]

LossUS=$d$×Quality loss information

In Equation 1, LossDS indicates final loss information to be reduced or minimized to train the first DNN 700, and LossUS indicates final loss information to be reduced or minimized to train the second DNN 300. Also, a, b, c and d may be pre-determined certain weights.

In other words, the first DNN 700 updates parameters such that LossDS of Equation 1 is reduced, and the second DNN 300 updates parameters such that LossUS is reduced. When the parameters of the first DNN 700 are updated according to LossDS derived during the training, the first training image 802 obtained based on the updated parameters becomes different from a previous first training image 802 obtained based on parameters that have not been updated, and accordingly, the third training image 804 also becomes different from a previous third training image 804. When the third training image 804 becomes different from the previous third training image 804, the quality loss information 830 is also newly determined, and the second DNN 300 updates the parameters accordingly. When the quality loss information 830 is newly determined, LossDS is also newly determined, and the first DNN 700 updates the parameters according to newly determined LossDS. In other words, updating of the parameters of the first DNN 700 leads to updating of the parameters of the second DNN 300, and updating of the parameters of the second DNN 300 leads to updating of the parameters of the first DNN 700. Consequently, because the first DNN 700 and the second DNN 300 are jointly trained by sharing the quality loss information 830, the parameters of the first DNN 700 and the parameters of the second DNN 300 may be jointly optimized.

Referring to Equation 1, it is verified that LossUS is determined according to the quality loss information 830, but this is only an example and LossUS may be determined based on at least one of the structural loss information 810 and the complexity loss information 820, and the quality loss information 830.

Hereinabove, it has been described that the AI up-scaler 234 of the AI decoding apparatus 200 and the AI down-scaler 612 of the AI encoding apparatus 600 store the plurality of pieces of DNN setting information, and methods of training each of the plurality of pieces of DNN setting information stored in the AI up-scaler 234 and the AI down-scaler 612 will now be described.

As described with reference to Equation 1, the first DNN 700 updates the parameters considering the similarity (the structural loss information 810) between the structural information of the first training image 802 and the structural information of the original training image 801, the bitrate (the complexity loss information 820) of the image data obtained as a result of performing first encoding on the first training image 802, and the difference (the quality loss information 830) between the third training image 804 and the original training image 801.

In particular, the parameters of the first DNN 700 may be updated such that the first training image 802 having similar structural information as the original training image 801 is obtained and the image data having a small bitrate is obtained when first encoding is performed on the first training image 802, and at the same time, the second DNN 300 performing AI up-scaling on the first training image 802 obtains the third training image 804 similar to the original training image 801.

A direction in which values of the parameters of the first DNN 700 are optimized may vary by adjusting the weights a, b, and c of Equation 1. For example, when the weight b is determined to be high, values of the parameters of the first DNN 700 may be updated by prioritizing a low bitrate over high quality of the third training image 804. Also, when the weight c is determined to be high, values of the parameters of the first DNN 700 may be updated by prioritizing high quality of the third training image 804 over a high bitrate or maintaining of the structural information of the original training image 801.

Also, the direction in which values of the parameters of the first DNN 700 are optimized may vary according to a type of codec used to perform first encoding on the first training image 802. This is because the second training image to be input to the second DNN 300 may vary according to the type of codec.

In other words, values of the parameters of the first DNN 700 and values of the parameters of the second DNN 300 may be jointly updated based on the weights a, b, and c, and the type of codec for performing first encoding on the first training image 802. Accordingly, when the first DNN 700 and the second DNN 300 are trained after determining the weights a, b, and c each to a certain value and determining the type of codec to a certain type, values of the parameters of the first DNN 700 and corresponding values of the parameters of the second DNN 300 may be jointly optimized.

Also, when the first DNN 700 and the second DNN 300 are trained after changing the weights a, b, and c, and the type of codec, values the parameters of the first DNN 700 and values the parameters of the second DNN 300 jointly optimized may be determined. In other words, the plurality of pieces of DNN setting information jointly trained with each other may be determined in the first DNN 700 and the second DNN 300 when the first DNN 700 and the second DNN 300 are trained while changing values of the weights a, b, and c, and the type of codec.

As described above with reference to FIG. 5, the plurality of pieces of DNN setting information of the first DNN 700 and the second DNN 300 may be mapped to the information related to the first image. To set such a mapping relationship, first encoding may be performed on the first training image 802 output from the first DNN 700 via a certain codec according to a certain bitrate and the second training image obtained by performing first decoding on a bitstream obtained as a result of performing the first encoding may be input to the second DNN 300. In other words, by training the first DNN 700 and the second DNN 300 after setting an environment such that the first encoding is performed on the first training image 802 of a certain resolution via the certain codec according to the certain bitrate, a DNN setting information pair mapped to the resolution of the first training image 802, a type of the codec used to perform the first encoding on the first training image 802, and the bitrate of the bitstream obtained as a result of performing the first encoding on the first training image 802 may be determined. By variously changing the resolution of the first training image 802, the type of codec used to perform the first encoding on the first training image 802 and the bitrate of the bitstream obtained according to the first encoding of the first training image 802, the mapping relationships between the plurality of DNN setting information of the first DNN 700 and the second DNN 300 and the pieces of information related to the first image may be determined.

Figure 10:
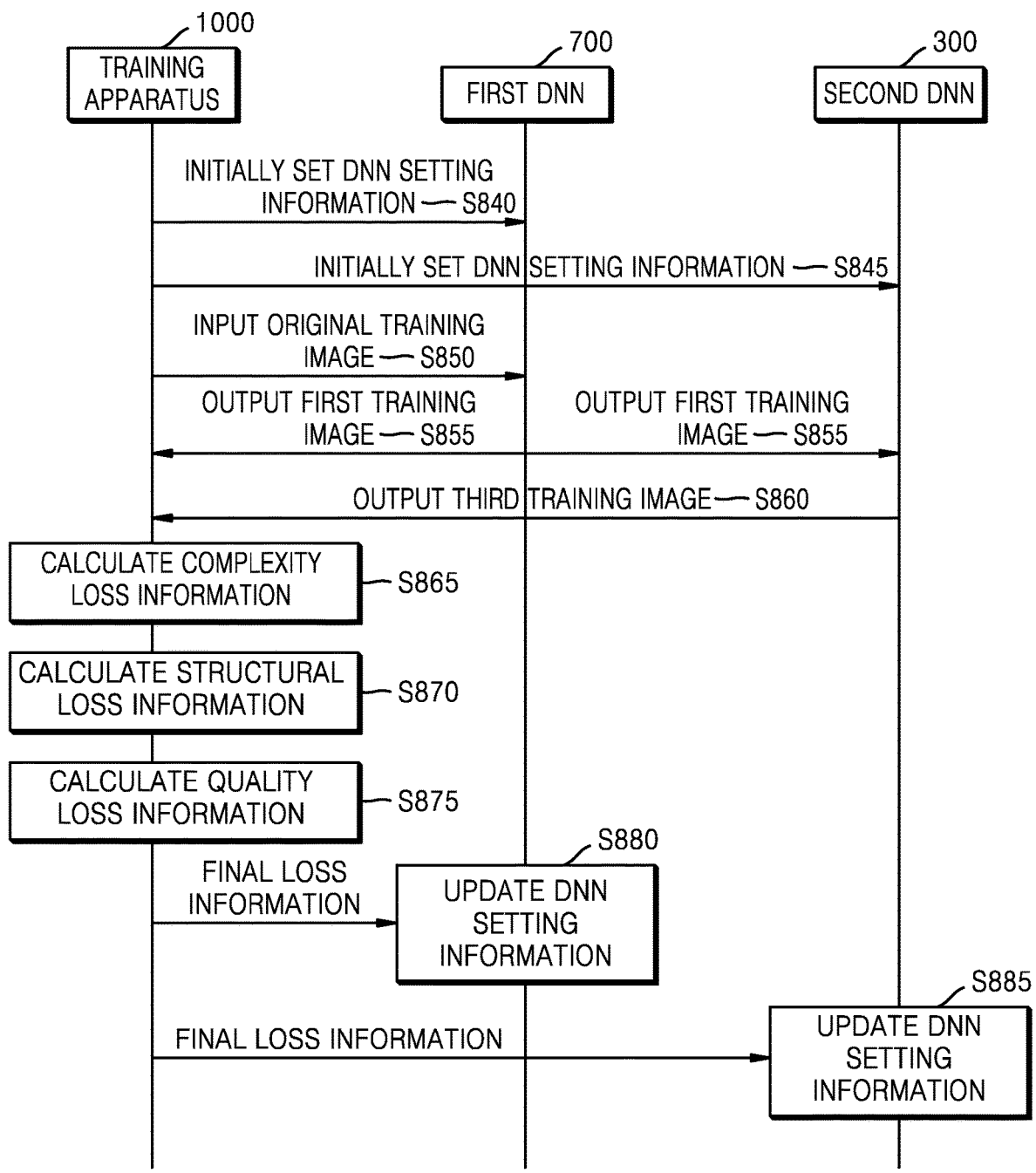
FIG. 10 is a diagram for describing a training process of a first DNN and a second DNN by a training apparatus.

FIG. 10 is a diagram for describing training processes of the first DNN and the second DNN by a training apparatus.

The training of the first DNN 700 and the second DNN 300 described with reference FIG. 9 may be performed by the training apparatus 1000. The training apparatus 1000 may include the first DNN 700 and the second DNN 300. The training apparatus 1000 may be, for example, the AI encoding apparatus 600 or a separate server. The DNN setting information of the second DNN 300 obtained as the training result may be stored in the AI decoding apparatus 200.

Referring to FIG. 10, the training apparatus 1000 initially sets the DNN setting information of the first DNN 700 and the second DNN 300, in operations S840 and S845. Accordingly, the first DNN 700 and the second DNN 300 may operate according to the initialized DNN setting information. The DNN setting information may include information about at least one of the number of convolution layers included in the first DNN 700 and the second DNN 300, the number of filter kernels for each convolution layer, the size of a filter kernel for each convolution layer, or a parameter of each filter kernel.

The training apparatus 1000 provides the original training image 801 as input to the first DNN 700, in operation S850. The original training image 801 may include a still image or at least one frame included in a moving image.

The first DNN 700 processes the original training image 801 according to the initialized DNN setting information and outputs the first training image 802 obtained by performing AI down-scaling on the original training image 801, in operation S855. In FIG. 10, the first training image 802 output from the first DNN 700 is directly input to the second DNN 300, but the first training image 802 output from the first DNN 700 may be input to the second DNN 300 via the training apparatus 1000. Also, the training apparatus 1000 may perform first encoding and first decoding on the first training image 802 via a certain codec, and provide the second training image as input to the second DNN 300.

The second DNN 300 processes the first training image 802 or the second training image according to the initialized DNN setting information and outputs the third training image 804 obtained by performing AI up-scaling on the first training image 802 or the second training image, in operation S860.

The training apparatus 1000 calculates the complexity loss information 820, based on the first training image 802, in operation S865.

The training apparatus 1000 calculates the structural loss information 810 by comparing the reduced training image 803 and the first training image 802, in operation S870.

The training apparatus 1000 calculates the quality loss information 830 by comparing the original training image 801 and the third training image 804, in operation S875.

The initial DNN setting information is updated in operation S880 via a feedback propagation process based on the final loss information. The training apparatus 1000 may calculate the final loss information for training the first DNN 700, based on the complexity loss information 820, the structural loss information 810, and the quality loss information 830.

The second DNN 300 updates the DNN setting information in operation S885 via a feedback propagation process based on the quality loss information 830 or the final loss information. The training apparatus 1000 may calculate the final loss information for training the second DNN 300, based on the quality loss information 830.

Then, the training apparatus 1000, the first DNN 700, and the second DNN 300 may repeat operations S850 through S885 until the final loss information is minimized to update the DNN setting information. At this time, during each repetition, the first DNN 700 and the second DNN 300 operate according to the DNN setting information updated in the previous operation.

Table 1 below shows effects when AI encoding and AI decoding are performed on the original image 105 according to an embodiment of the disclosure and when encoding and decoding are performed on the original image 105 via HEVC.

TABLE 1

| Content | Resolution | Frame Number | Information Amount (Bitrate) (Mbps) | | Subjective Image Quality Score (VMAF) | |
|---|---|---|---|---|---|---|
| | | | HEVC | AI Encoding/ AI Decoding | HEVC | AI Encoding/ AI Decoding |
| Content_01 | 8K | 300 frames | 46.3 | 21.4 | 94.80 | 93.54 |
| Content_02 | (7680 × 4320) | | 46.3 | 21.6 | 98.05 | 98.98 |
| Content_03 | | | 46.3 | 22.7 | 96.08 | 96.00 |
| Content_04 | | | 46.1 | 22.1 | 86.26 | 92.00 |
| Content_05 | | | 45.4 | 22.7 | 93.42 | 92.98 |
| Content_06 | | | 46.3 | 23.0 | 95.99 | 95.61 |
| | | Average | 46.11 | 22.25 | 94.10 | 94.85 |

As shown in Table 1, despite subjective image quality when AI encoding and AI decoding are performed on content including 300 frames of 8 K resolution, according to an embodiment of the disclosure being higher than subjective image quality when encoding and decoding are performed via HEVC, a bitrate is still reduced by at least 50%.

Figure 11:
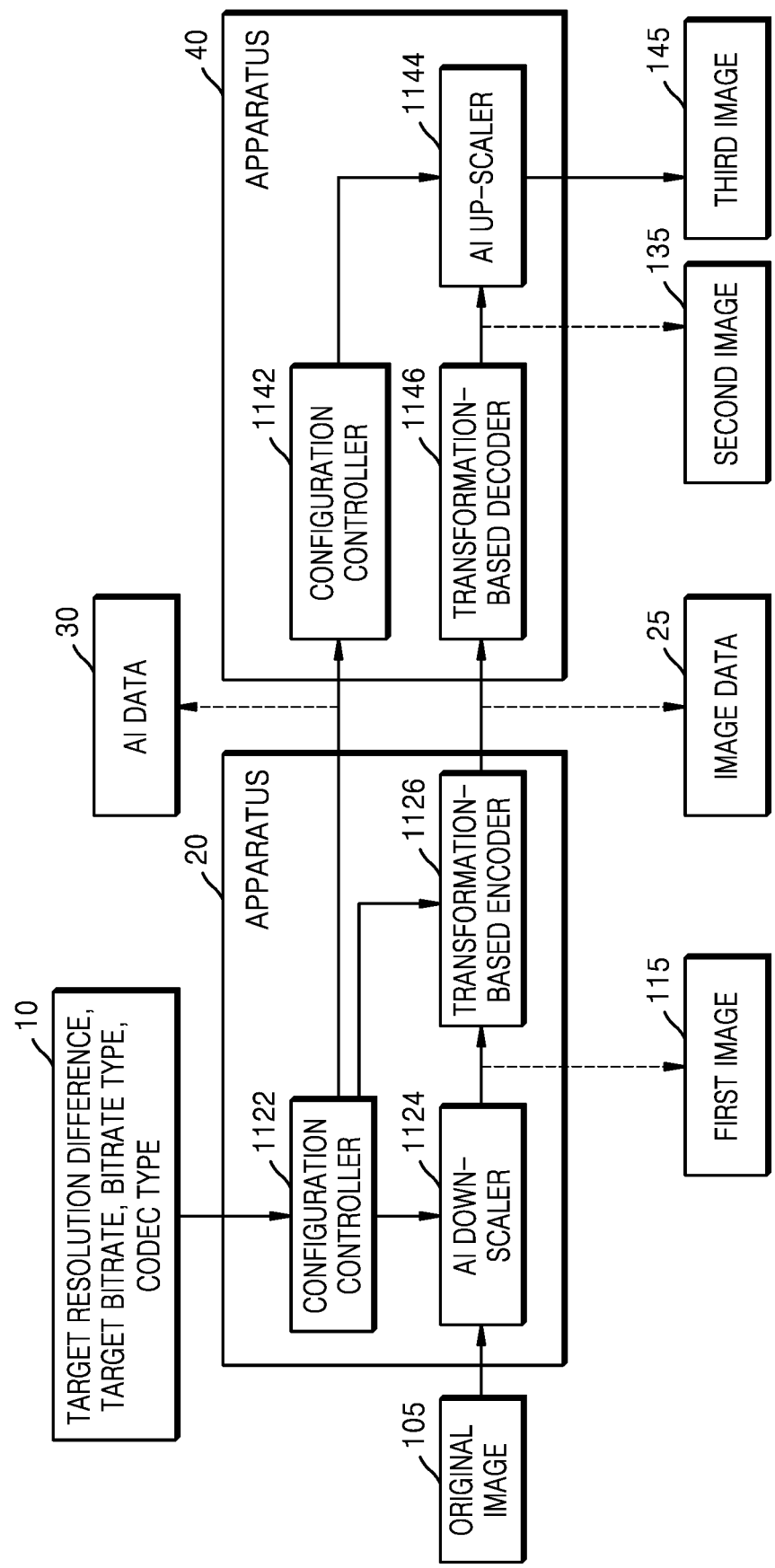
FIG. 11 is a diagram illustrating an apparatus for performing AI down-scaling on an original image and an apparatus for performing AI up-scaling on a second image.

FIG. 11 is a diagram of an apparatus for performing AI down-scaling on the original image and an apparatus for performing AI up-scaling on the second image.

The apparatus 20 receives the original image 105 and provides image data 25 and AI data 30 to the apparatus 40 by using an AI down-scaler 1124 and a transformation-based encoder 1126. According to an embodiment, the image data 25 corresponds to the image data of FIG. 1 and the AI data 30 corresponds to the AI data of FIG. 1. Also, according to an embodiment, the transformation-based encoder 1126 corresponds to the first encoder 614 of FIG. 7 and the AI down-scaler 1124 corresponds to the AI down-scaler 612 of FIG. 7.

The apparatus 40 receives the AI data 30 and the image data 25 and obtains the third image 145 by using a transformation-based decoder 1146 and an AI up-scaler 1144. According to an embodiment, the transformation-based decoder 1146 corresponds to the first decoder 232 of FIG. 2 and the AI up-scaler 1144 corresponds to the AI up-scaler 234 of FIG. 2.

According to an embodiment, the apparatus 20 includes a CPU, a memory, and a computer program including instructions. The computer program is stored in the memory. According to an embodiment, the apparatus 20 performs functions to be described with reference to FIG. 11 according to execution of the computer program by the CPU. According to an embodiment, the functions to be described with reference to FIG. 11 are performed by a dedicated hardware chip and/or the CPU.

According to an embodiment, the apparatus 40 includes a CPU, a memory, and a computer program including instructions. The computer program is stored in the memory. According to an embodiment, the apparatus 40 performs functions to be described with reference to FIG. 11 according to execution of the computer program by the CPU. According to an embodiment, the functions to be described with reference to FIG. 11 are performed by a dedicated hardware chip and/or the CPU.

In FIG. 11, a configuration controller 1122 receives at least one input value 10. According to an embodiment, the at least one input value 10 may include at least one of a target resolution difference for the AI down-scaler 1124 and the AI up-scaler 1144, a bitrate of the image data 25, a bitrate type of the image data 25 (for example, a variable bitrate type, a constant bitrate type, or an average bitrate type), or a codec type for the transformation-based encoder 1126. The at least one input value 10 may include a value pre-stored in the apparatus 20 or a value input from a user.

The configuration controller 1122 controls operations of the AI down-scaler 1124 and the transformation-based encoder 1126, based on the received input value 10. According to an embodiment, the configuration controller 1122 obtains DNN setting information for the AI down-scaler 1124 according to the received input value 10, and configures the AI down-scaler 1124 with the DNN setting information. According to an embodiment, the configuration controller 1122 may transmit the input value 10 to the AI down-scaler 1124 and the AI down-scaler 1124 may obtain the DNN setting information for performing AI down-scaling on the original image 105, based on the input value 10. According to an embodiment, the configuration controller 1122 may provide, to the AI down-scaler 1124, additional information, for example, color format (luminance component, chrominance component, red component, green component, or blue component) information to which AI down-scaling is applied and tone mapping information of a high dynamic range (HDR), together with the input value 10, and the AI down-scaler 1124 may obtain the DNN setting information considering the input value 10 and the additional information. According to an embodiment, the configuration controller 1122 transmits at least a part of the received input value 10 to the transformation-based encoder 1126 and the transformation-based encoder 1126 performs first encoding on the first image 115 via a bitrate of a certain value, a bitrate of a certain type, and a certain codec.

The AI down-scaler 1124 receives the original image 105 and performs an operation described with reference to at least one of FIG. 1, 7, 8, 9, or 10 to obtain the first image 115.

According to an embodiment, the AI data 30 is provided to the apparatus 40. The AI data 30 may include at least one of resolution difference information between the original image 105 and the first image 115, or information related to the first image 115. The resolution difference information may be determined based on the target resolution difference of the input value 10, and the information related to the first image 115 may be determined based on at least one of a target bitrate, the bitrate type, or the codec type. According to an embodiment, the AI data 30 may include parameters used during the AI up-scaling. The AI data 30 may be provided from the AI down-scaler 1124 to the apparatus 40.

The image data 25 is obtained as the original image 105 is processed by the transformation-based encoder 1126, and is transmitted to the apparatus 40. The transformation-based encoder 1126 may process the first image 115 according to MPEG-2, H.264 AVC, MPEG-4, H.265/HEVC, VC-1, VP8, VP9, or VA1.

A configuration controller 1142 controls an operation of the AI up-scaler 1144, based on the AI data 30. According to an embodiment, the configuration controller 1142 obtains the DNN setting information for the AI up-scaler 1144 according to the received AI data 30, and configures the AI up-scaler 1144 according to the DNN setting information. According to an embodiment, the configuration controller 1142 may transmit the received AI data 30 to the AI up-scaler 1144 and the AI up-scaler 1144 may obtain the DNN setting information for performing AI up-scaling on the second image 135, based on the AI data 30. According to an embodiment, the configuration controller 1142 may provide, to the AI up-scaler 1144, additional information, for example, the color format (luminance component, chrominance component, red component, green component, or blue component) information to which AI up-scaling is applied, and the tone mapping information of HDR, together with the AI data 30, and the AI up-scaler 1144 may obtain the DNN setting information considering the AI data 30 and the additional information. According to an embodiment, the AI up-scaler 1144 may receive the AI data 30 from the configuration controller 1142, receive at least one of prediction mode information, motion information, or quantization parameter information from the transformation-based decoder 1146, and obtain the DNN setting information based on the AI data 30 and at least one of the prediction mode information, the motion information, and the quantization parameter information.

The transformation-based decoder 1146 may process the image data 25 to reconstruct the second image 135. The transformation-based decoder 1146 may process the image data 25 according to MPEG-2, H.264 AVC, MPEG-4, H.265/HEVC, VC-1, VP8, VP9, or AV1.

The AI up-scaler 1144 may obtain the third image 145 by performing AI up-scaling on the second image 135 provided from the transformation-based decoder 1146, based on the set DNN setting information.

The AI down-scaler 1124 may include a first DNN and the AI up-scaler 1144 may include a second DNN, and according to an embodiment, DNN setting information for the first DNN and second DNN are trained according to the training method described with reference to FIGS. 9 and 10.

An AI encoding technique and an AI decoding technique according to an embodiment of the disclosure have been described above with reference to FIGS. 1 through 11. Hereinafter, an AI encoding technique and an AI decoding technique for performing up-scaling by updating up-scaling DNN setting information optimized for an original image according to another embodiment of the disclosure will be described in detail with reference to FIGS. 12 through 21. DNN setting information may include at least one of the number of convolution layers, the number of filter kernels in each of the convolution layers, a size of each filter kernel, or information about parameters of each filter kernel.

Hereinafter, a 'parameter' included in the 'DNN setting information' is a value used in a mathematical operation for each layer constituting a neural network, and may include, for example, a weight and a bias used when an input value is applied to a predefined operation formula. A weight may be a value for performing multiplication with an input value, and a bias may be a value for performing addition with a value obtained as a result of performing multiplications between input values and weights. Also, parameters may be represented in a matrix form. For example, a weight may be a parameter of a 3×3 filter kernel used in a convolution layer for AI up-scaling or AI down-scaling, and a bias may be a parameter in a 1×1 matrix form that is added before an activation function is applied to a result obtained after performing a number of convolution operations equal to the number of input channels (depth) in the convolution layer for AI up-scaling or AI down-scaling and adding result values of each convolution operation together. Weights and biases according to an embodiment of the disclosure will be described in more detail below with reference to Equation 9. A parameter is a value set as a result of training and may be updated through separate training data or training data composed of an original image.

Hereinafter, "model compression" refers to compression techniques for reducing the amount of data while maintaining the highest possible accuracy by reducing the number and size of parameters in an artificial neural network model, to reduce the complexity of the artificial neural network model. Examples of 'model compression' include pruning and quantization but model compression is not limited thereto.

Figure 12:
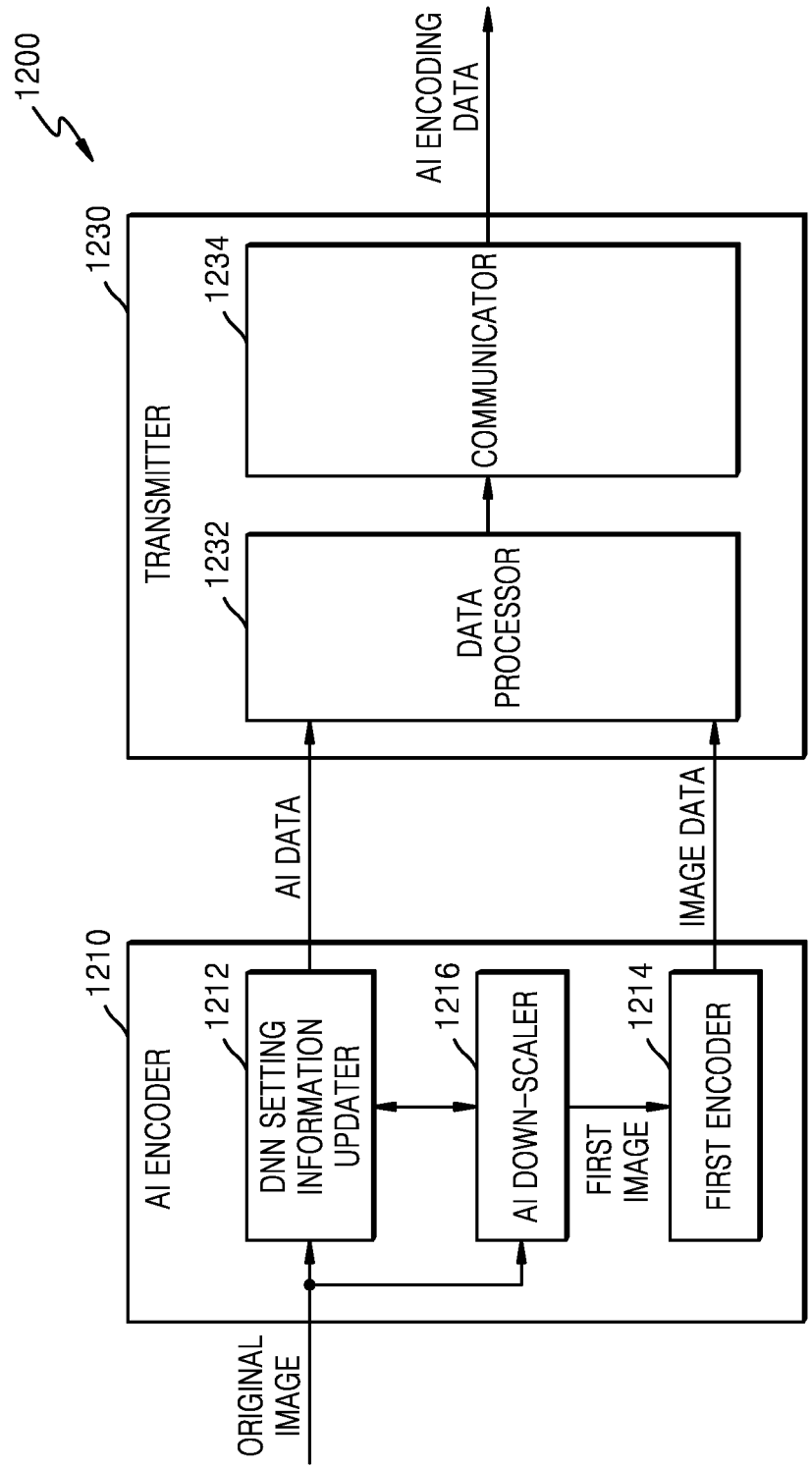
FIG. 12 is a block diagram of a configuration of an AI encoding apparatus according to an embodiment of the disclosure.

FIG. 12 is a block diagram of a configuration of an AI encoding apparatus according to an embodiment of the disclosure. Referring to FIG. 12, the AI encoding apparatus 1200 includes an AI encoder 1210 and a transmitter 1230. The AI encoder 1210 includes a DNN setting information updater 1212, an AI down-scaler 1216, and a first encoder 1214.

As described above, the AI down-scaler 1216 obtains a first image (e.g., 115 of FIG. 1) by performing AI down-scaling on an original image (e.g., 105 of FIG. 1) via a first DNN. The first image is an image having a resolution lower than that of the original image. Because AI down-scaling by the AI down-scaler 1216 has been described above, a redundant description thereof is omitted below. The AI encoding apparatus 1200 may include a central processor for controlling the AI encoder 1210 and the transmitter 1230. Alternatively, the AI encoder 1210 and the transmitter 1230 are operated by respective processors, and as the processors work closely together, the AI encoding apparatus 1200 may be entirely operated. Alternatively, the AI encoder 1210 and the transmitter 1230 may be controlled by an external processor.

The AI encoding apparatus 1200 may further include one or more data storages or memories for storing data input to or output from the DNN setting information updater 1212, the AI down-scaler 1216, the first encoder 1214, and the transmitter 1230. The AI encoding apparatus 1200 may further include a memory controller that controls input/output of data stored in a data storage.

To encode an image, the AI encoding apparatus 1200 may perform an image encoding operation including prediction by interworking with a built-in or external video encoding processor. According to an embodiment of the disclosure, the built-in video encoding processor of the AI encoding apparatus 1200 may implement a basic image encoding operation together with a CPU or GPU including an image encoding processing module as well as a separate processor.

The DNN setting information updater 1212 may update DNN setting information of a DNN for performing AI up-scaling corresponding to a DNN for performing AI down-scaling. The DNN setting information updater 1212 may update setting information for performing AI up-scaling of at least one second image corresponding to at least one original image via joint training of an up-scaling DNN and a down-scaling DNN used for AI down-scaling of the at least one original image or separate training of the up-scaling DNN by using the at least one original image as a training image.

The DNN setting information updater 1212 may not select DNN setting information of a down-scaling DNN used for AI down-scaling of an original image but determine the DNN setting information of the down-scaling DNN and DNN setting information of an up-scaling DNN via joint training of the up-scaling DNN and the down-scaling DNN by using an original image as a training image.

In this case, the number of convolution layers, the number of filter kernels in each convolution layer, a size of each filter kernel, which are included in DNN setting information, may be determined. Then, joint training may be performed based on the number of convolutional layers, the number of filter kernels in each of the convolutional layers, and the size of each filter kernel. For example, the number of convolution layers, the number of filter kernels in each convolution layer, and a size of each filter kernel may be determined based on a structure of a most complex up-scaling DNN included in default up-scaling DNN setting information. In other words, the number of convolutional layers may be determined to be less than or equal to the number of convolutional layers in the most complex up-scaling DNN, which is included in the default up-scaling DNN setting information, and the number of filter kernels in each convolution layer may be determined to be less than or equal to the number of filter kernels in each of the most complex convolution layers included in the default up-scaling DNN setting information. The size of each filter kernel may be determined to be less than or equal to a size of each filter kernel in the most complex up-scaling DNN included in the default up-scaling DNN setting information.

Furthermore, in this case, initial parameters included in DNN setting information of a down-scaling/up-scaling DNN needed for joint training may be randomly initialized parameters. For example, initial parameters of a down-scaling/up-scaling DNN may be values randomly sampled based on a particular probability distribution. For example, weights among the initial parameters of the down-scaling/up-scaling DNN may be values randomly sampled based on a Gaussian probability distribution. Furthermore, for example, a bias among the initial parameters of the down-scaling/up-scaling DNN may be initialized to 0.

Alternatively, for example, an initial parameter of the down-scaling/up-scaling DNN needed for joint training may be one of a plurality of predetermined down-scaling/up-scaling DNN parameters. Alternatively, an initial parameter of the down-scaling/up-scaling DNN needed for joint training may be a default down-scaling/up-scaling DNN parameter. Alternatively, an initial parameter of the down-scaling/up-scaling DNN needed for joint training may be a parameter of the down-scaling/up-scaling DNN, which is used in an immediately preceding group of pictures (GOP) unit, an immediately preceding intra random access point (IRAP) period unit, an immediately preceding sequence unit, an immediately preceding unit of a preset number of frames, or the like.

An image input to an up-scaling DNN during joint training may be the first image generated by down-scaling the original image via a down-scaling DNN, but the image is not limited thereto. The input image may be a second image (e.g., 135 of FIG. 1) generated by performing first encoding and first decoding on the first image obtained after the down-scaling.

Thereafter, the DNN setting information updater 1212 may select determined parameters of the down-scaling DNN and determine parameters of an up-scaling DNN via separate training of the up-scaling DNN by using at least one original image as a training image. In this case, initial parameters of the up-scaling DNN available before the separate training may be parameters of the up-scaling DNN determined during joint training, but the initial parameters are not limited thereto. Weights in the up-scaling DNN may be values randomly sampled based on a particular probability distribution, and a bias in the up-scaling DNN may be determined to be 0.

An image input to the up-scaling DNN for separate training of the up-scaling DNN during the separate training may be the second image generated by performing first encoding and first decoding on the first image generated by down-scaling the original image via a down-scaling DNN.

In this case, parameters of the up-scaling DNN, which are finally generated during or after training, may be generated via model compression.

Model compression used herein refers to compression techniques for reducing the amount of data while maintaining the highest possible accuracy, by reducing the number and size of parameters in an artificial neural network model, to reduce the complexity of the artificial neural network model. Information loss may occur during model compression. Representative examples of model compression include quantization and pruning, but the model compression is not limited thereto. Quantization refers to the process of dividing a continuous variation into a finite number of levels that change discontinuously and assigning a unique value to each level. A typical example of quantization is the process of converting a non-integer value into an integer value via a rounding operation such as rounding off, rounding down, and rounding up. In detail, quantization may include transforming a data type of parameter information of the up-scaling DNN, and for example, may include transforming a real data type such as float32 and double64 into an integer data type such as int16 and int8.

Pruning refers to the process of changing a value having a small amount of data to zero. A typical example of pruning includes an operation of setting to 0 a DNN parameter value that is less than a certain value close to 0 and is included in the parameter information of the up-scaling DNN, but pruning is not limited thereto.

Alternatively, instead of performing joint training of a down-scaling DNN and an up-scaling DNN, the DNN setting information updater 1212 may select parameters of the down-scaling DNN and determine parameters of the up-scaling DNN for up-scaling at least one original image via separate training by using the at least one original image as a training image. For example, an initial parameter of the down-scaling DNN needed for separate training may be one of a plurality of predetermined down-scaling DNN parameters or default down-scaling DNN parameters. Furthermore, as initial parameters of the up-scaling DNN available before separate training, weights in the up-scaling DNN may be values randomly sampled based on a particular probability distribution, and a bias in the up-scaling DNN may be determined to be 0.

However, embodiments of the disclosure are not limited thereto, and an initial parameter of the down-scaling/up-scaling DNN needed for separate training may be a parameter of the down-scaling/up-scaling DNN, which is used in an immediately preceding group of pictures (GOP) unit, an immediately preceding instantaneous decoding refresh (IDR) picture period (IRAP) period unit, an immediately preceding sequence unit, an immediately preceding unit of a preset number of frames, or the like.

In this case, an image input to the up-scaling DNN for separate training of the up-scaling DNN may be the second image generated by performing first encoding and first decoding on the first image generated by down-scaling the original image via a down-scaling DNN.

The DNN setting information updater 1212 may generate a first training image via the down-scaling DNN by using at least one original image as a training image, generate a third training image via the up-scaling DNN by using the first training image, and update the up-scaling DNN and the down-scaling DNN based on first loss information and third loss information, each corresponding to a result of comparing the third training image with the original image that has not undergone AI down-scaling, and second loss information generated based on the first training image. Here, the first loss information may be information based on a result of comparing a quality parameter of the third training image with a quality parameter of the original image. In other words, when the first loss information has a smaller value, this may indicate that a quality of the original image is more similar to a quality of the third training image. The first loss information may be information for using specialized structural information of the original image for training. The first loss information may correspond to the quality loss information 830 of FIG. 9.

In this case, the result of the comparing of the quality parameters may be a quality comparison parameter such as an L1-norm value, an L2-norm value, an SSIM value, a PSNR-HVS value, an MS-SSIM value, a VIF value, or a VMAF value regarding a difference between the third training image and the original image, but the quality comparison parameter is not limited thereto. The result of the comparing of the quality parameters may be determined based on a combination of the quality comparison parameters. For example, the first loss information may be determined based on Equation 2 below. In Equation 2, i, j, k each denote a weight for adjusting relative importance of each quality comparison parameter.

FIRST LOSS INFORMATION=$i$*L1-norm+ $j$*SSIM,$i$*L2-norm+$j$*VIF; or $i$*L1-norm+$j$*L2-norm+$k$*SSIM [Equation 2]

The third loss information may be information based on a result of comparing a feature-related parameter of the third training image with a feature-related parameter of the original image. In other words, when the third loss information has a smaller value, this may indicate that features of the original image are more similar to features of the third training image. The third loss information may be information for using specialized detail information (i.e., feature-related information) of the original image for training.

For example, the result of comparing the feature-related parameters may be an L1-norm value or an L2-norm value of features of each image, but the result of comparing the feature-related parameters is not limited thereto. Edge information determined based on a Sobel edge detector or Canny edge detector may be a feature-related parameter.

The second loss information may be information related to a spatial complexity of the first training image. For example, the second loss information may represent a total variance of the first training image. The smaller the second loss, the smaller the amount of image data transmitted through a bitstream. The second loss information may correspond to the complexity loss information 820 of FIG. 9.

Thus, the first loss information and the third loss information are information related to distortion, while the second loss information is information related to a rate, and when training is performed by considering all of the first loss information, the second loss information, and the third loss information, the DNN setting information updater 1212 may determine an optimal up-scaling DNN parameter based on a rate-distortion (RD) cost.

The DNN setting information updater 1212 may determine a loss value $Loss_{DS}$ based on Equation 3 below and update, based on the loss value $Loss_{DS}$, parameters of the up-scaling DNN and the down-scaling DNN such that the loss value $Loss_{DS}$ decreases.

$Loss_{DS}=a*$FIRST LOSS INFORMATION$+$
$b*$SECOND LOSS INFORMATION$+c*$THIRD
LOSS INFORMATION          [Equation 3]

Moreover, the DNN setting information updater 1212 may determine a loss value $Loss_{DS}$ based on Equation 4 below by additionally considering fourth loss information and update, based on the loss value $Loss_{DS}$, parameters of the up-scaling DNN and the down-scaling DNN such that the loss value $Loss_{DS}$ decreases. In this case, the fourth loss information may correspond to the structural loss information 810 of FIG. 9.

$Loss_{DS}=a*$FIRST LOSS INFORMATION$+$
$b*$SECOND LOSS INFORMATION$+c*$THIRD
LOSS INFORMATION$+d*$FOURTH LOSS
INFORMATION          [Equation 4]

The DNN setting information updater 1212 may select parameters of the down-scaling DNN, perform first encoding on a first training image obtained by down-scaling at least one original image via the down-scaling DNN, generate a third training image by up-scaling, via the up-scaling DNN, a second training image obtained by performing first decoding on the first training image that has undergone the first encoding, and update the up-scaling DNN based on first loss information and third loss information, each corresponding to a result of comparing the third training image with the original image that has not undergone AI down-scaling. The first loss information and the third loss information may be the first loss information and third loss information described above.

For example, the DNN setting information updater 1212 may determine a loss value $Loss_{US}$ based on Equation 5 below and update, based on the loss value $Loss_{US}$, parameters of the up-scaling DNN such that the loss value $Loss_{US}$ decreases.

$Loss_{US}=d*$FIRST LOSS INFORMATION$+e*$THIRD
LOSS INFORMATION          [Equation 5]

The DNN setting information updater 1212 may generate information about parameters of the up-scaling DNN obtained via joint training of the down-scaling DNN and the up-scaling DNN or separate training of the up-scaling DNN.

Furthermore, the DNN setting information updater 1212 may generate information about at least one of the number of convolutional layers, the number of filter kernels in each convolutional layer, or a size of each filter kernel.

The DNN setting information updater 1212 may encode DNN setting information of the up-scaling DNN. For example, the DNN setting information updater 1212 may encode information about at least one of the number of convolution layers, the number of filter kernels in each convolution layer, or the size of each filter kernel. Furthermore, the DNN setting information updater 1212 may encode information about parameters of the up-scaling DNN. For example, the DNN setting information updater 1212 may encode a weight residual or a bias residual of a filter kernel in the up-scaling DNN. In this case, the weight residual or bias residual may be a difference between a weight or a bias encoded in an immediately preceding period unit and a weight or a bias determined for a current period unit.

In this case, encoding may be performed using differential pulse code modulation (DPCM), run-length coding (RLC), and Huffman coding, but the encoding is not limited thereto. The encoding may be performed using various other entropy encoding techniques.

Embodiments of the disclosure are not limited thereto, and the DNN setting information updater 1212 may perform entropy encoding on DNN setting information of the up-scaling DNN based on a context model. For example, the DNN setting information updater 1212 may generate a context model based on DNN setting information of the up-scaling DNN for a preceding period unit, update the DNN setting information of the up-scaling DNN for a current period unit, and entropy-encode the updated DNN setting information of the up-scaling DNN by using the context model. In this case, the context model refers to a model representing the probability of occurrence of a symbol estimated based on various pieces of context information of the surrounding environment.

The context model may be updated each time weights or a bias of a filter kernel in the up-scaling DNN for the current period unit are encoded, and information about next weights or biases of a filter kernel in the up-scaling DNN for the current period unit may be entropy-encoded based on the updated context model. The context model may be determined for the entire up-scaling DNN, but the determination is not limited thereto, and the context model may be determined for each convolutional layer, for at least one filter kernel corresponding to one output channel in a convolutional layer, and for each filter kernel in the convolutional layer. Examples of entropy encoding based on contexts may include range coding, arithmetic coding, and Huffman coding, but the entropy encoding is not limited thereto.

The DNN setting information updater 1212 may update weights or biases of filter kernels in all layers of the up-scaling DNN and encode information about the updated weights or biases of the filter kernels in all the layers, but the updating is not limited thereto. The DNN setting information updater 1212 may update weights or biases in some of the layers and encode information about the updated weights or biases in the corresponding layers. Alternatively, the DNN setting information updater 1212 may update weights or biases of some filter kernels in a layer and encode information about the updated weights or biases of some filter kernels. For example, the DNN setting information updater 1212 may update weights or biases in a last layer of the up-scaling DNN and encode information about the updated weights or biases in the last layer. The DNN setting information updater 1212 may encode updated DNN setting information of the up-scaling DNN, including weight residual information or bias residual information. The weight residual information or bias residual information indicates a difference between a weight or a bias of all or some of the filter kernels in all or some of the convolution layers in the up-scaling DNN before the weight or the bias is updated, and a weight or a bias of all or some of the filter kernels in all or some of the convolution layers in the up-scaling DNN after the weight or the bias is updated.

The DNN setting information updater 1212 may perform frequency transformation on a weight residual and encode updated DNN setting information of the up-scaling DNN, including information about the weight residual that has undergone the frequency transformation.

The DNN setting information updater 1212 may perform entropy encoding on a weight or a bias updated for use in the current period unit based on a context model, but the entropy encoding is not limited thereto. The DNN setting information updater 1212 may entropy-encode, based on the context model, a difference between a weight or a bias updated for use in the current period unit and a weight or a bias used in the immediately preceding period unit. In this case, the context model may be based on information about a difference between weights or biases determined for use in the up-scaling DNN in at least one of the immediately preceding period unit or a period unit preceding the immediately preceding period unit.

The DNN setting information updater 1212 may entropy-encode weight information or bias information in combination with a model compression technique (e.g., pruning or quantization).

The DNN setting information updater 1212 may periodically update DNN setting information of the up-scaling DNN. For example, the DNN setting information updater 1212 may update DNN setting information for each GOP, each IRAP period (e.g., instantaneous decoding refresh (IDR) picture period), each sequence, or each unit of a preset number of frames.

For example, the AI encoding apparatus 1200 may perform scene change detection while encoding an image every IDR picture period, and when a scene change is detected in a frame, determine the frame as an IDR picture and encode subsequent images every IDR picture period. In this case, the DNN setting information updater 1212 may update DNN setting information for each IDR picture period in which the scene change is detected.

The DNN setting information updater 1212 may update the DNN setting information whenever necessary. For example, the DNN setting information updater 1212 may determine whether to update the DNN setting information for each preset period and update the DNN setting information when the DNN setting information updater 1212 determines to update the DNN setting information. The DNN setting information updater 1212 may determine DNN setting information of the up-scaling DNN based on at least some of at least one original image and determine whether to update DNN setting information by comparing, based on an RD cost, a result of performing AI down-scaling and AI up-scaling based on the determined DNN setting information with a result of performing AI down-scaling and AI up-scaling based on DNN setting information that has not been updated.

In this case, the DNN setting information updater 1212 may encode flag information regarding whether to update the DNN setting information. When the DNN setting information updater 1212 determines to update the DNN setting information, the DNN setting information updater 1212 may encode the flag information as a first value. On the other hand, when the DNN setting information updater 1212 determines not to update the DNN setting information, the DNN setting information updater 1212 may encode the flag information as a second value.

When the DNN setting information updater 1212 determines not to update the DNN setting information, the flag information may not be encoded. The first or second value may be 0 or 1, but the value is not limited thereto.

The DNN setting information updater 1212 may determine whether the second image is to be up-scaled by using predetermined DNN setting information of an AI up-scaling DNN or by using DNN setting information of the AI up-scaling DNN, which is updated using an original image as a training image. Herein, the terms "AI up-scaling DNN" and "up-scaling DNN" or "AI down-scaling DNN" and "down-scaling DNN" may be used interchangeably. The DNN setting information updater 1212 may determine DNN setting information based on at least some of at least one original image and determine whether the second image is to be up-scaled based on the predetermined DNN setting information of the AI up-scaling DNN or based on the DNN setting information of the AI up-scaling DNN, which is updated using an original image as a training image, by comparing, based on an RD cost, a result of performing AI down-scaling and AI up-scaling based on the determined DNN setting information with a result of performing AI down-scaling and AI up-scaling based on the predetermined DNN setting information.

The DNN setting information updater 1212 may encode flag information indicating whether the second image is to be up-scaled based on the predetermined DNN setting information of the AI up-scaling DNN or based on the DNN setting information of the AI up-scaling DNN, which is updated using the original image as a training image. When the flag information has a first value, the flag information may indicate that the second image is to be up-scaled by using the predetermined setting information of the AI up-scaling DNN, and when the flag information has a second value, the flag information may indicate that the second image is to be up-scaled by using the DNN setting information of the AI up-scaling DNN, which is updated using the original image as a training image. When the second image is to be up-scaled by using the predetermined setting information of the AI up-scaling DNN, the DNN setting information updater 1212 may not encode the flag information.

The DNN setting information updater 1212 may update DNN setting information of the AI up-scaling DNN based on at least one of a resolution of the original image or the first image or a bitrate of the image data.

For example, the DNN setting information updater 1212 may change a DNN structure by varying at least one of the number of convolutional layers, the number of filter kernels in each convolution layer, or a size of each filter kernel based on at least one of a resolution of the original image or the first image or a bitrate of the image data. The AI encoding apparatus 1200 may update DNN setting parameters by performing training of the up-scaling DNN based on the changed DNN structure. For example, a DNN structure may be changed to have 3 convolution layers, filter kernels of a 3×3 size, and 4 channels, and DNN setting information including setting parameters of the AI up-scaling DNN may be updated based on the configured DNN structure. The DNN structure may also be changed to include 4 convolution layers, filter kernels of a 3×3 size, and 8 channels, and the setting parameters of the AI up-scaling DNN may be updated based on the changed DNN structure. Furthermore, the DNN structure may be configured to include 5 convolution layers, filter kernels of a 5×5 size, and 8 channels, and the setting parameters of the AI up-scaling DNN may be updated based on the changed DNN structure. When joint training of the up-scaling DNN and the down-scaling DNN is performed by taking into account the same bitrate of image data and the same resolutions of the original image and the first image, the image data to be encoded may vary accordingly as the DNN structure changes. However, in the case of separate training of the up-scaling DNN, during which the first image that has undergone down-scaling remains selected even when the DNN structure changes, the image data may remain intact. Furthermore, in the case of separate training of the up-scaling DNN, as the DNN setting information is updated, the quality of the third image (145 of FIG. 1), which is an image obtained by an AI decoding apparatus (1300 of FIG. 13) after performing AI up-scaling, may be further improved.

Moreover, the DNN setting information updater 1212 may generate pieces of DNN setting information for a plurality of DNN structures by changing a DNN structure in various ways and may encode the pieces of DNN setting information for the plurality of DNN structures. In this case, the plurality of DNN structures may be DNN structures corresponding to the same bitrate of image data and the same resolutions of the original image and the first image. However, embodiments of the disclosure are not limited thereto, and the plurality of DNN structures may be DNN structures corresponding to various bitrates of image data and various resolutions of the original image and the first image.

Although it has been described with reference to FIG. 12 that the DNN setting information updater 1212 encodes the DNN setting information of the up-scaling DNN, embodiments of the disclosure are not limited thereto, and it will be understood by those of ordinary skill in the art that the DNN setting information updater 1212 may transmit the DNN setting information of the up-scaling DNN to a data processor 1232 and the data processor 1232 may perform the above-described encoding operation of the DNN setting information updater 1212.

The first encoder 1214 encodes the first image obtained by the AI down-scaler 1216 performing down-scaling.

As described above, the encoding may include a process of generating prediction data by predicting the first image, a process of generating residual data corresponding to a difference between the first image and the prediction data, a process of transforming the residual data in a spatial domain into a frequency domain component, a process of quantizing the residual data that has undergone the transformation into the frequency domain component, and a process of entropy-encoding the quantized residual data.

The data processor 1232 processes at least one of AI data or image data to be transmitted in a predefined format. For example, when the AI data and the image data need to be transmitted in the form of a bitstream, the data processor 1232 may process the AI data so that the AI data is represented in the form of a bitstream and transmit the AI data and the image data in the form of one bitstream via the communicator 1234. As another example, the data processor 1232 may process the AI data so that the AI data is represented in the form of a bitstream and respectively transmit a bitstream corresponding to the AI data and a bitstream corresponding to the image data via the communicator 1234. As another example, the data processor 1232 may process the AI data so that the AI data is represented as a frame or packet and transmit the image data in the form of a bitstream and AI data in the form of a frame or packet via the communicator 1234.

The communicator 1234 transmits AI encoding data generated as a result of the AI encoding via a network. The AI encoding data generated as a result of the AI encoding includes the image data and the AI data.

The image data and the AI data may be transmitted via a homogeneous or heterogeneous network.

The image data includes data generated as a result of the first encoding of the first image. The image data may include data generated based on pixel values in the first image, such as residual data that is a difference between the first image and the prediction data. Furthermore, the image data includes information used during the first encoding of the first image. For example, the image data may include mode information and information related to quantization parameters, which are used to perform the first encoding on the first image.

The AI data includes pieces of information that enable the AI decoding apparatus 1300 to perform AI up-scaling on the second image according to an up-scaling target corresponding to a down-scaling target of a first DNN (a down-scaling DNN). For example, the AI data may include difference information between the original image and the first image. Furthermore, the AI data may include information related to the first image. The information related to the first image may include information about at least one of a resolution of the first image, a bitrate of image data generated as a result of the first encoding of the first image, or a codec type used in the first encoding of the first image.

Figure 13:
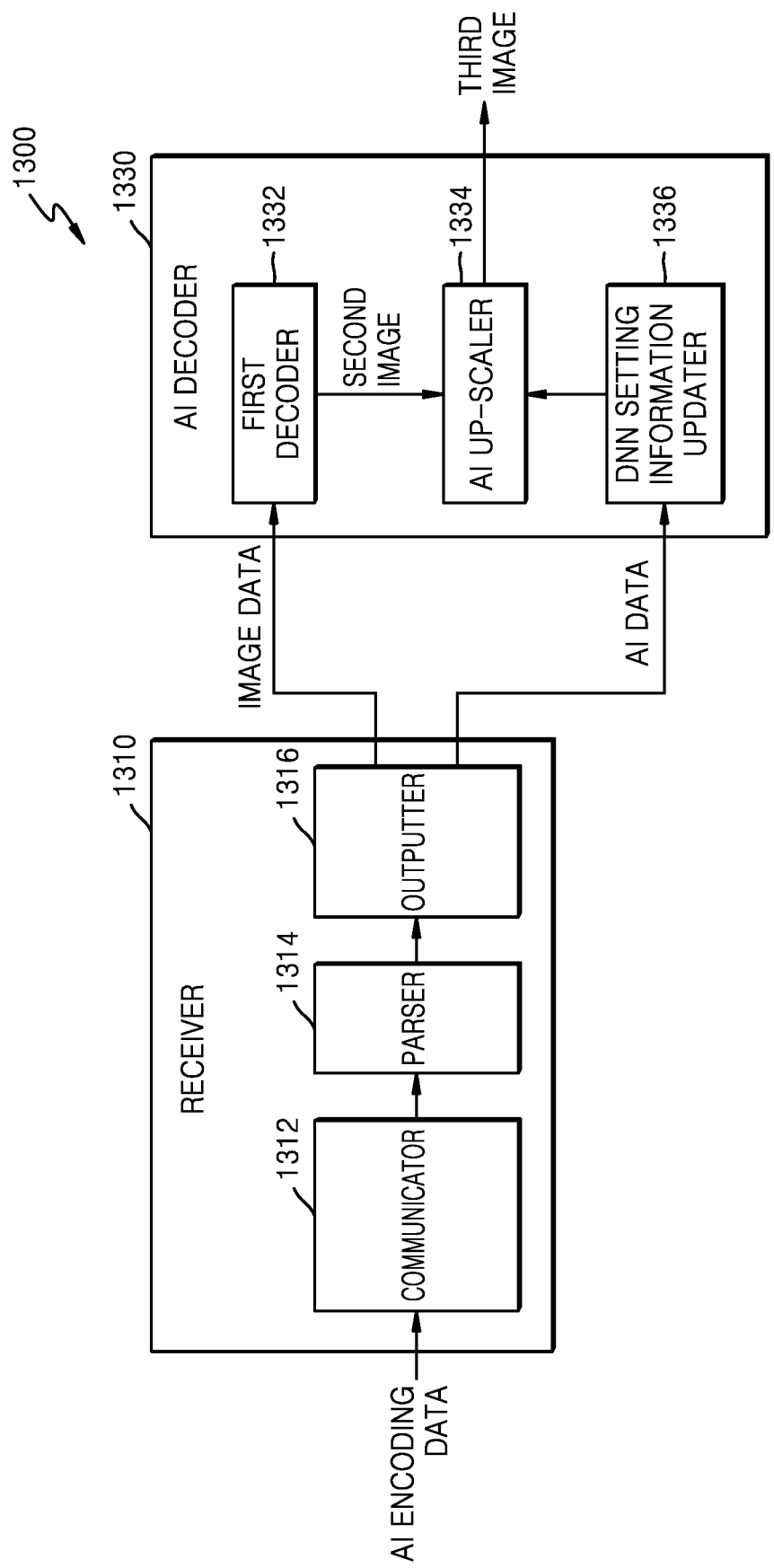
FIG. 13 is a block diagram of a configuration of an AI decoding apparatus according to an embodiment of the disclosure.

FIG. 13 is a block diagram of a configuration of the AI decoding apparatus according to an embodiment of the disclosure. Referring to FIG. 13, the AI decoding apparatus 1300 includes a receiver 1310 and an AI decoder 1330. The AI decoder 1330 includes a first decoder 1332, an AI up-scaler 1334, and a DNN setting information updater 1336.

The AI decoding apparatus 1300 may include a central processor that controls the receiver 1310 and the AI decoder 1330. Alternatively, the receiver 1310 and the AI decoder 1330 are operated by respective processors, and as the processors work closely together, the AI decoding apparatus 1300 may be completely operated. Alternatively, the receiver 1310 and the AI decoder 1330 may be controlled by an external processor.

The AI decoding apparatus 1300 may further include one or more data storages for storing data input to or output from the DNN setting information updater 1336, the AI up-scaler 1334, the first decoder 1332, and the receiver 1310. The AI decoding apparatus 1300 may further include a memory controller that controls input/output of data stored in a data storage.

To decode an image, the AI decoding apparatus 1300 may perform an image decoding operation including prediction by interworking with a built-in or external video decoding processor. According to an embodiment of the disclosure, the built-in video decoding processor of the AI decoding apparatus 1300 may implement a basic image decoding operation together with a CPU or GPU including an image decoding processing module as well as a separate processor.

The communicator 1312 receives AI encoding data including image data and AI data via a network. The image data includes information generated as a result of the first encoding of the first image, and the AI data includes DNN setting information of the up-scaling DNN.

The parser 1314 divides the AI-encoding data received via the communicator 1312 into the image data and the AI data and transmits the image data to the first decoder 1332 and the AI data to the AI up-scaler 1334 via the outputter 1316.

Because operations of the communicator 1312, the parser 1314, and the outputter 1316 of the AI decoding apparatus 1300 of FIG. 13 respectively correspond to those of the communicator 212, the parser 214, and the outputter 216 of the AI decoding apparatus 200 described with reference to FIG. 2, redundant descriptions are omitted.

The AI up-scaler 1334 obtains a third image (e.g., 145 of FIG. 1) by performing AI up-scaling on a second image via a second DNN (an up-scaling DNN). The third image is an image having a higher resolution than that of the second image. Because the AI up-scaling by the AI up-scaler 1334 has been described above, a redundant description thereof is omitted.

The DNN setting information updater 1336 may be provided separately from the AI up-scaler 1334, but the DNN setting information updater 1336 not limited thereto, and the DNN setting information updater 1336 may be included in the AI up-scaler 1334.

The DNN setting information updater 1336 may update, based on DNN setting information, DNN setting information of the AI up-scaling DNN corresponding to an AI down-scaling DNN.

The DNN setting information updater 1336 may obtain AI data related to AI down-scaling of the at least one original image to the first image. The DNN setting information updater 1336 may obtain DNN setting information for performing AI up-scaling, based on AI data. The DNN setting information updater 1336 may update DNN setting information based on the DNN setting information obtained based on the AI data.

In this case, the DNN setting information may be DNN information that is updated for performing AI up-scaling of at least one second image corresponding to at least one original image via joint training of the up-scaling DNN and the down-scaling DNN used for AI down-scaling of the at least one original image or separate training of the up-scaling DNN by using the at least one original image as a training image.

It has been described above with reference to FIG. 12 that the AI encoding apparatus 1200 updates DNN setting information for performing AI up-scaling of the at least one second image corresponding to the at least one original image via joint training of the up-scaling DNN and the down-scaling DNN used for AI down-scaling of the at least one original image or separate training of the up-scaling DNN by using the at least one original image as a training image. Because the AI decoding apparatus 1300 uses parameters of the AI up-scaling DNN, which are updated using an original image as a training image, instead of parameters of the AI up-scaling DNN previously determined by using a separately provided image as a training image, the AI decoding apparatus 1300 may optimally perform AI up-scaling on the second image.

The DNN setting information may include at least one of the number of convolution layers, the number of filter kernels in each of the convolution layers, or information about a size of each filter kernel.

Furthermore, the DNN setting information may include weights of at least one filter kernel in at least one convolutional layer constituting the up-scaling DNN. Embodiments of the disclosure are not limited thereto, and the DNN setting information may include a bias for at least one output channel.

The DNN setting information updater 1336 may obtain a first flag based on AI data and determine, based on the first flag, whether the second image is to be up-scaled by using predetermined DNN setting information of the AI up-scaling DNN or by using DNN setting information of the AI up-scaling DNN, which is updated using an original image as a training image. The first flag may be a flag indicating that the second image is to be up-scaled by using the predetermined DNN setting information of the AI up-scaling DNN or based on the DNN setting information of the AI up-scaling DNN, which is updated using the original image as a training image. When the first flag has a first value, the first flag may indicate that the second image is to be up-scaled by using predetermined DNN setting information of the AI up-scaling DNN trained as described above with reference to FIG. 9, wherein the predetermined DNN setting information is stored in the AI decoding apparatus 1300.

In this case, the DNN setting information updater 1336 may determine a piece of DNN setting information of an AI up-scaling DNN from among pieces of predetermined DNN setting information of a plurality of AI up-scaling DNNs and determine the piece of DNN setting information of the AI up-scaling DNN as DNN setting information for performing AI up-scaling on the second image.

When the first flag has a second value, the first flag may indicate that the second image is to be up-scaled based on DNN setting information of the AI up-scaling DNN, which is updated using an original image as a training image.

In this configuration, the DNN setting information updater 1336 may determine the DNN setting information of the AI up-scaling DNN, which is updated using the original image as a training image, as DNN setting information for performing AI up-scaling on the second image.

The first or second value may be 0 or 1, but the value is not limited thereto.

In this configuration, the DNN setting information of the AI up-scaling DNN, which is updated using the original image as a training image, may be generated via model compression. The AI encoding apparatus 1200 may encode DNN setting information of an up-scaling DNN, which is obtained via joint training of a down-scaling DNN and the up-scaling DNN or separate training of the up-scaling DNN by using an original image as a training image, and the DNN setting information updater 1336 may obtain information about the encoded DNN setting information.

For example, the DNN setting information updater 1336 may obtain information about a structure of an up-scaling DNN (e.g., the number of convolution layers, the number of filter kernels in each convolution layer, and information about a size of each filter kernel). The DNN setting information updater 1336 may obtain information about the number of convolution layers in an up-scaling DNN, the number of filter kernels in each convolution layer, and a size of each filter kernel and update the number of convolution layers in the up-scaling DNN, the number of filter kernels in each convolution layer, and the size of each filter kernel based on the obtained information.

The DNN setting information updater 1336 may obtain pieces of DNN setting information for a plurality of up-scaling DNN structures, determine a DNN structure from among the plurality of up-scaling DNN structures based on at least one of a bitrate of the image data or a resolution of the original image or the first image, and update the number of convolutional layers in an up-scaling DNN, the number of filter kernels in each convolution layer, and a size of each filter kernel based on DNN setting information corresponding to the determined DNN structure.

Alternatively, the DNN setting information updater 1336 may obtain pieces of DNN setting information for a plurality of DNN structures, determine one DNN structure from among the plurality of DNN structures based on at least one available DNN structure, and update the number of convolutional layers in an up-scaling DNN, the number of filter kernels in each convolution layer, and a size of each filter kernel based on DNN setting information corresponding to the determined DNN structure. In this case, the at least one available DNN structure may be determined according to the capability of a processor through which the AI up-scaler 1334 is implemented in the AI decoding apparatus 1300. For example, the DNN setting information updater 1336 may obtain information about a weight residual or a bias residual in the up-scaling DNN. In this case, the weight residual or bias residual may mean a difference between a weight or a bias for performing up-scaling via the up-scaling DNN in an immediately preceding period unit and a weight or a bias for performing up-scaling via the up-scaling DNN in a current period unit. In this case, encoded information about the weight residual or the bias residual in the up-scaling DNN is information encoded using various entropy encoding techniques such as Differential Pulse Code Modulation (DPCM), Run Length Coding (RLC), and Huffman coding. The DNN setting information updater 1336 may obtain information about the weight residual or the bias residual in the up-scaling DNN by performing an inverse encoding operation.

The DNN setting information updater 1336 may update a weight or a bias for performing up-scaling via the up-scaling DNN in the current period unit by adding a weight residual or a bias residual in the up-scaling DNN to a weight or a bias for performing up-scaling via the up-scaling DNN in the immediately preceding period unit. Embodiments of the disclosure are not limited thereto, and the DNN setting information updater 1336 may perform entropy decoding on encoded DNN setting information based on a context model. For example, the DNN setting information updater 1336 may generate a context model based on DNN setting information of the up-scaling DNN fora preceding period unit and perform entropy decoding on encoded DNN setting information of the up-scaling DNN by using the generated context model.

The context model may be updated each time weights or a bias of a filter kernel in the up-scaling DNN for the current period unit is decoded, and information about next weights or biases of a filter kernel in the up-scaling DNN for the current period unit may be entropy-decoded based on the updated context model. Examples of entropy decoding based on contexts may include range coding, arithmetic decoding, and Huffman decoding, but the entropy decoding is not limited thereto. The context model may be determined for the entire up-scaling DNN, but the context model is not limited thereto, and the context model may be determined for each convolutional layer, for at least one filter kernel corresponding to one output channel in a convolutional layer, and for each filter kernel in the convolutional layer.

The DNN setting information updater 1336 may decode weight information or bias information for all layers of the up-scaling DNN and update weights or biases in all the layers based on the decoded weight information or bias information, but the DNN setting information updater 1336 is not limited thereto. The DNN setting information updater 1336 may decode weight information or bias information for some of the layers and update weights or biases in the corresponding layers. Alternatively, the DNN setting information updater 1336 may decode weight information or bias information of some filter kernels in a layer and update weights or biases in the corresponding filter kernels in the layer. For example, the DNN setting information updater 1336 may decode weight information/bias information in a last layer of the up-scaling DNN and update weights or biases in the last layer.

The DNN setting information updater 1336 may decode weight residual information or bias residual information indicating a difference between a weight or a bias of all or some of the filter kernels in all or some of the convolution layers in the up-scaling DNN before the weight or bias is updated and a weight or a bias of all or some of the filter kernels in all or some of the convolution layers in the up-scaling DNN after the weight or bias is updated and then update weights or biases of all or some of the filter kernels in all or some of the convolution layers based on the decoded weight residual information or bias residual information. The DNN setting information updater 1336 may decode weight residual information and obtain a weight residual by performing inverse frequency transformation on the decoded weight residual information.

The DNN setting information updater 1336 may perform entropy decoding on information about weights or biases in an up-scaling DNN used for performing AI up-scaling on the second image based on a context model, but the DNN setting information updater 1336 is not limited thereto. The DNN setting information updater 1336 may entropy-decode, based on the context model, a difference between a weight or a bias updated for a current period unit and a weight or a bias used for up-scaling in an immediately preceding period unit. In this case, the context model may be based on information about a difference between weights or biases determined for up-scaling at least one of an immediately preceding image or an image preceding the immediately preceding image. The encoded DNN setting information may be generated by entropy-encoding weight information or bias information in combination with a model compression technique (e.g., pruning or quantization).

The DNN setting information updater 1336 may periodically update DNN setting information of the up-scaling DNN. For example, the DNN setting information updater 1336 may decode encoded DNN setting information for each GOP, each IRAP period (e.g., each IDR picture period), each sequence, or each unit of a preset number of frames, and update DNN setting information of the up-scaling DNN based on the decoded DNN setting information.

The DNN setting information updater 1336 may update DNN setting information whenever necessary. For example, the DNN setting information updater 1336 may decode first flag information encoded for each preset period, determine whether to update DNN setting information of the up-scaling information based on the decoded first flag information, and update the DNN setting information when the DNN setting information updater 1336 determines to update the DNN setting information. In this case, the encoded first flag information may be flag information regarding whether the DNN setting information of the up-scaling DNN is to be updated.

When the first flag information has a first value, the DNN setting information updater 1336 may determine not to update the DNN setting information of the up-scaling DNN.

When the first flag information has a second value, the DNN setting information updater 1336 may determine to update the DNN setting information of the up-scaling DNN.

The first or second value may be 0 or 1, but the value is not limited thereto.

The DNN setting information updater 1336 may parse the first flag information for each preset period and when the first flag information is not parsed for each preset period, and determine not to update DNN setting information of the up-scaling DNN.

The DNN setting information updater 1336 may decode encoded second flag information and determine, based on the decoded second flag information, whether a second image is to be up-scaled by using predetermined DNN setting information of an AI up-scaling DNN or by using DNN setting information of the AI up-scaling DNN, which is updated using an original image as a training image. In this case, the encoded second flag information may be flag information indicating whether the second image is to be up-scaled based on the predetermined DNN setting information of the AI up-scaling DNN or based on the DNN setting information of the AI up-scaling DNN, which is updated using the original image as a training image.

When the second flag information has a first value, the DNN setting information updater 1336 may determine that the second image is to be up-scaled by using the predetermined DNN setting information of the up-scaling DNN.

When the second flag information has a second value, the DNN setting information updater 1336 may determine that the second image is to be up-scaled by using the DNN setting information of the up-scaling DNN, which is updated using the original image as a training image.

The DNN setting information updater 1336 may parse the second flag information for each preset period and when the second flag information is not parsed for each preset period, and determine that the second image is to be up-scaled by using the predetermined DNN setting information of the up-scaling DNN.

Although it has been described above that the DNN setting information updater 1336 decodes encoded DNN setting information of the up-scaling DNN, embodiments of the disclosure are not limited thereto, and it will be understood by those of ordinary skill in the art that the parser 1314 may perform the above-described decoding operation of the DNN setting information updater 1336 and transmit the decoded DNN setting information to the DNN setting information updater 1336 via the outputter 1316.

The AI up-scaler 1334 may generate a third image by performing up-scaling on the second image via the up-scaling DNN operating according to the DNN setting information. The DNN setting information may be received from the DNN setting information updater 1336.

Figure 14A:
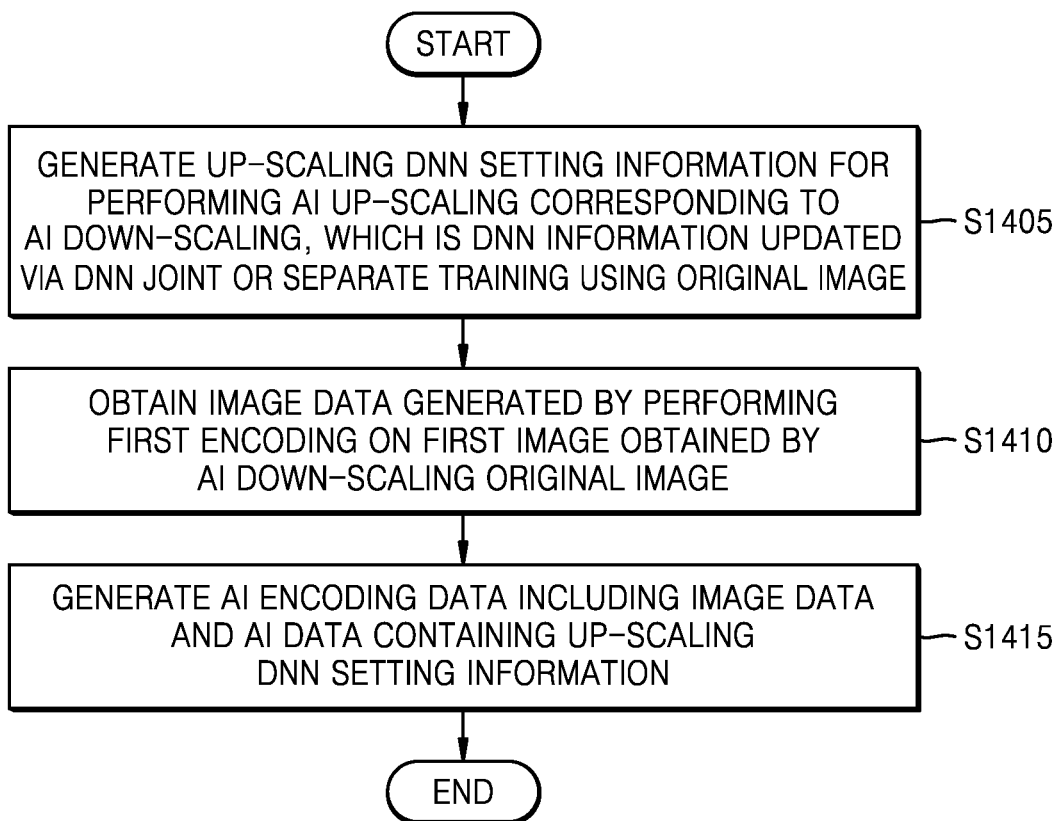
FIG. 14A is a flowchart of an AI encoding method according to an embodiment of the disclosure.

FIG. 14A is a flowchart of an AI encoding method according to an embodiment of the disclosure.

The AI encoding apparatus 1200 generates up-scaling DNN setting information for performing AI up-scaling corresponding to AI down-scaling, which is DNN information updated via DNN joint or separate training using an original image (operation S1405). A process, performed by the AI encoding apparatus 1200, of generating DNN setting information updated via DNN joint or separate training using an original image will be described in detail below with reference to FIGS. 16A, 16B, and 17A.

The AI encoding apparatus 1200 may obtain image data generated by performing first encoding on a first image obtained by performing AI down-scaling on the original image (operation S1410).

The AI encoding apparatus 1200 transmits image data and AI data including up-scaling DNN setting information (operation S1415).

Figure 14B:
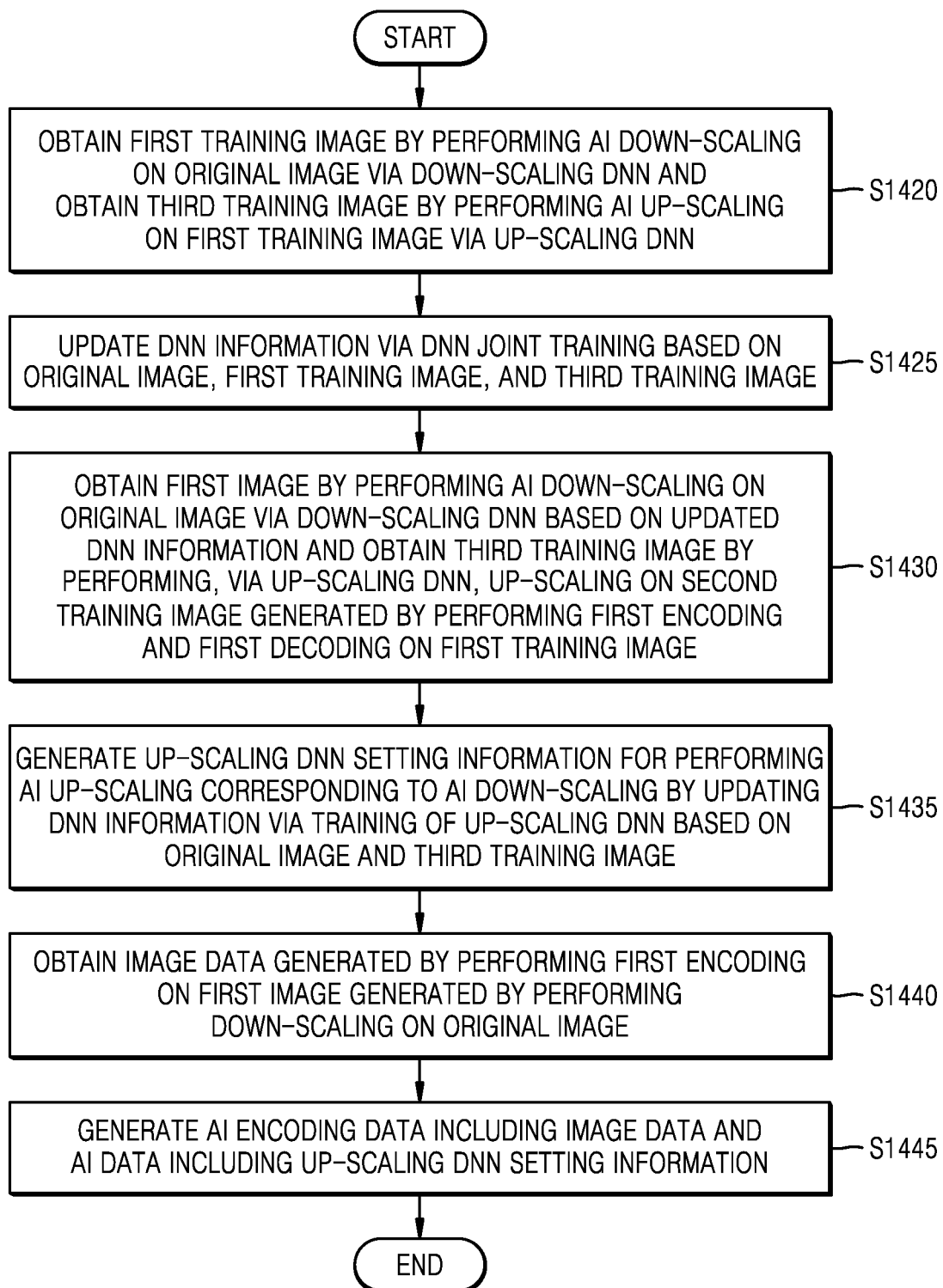
FIG. 14B is a flowchart of an AI encoding method via DNN joint training based on an original image, according to an embodiment of the disclosure.

FIG. 14B is a flowchart of an AI encoding method via DNN joint training based on an original image, according to an embodiment of the disclosure.

The AI encoding apparatus 1200 may obtain a first training image by performing AI down-scaling on an original image via a down-scaling DNN and obtain a third training image by performing AI up-scaling on the first training image via an up-scaling DNN (operation S1420).

The AI encoding apparatus 1200 may update DNN information via DNN joint training based on the original image, the first training image, and the third training image (operation S1425).

The AI encoding apparatus 1200 may obtain a first image by performing AI down-scaling on original image via a down-scaling DNN based on the updated DNN information and obtain the third training image by performing, via an up-scaling DNN, up-scaling on a second training image generated by performing first encoding and first decoding on the first training image (operation S1430).

The AI encoding apparatus 1200 may generate up-scaling DNN setting information for performing AI up-scaling corresponding to AI down-scaling by updating the DNN information via training of the up-scaling DNN based on the original image and the third training image (operation S1435).

The AI encoding apparatus 1200 may obtain image data generated by performing first encoding on the first image generated by performing the down-scaling on the original image (operation S1440). In this case, the AI down-scaling may be performed based on DNN information set via DNN joint training using the original image.

The AI encoding apparatus 1200 may generate AI encoding data including the image data and AI data containing the up-scaling DNN setting information (operation S1445).

A process, performed by the AI encoding apparatus 1200, of generating DNN setting information updated via DNN joint training using an original image will be described in detail below with reference to FIGS. 16A and 16B.

Figure 14C:
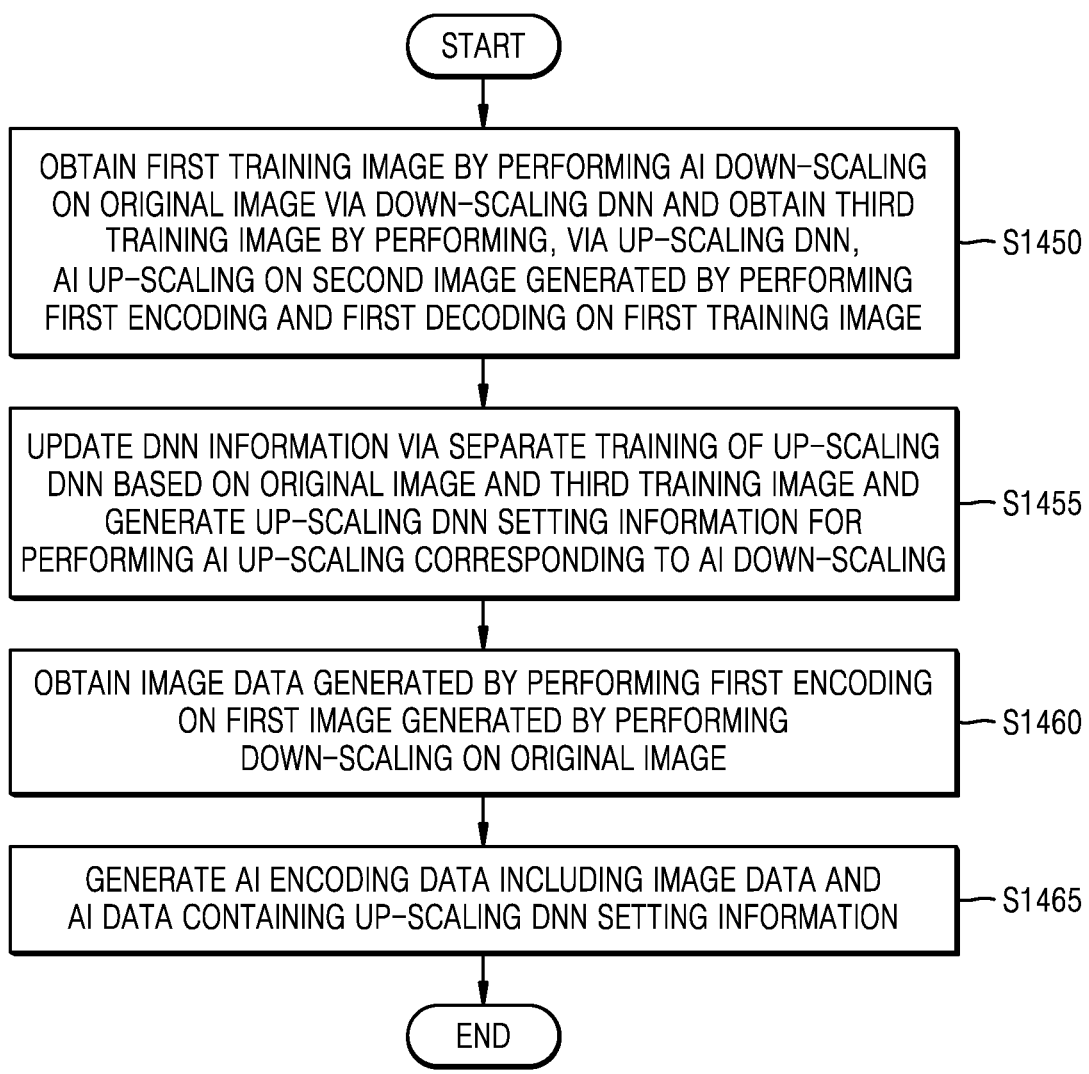
FIG. 14C is a flowchart of an AI encoding method via DNN separate training based on an original image, according to an embodiment of the disclosure.

FIG. 14C is a flowchart of an AI encoding method via DNN separate training based on an original image, according to an embodiment of the disclosure.

The AI encoding apparatus 1200 may obtain a first training image by performing AI down-scaling on an original image via a down-scaling DNN and obtain a third training image by performing, via an up-scaling DNN, AI up-scaling on a second image generated by performing first encoding and first decoding on the first training image (operation 1450).

The AI encoding apparatus 1200 may update DNN information via separate training of the up-scaling DNN based on the original image and the third training image and generate up-scaling DNN setting information for performing AI up-scaling corresponding to AI down-scaling (operation S1455).

The AI encoding apparatus 1200 may obtain image data generated by performing first encoding on a first image generated by performing down-scaling on the original image (operation S1460).

The AI encoding apparatus 1200 may generate AI encoding data including the image data and AI data containing the up-scaling DNN setting information (operation S1465).

A process, performed by the AI encoding apparatus 1200, of generating DNN setting information updated via DNN separate training using an original image will be described in detail below with reference to FIG. 17A.

Figure 15:
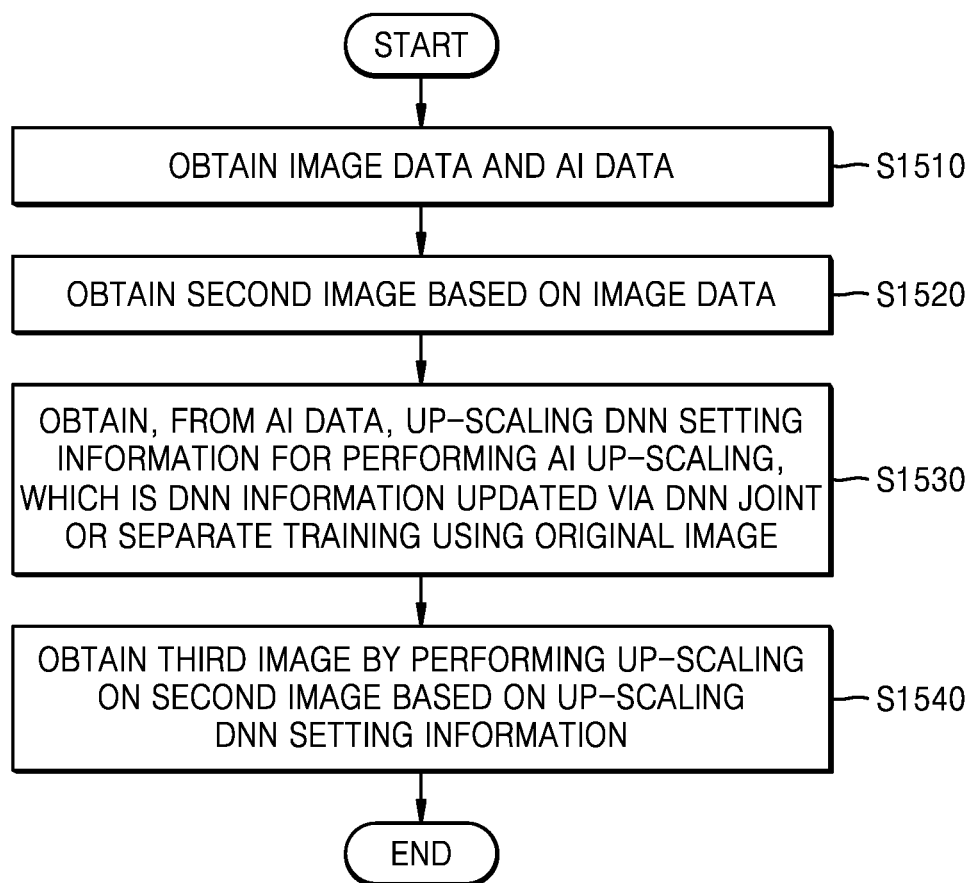
FIG. 15 is a flowchart of an AI decoding method according to an embodiment of the disclosure.

FIG. 15 is a flowchart of an AI decoding method according to an embodiment of the disclosure.

The AI decoding apparatus 1300 obtains image data and AI data (operation S1510).

The AI decoding apparatus 1300 obtains a second image based on the image data (operation S1520). The AI decoding apparatus 1300 may obtain the second image by performing first decoding on the image data.

The AI decoding apparatus 1300 obtains, from AI data, up-scaling DNN setting information for performing AI up-scaling, which is DNN information updated via DNN joint or separate training using the original image (operation S1530).

A process, performed by the AI decoding apparatus 1300, of obtaining, from AI data, up-scaling DNN setting information for performing AI up-scaling, which is DNN information updated via DNN joint or separate training using an original image, will be described in detail below with reference to FIGS. 16C and 17B.

The AI decoding apparatus 1300 obtains a third image by performing up-scaling on the second image based on the up-scaling DNN setting information (operation S1540).

Figure 16A:
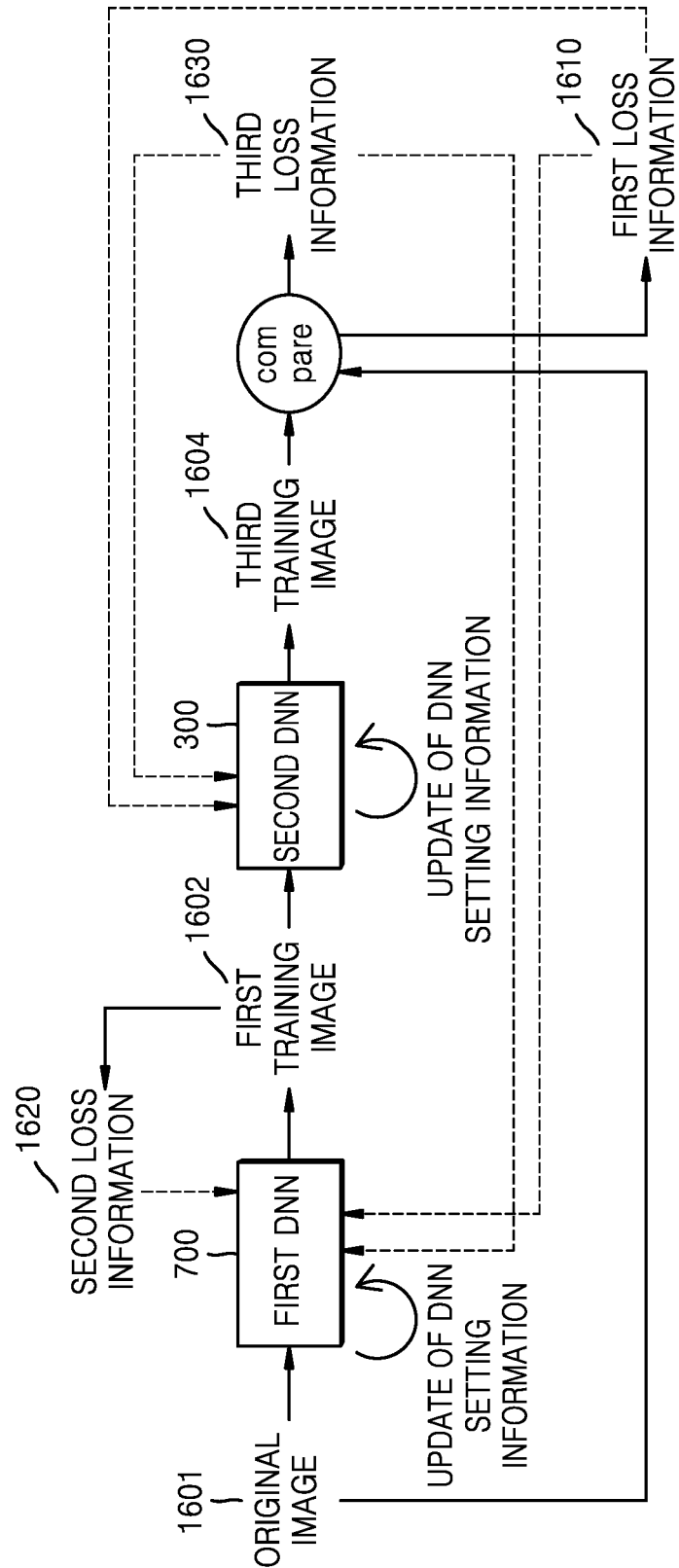
FIG. 16A is a diagram for describing, as a first stage of joint training, a process, performed by an AI encoding apparatus, of determining pieces of optimal setting information of a down-scaling DNN and an up-scaling DNN via joint training of the down-scaling DNN and the up-scaling DNN by using an original image as a training image, according to an embodiment of the disclosure.

FIG. 16A is a diagram for describing, as a first stage of joint training, a process, performed by the AI encoding apparatus 1200, of determining pieces of optimal DNN setting information of a down-scaling DNN and an up-scaling DNN via joint training of the down-scaling DNN and the up-scaling DNN by using an original image as a training image, according to another embodiment of the disclosure.

Referring to FIG. 16A, the AI encoding apparatus 1200 may generate a first training image 1602 as a result of performing AI down-scaling based on a first DNN 700 by using an original image 1601 as a training image. In this case, the original image 1601 may be frames in a current GOP unit, a current IRAP period unit, a current sequence unit, or a current unit of a predetermined number of frames to be encoded into one or more frames, but the original image 1601 is not limited thereto. Furthermore, initial DNN setting information of the first DNN 700 and initial DNN setting information of the second DNN 300 may be respectively used for down-scaling and up-scaling an image in an immediately preceding period unit. Alternatively, the initial DNN setting information of the first or second DNN 700 or 300 may be one of a plurality of pieces of predetermined DNN setting information or DNN setting information set as default.

However, embodiments of the disclosure are not limited thereto, and initial weights in the first and second DNNs 700 and 300 may be values obtained with random sampling to follow a particular probability distribution. Initial biases in the first and second DNNs 700 and 300 may be determined to be zero.

The AI encoding apparatus 1200 may generate second loss information 1620 based on the complexity of the first training image 1602. In this case, the second loss information 1620 may correspond to the second loss information described above with reference to FIG. 12.

The AI encoding apparatus 1200 may generate a third training image 1604 as a result of performing AI up-scaling based on the second DNN 300 by using the first training image 1602.

The AI encoding apparatus 1200 may generate first loss information 1610 and third loss information 1630, each corresponding to a result of comparing information related to the original image 1601 with information related to the third training image 1604. In this case, the first loss information 1610 and the third loss information 1630 may respectively correspond to the first loss information and the third loss information described above with reference to FIG. 12.

The AI encoding apparatus 1200 may determine a loss value $Loss_{DS}$ based on the first loss information 1610, the second loss information 1620, and the third loss information 1630 according to Equation 6 below.

$$Loss_{DS}=a*\text{FIRST LOSS INFORMATION}+b*\text{SECOND LOSS INFORMATION}+c*\text{THIRD LOSS INFORMATION} \quad [\text{Equation 6}]$$

The AI encoding apparatus 1200 may update pieces of DNN setting information of the first DNN 700 and the second DNN 300 based on the loss value $Loss_{DS}$.

The AI encoding apparatus 1200 may perform joint training of the first and second DNNs 700 and 300 by iteratively repeating the above-described process and determine optimal DNN setting information of the first and second DNNs 700 and 300 via joint training based on the loss value $Loss_{DS}$.

Figure 16B:
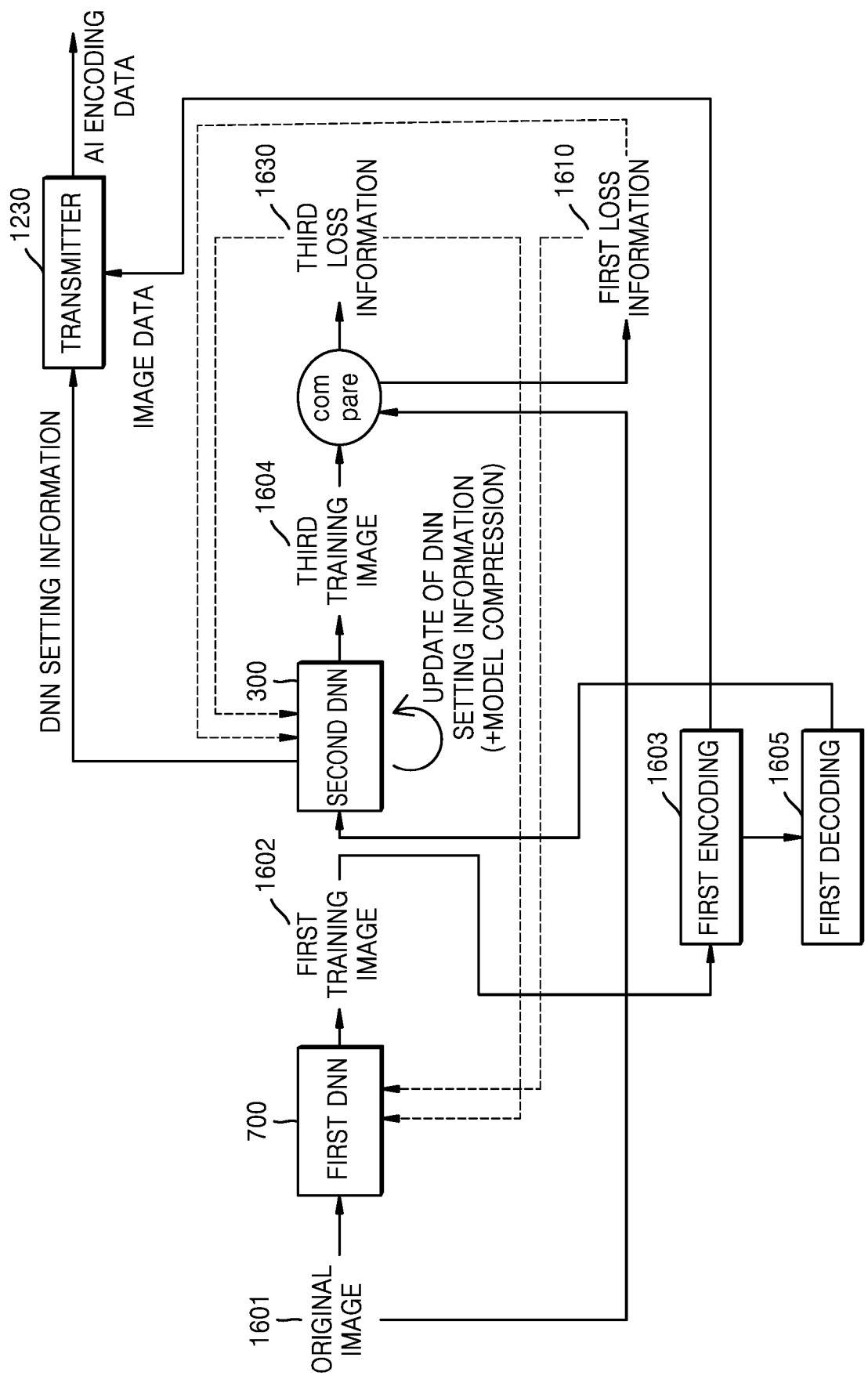
FIG. 16B is a diagram for describing, as a second stage of joint training, a process, performed by an AI encoding apparatus, of selecting the setting information of the down-scaling DNN, which is determined according to the process illustrated in FIG. 16A, determining optimal setting information of an up-scaling DNN via separate training of the up-scaling DNN, and generating AI encoding data including optimal setting information of the up-scaling DNN, according to an embodiment of the disclosure.

FIG. 16B is a diagram for describing, as a second stage of joint training, a process by which the AI encoding apparatus 1200 selects DNN setting information of a down-scaling DNN, which is determined according to the process illustrated in FIG. 16A, determines optimal DNN setting information of an up-scaling DNN via separate training of the up-scaling DNN, and transmits the optimal DNN setting information of the up-scaling DNN through a bitstream, according to an embodiment of the disclosure.

Referring to FIG. 16B, the AI encoding apparatus 1200 selects the optimal DNN setting information determined via the joint training of the first and second DNNs 700 and 300 as described above with reference to FIG. 16A. In this case, initial DNN setting information of the second DNN 300 may be determined based on the optimal DNN setting information of the second DNN 300 determined via the joint training of the first and second DNNs 700 and 300, but the initial DNN setting information is not limited thereto. An initial weight in the second DNN 300 may be a value randomly sampled based on a particular probability distribution, and an initial bias in the second DNN 300 may be 0.

The AI encoding apparatus 1200 may generate a first training image 1602 as a result of performing AI down-scaling based on the first DNN 700 by using an original image 1601 as a training image. The AI encoding apparatus 1200 may perform first encoding 1603 and first decoding 1605 on the first training image 1602. The AI encoding apparatus 1200 may generate a third training image 1604 by performing AI up-scaling on an image generated via the first decoding 1605 based on the second DNN 300. The AI encoding apparatus 1200 may generate first loss information 1610 and third loss information 1630, each corresponding to a result of comparing image information related to the original image 1601 with image information related to the third training image 1604.

The AI encoding apparatus 1200 may determine a loss value $Loss_{US}$ based on the first loss information 1610 and the third loss information 1630 according to Equation 7 below.

$$Loss_{US}=d*\text{FIRST LOSS INFORMATION}+e*\text{THIRD LOSS INFORMATION} \quad [\text{Equation 7}]$$

The AI encoding apparatus 1200 may update DNN setting information of the second DNN 300 based on the loss value $Loss_{US}$. In this case, the DNN setting information of the second DNN 300 may be updated via model compression.

The AI encoding apparatus 1200 may perform separate training of the second DNN 300 by repeating the above-described process and determine optimal DNN setting information of the second DNN 300 via separate training based on the loss value $Loss_{US}$.

The AI encoding apparatus 1200 may encode the determined optimal DNN setting information of the second DNN 300, and the transmitter 1230 of the AI encoding apparatus 1200 may generate AI encoding data including the encoded DNN setting information and image data generated via the first encoding 1603. In this case, the DNN setting information may include weight residual information or bias residual information of the second DNN 300. Furthermore, the AI encoding data may be represented in the form of a bitstream.

Figure 16C:
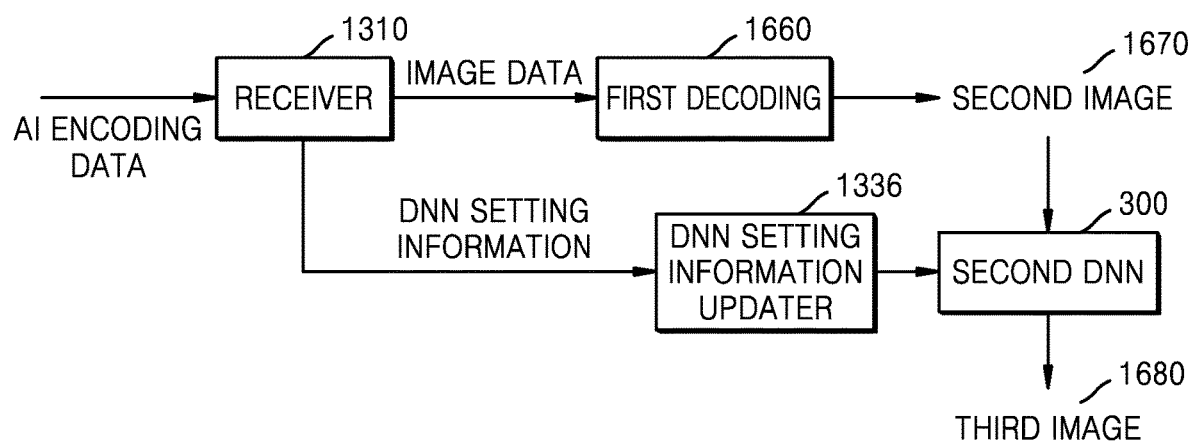
FIG. 16C is a diagram of a process, performed by an AI decoding apparatus, of performing AI up-scaling on a second image via an up-scaling DNN based on setting information of the up-scaling DNN, which is included in AI encoding data, according to an embodiment of the disclosure.

FIG. 16C is a diagram for describing a process by which the AI decoding apparatus 1300 performs AI up-scaling on a second image via an up-scaling DNN based on DNN setting information of the up-scaling DNN, which is included in AI encoding data, according to an embodiment of the disclosure.

As described above with reference to FIG. 16B, the AI encoding apparatus 1200 may generate AI encoding data.

Referring to FIG. 16C, the receiver 1310 of the AI decoding apparatus 1300 receives AI encoding data.

As described above, the AI encoding data may be represented as a bitstream. The receiver 1310 of the AI decoding apparatus 1300 obtains image data and DNN setting information from the AI encoding data. The DNN setting information updater 1336 of the AI decoding apparatus 1300 may configure the second DNN 300 based on the DNN setting information. The AI decoding apparatus 1300 may obtain the image data from the AI encoding data and generate a second image 1670 by performing first decoding 1660 on the image data.

The AI decoding apparatus 1300 may generate a third image 1680 by up-scaling the second image 1670 via the second DNN 300 based on the DNN setting information. In this case, because the DNN setting information is DNN setting information of the second DNN 300 optimized using an original image as a training image as described above with reference to FIGS. 16A and 16B, a quality of the third image 1680 may be improved compared to a quality of a third image generated by up-scaling a second image based on DNN setting information of a second DNN, which is predetermined based on a training image separately provided by the AI encoding apparatus 1200 and the AI decoding apparatus 1300.

Figure 17A:
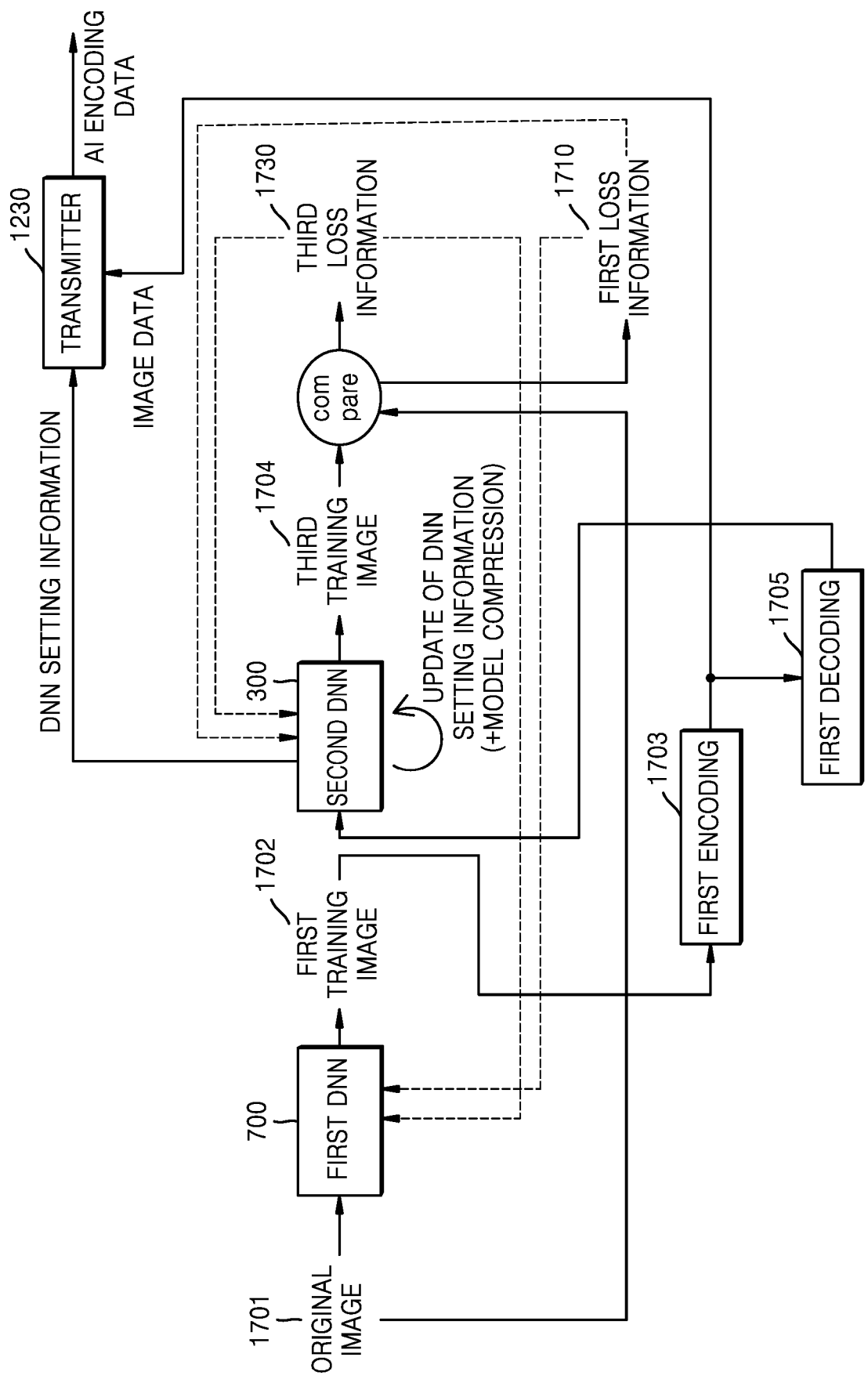
FIG. 17A is a diagram for describing a process, performed by an AI encoding apparatus, of selecting setting information of a down-scaling DNN, determining optimal DNN setting information of an up-scaling DNN via separate training of the up-scaling DNN, and generating AI encoding data including optimal DNN setting information of the up-scaling DNN, according to an embodiment of the disclosure.

FIG. 17A is a diagram for describing a process by which the AI encoding apparatus selects DNN setting information of a down-scaling DNN, determines optimal DNN setting information of an up-scaling DNN via separate training of the up-scaling DNN, and transmits the optimal DNN setting information of the up-scaling DNN in a bitstream, according to an embodiment of the disclosure.

Referring to FIG. 17A, the AI encoding apparatus 1200 selects weights of the first DNN 700. In this case, selected DNN setting information of the first DNN 700 may be setting information used for down-scaling an original image in an immediately preceding period unit. However, embodiments of the disclosure are not limited thereto, and the DNN setting information of the first DNN 700 may be one of a plurality of pieces of predetermined DNN setting information or DNN setting information set as default.

Moreover, initial DNN setting information of the second DNN 300 may be DNN setting information used for up-scaling an original image in an immediately preceding unit. However, embodiments of the disclosure are not limited thereto, and an initial weight in the second DNN 300 may be a value randomly sampled based on a particular probability distribution, and an initial bias in the second DNN 300 may be 0.

The AI encoding apparatus 1200 may generate a first training image 1702 as a result of performing AI down-scaling based on the first DNN 700 by using an original image 1701 as a training image. The AI encoding apparatus 1200 may perform first encoding 1703 and first decoding 1705 on the first training image 1702. The AI encoding apparatus 1200 may generate a third training image 1704 by performing AI up-scaling on an image generated via the first decoding 1705 based on the second DNN 300. The AI encoding apparatus 1200 may generate first loss information 1710 and third loss information 1730, each corresponding to a result of comparing image information related to the original image 1701 with image information related to the third training image 1704.

The AI encoding apparatus 1200 may determine a loss value $Loss_{US}$ based on the first loss information 1710 and the third loss information 1730 according to Equation 8 below.

$$Loss_{US}=d*\text{FIRST LOSS INFORMATION}+e*\text{THIRD LOSS INFORMATION} \quad \text{[Equation 8]}$$

The AI encoding apparatus 1200 may update DNN setting information of the second DNN 300 based on the loss value $Loss_{US}$. In this case, the DNN setting information of the second DNN 300 may be updated via model compression.

The AI encoding apparatus 1200 may perform separate training of the second DNN 300 by repeating the above-described process and determine optimal DNN setting information of the second DNN 300 via separate training based on the loss value $Loss_{US}$.

The AI encoding apparatus 1200 may encode the determined optimal DNN setting information of the second DNN 300, and the transmitter 1230 of the AI encoding apparatus 1200 may generate AI encoding data including the encoded DNN setting information and image data generated via the first encoding 1703. In this case, the DNN setting information may include weight residual information or bias residual information of the second DNN 300.

Figure 17B:
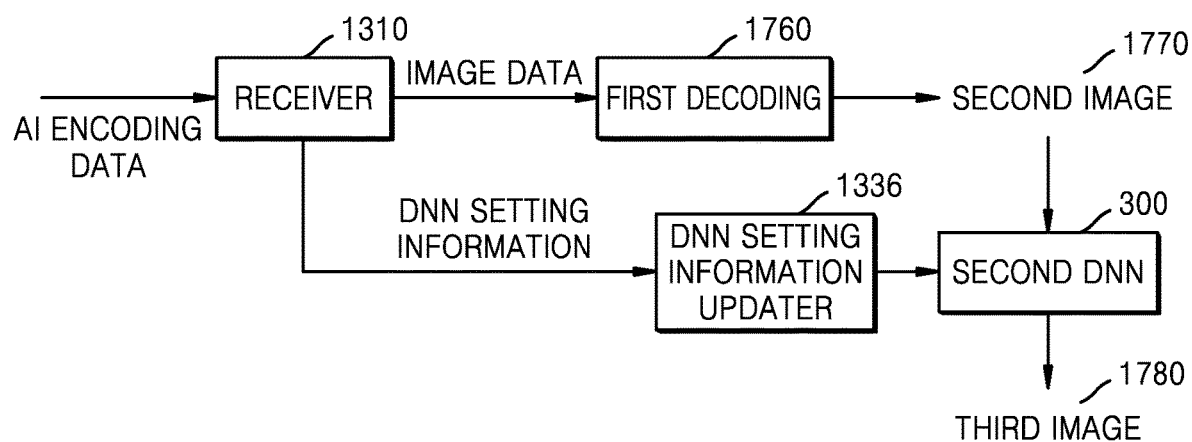
FIG. 17B is a diagram for describing a process, performed by an AI decoding apparatus, of performing AI up-scaling on a second image via an up-scaling DNN based on DNN setting information of the up-scaling DNN, which is included in AI encoding data, according to an embodiment of the disclosure.

FIG. 17B is a diagram for describing a process, performed by the AI decoding apparatus 1300, of performing AI up-scaling on a second image via an up-scaling DNN based on DNN setting information of the up-scaling DNN, which is included in AI encoding data, according to an embodiment of the disclosure.

As described above with reference to FIG. 17A, the AI encoding apparatus 1200 may generate AI encoding data.

Referring to FIG. 17B, the receiver 1310 of the AI decoding apparatus 1300 receives AI encoding data. As described above, the AI encoding data may be represented as a bitstream. The receiver 1310 of the AI decoding apparatus 1300 obtains image data and DNN setting information from the AI encoding data. The DNN setting information updater 1336 of the AI decoding apparatus 1300 may determine the second DNN 300 based on the DNN setting information.

The AI decoding apparatus 1300 may generate a second image 1770 by performing first decoding 1760 on the image data. The AI decoding apparatus 1300 may generate a third image 1780 by up-scaling the second image 1770 via the second DNN 300 based on the DNN setting information. In this case, because the DNN setting information is DNN setting information of the second DNN 300 optimized using an original image as a training image as described above with reference to FIG. 17A, a quality of the third image 1780 may be improved compared to a quality of a third image generated by up-scaling a second image based on DNN setting information of a second DNN, which is predetermined based on a separately provided training image.

Figure 18:
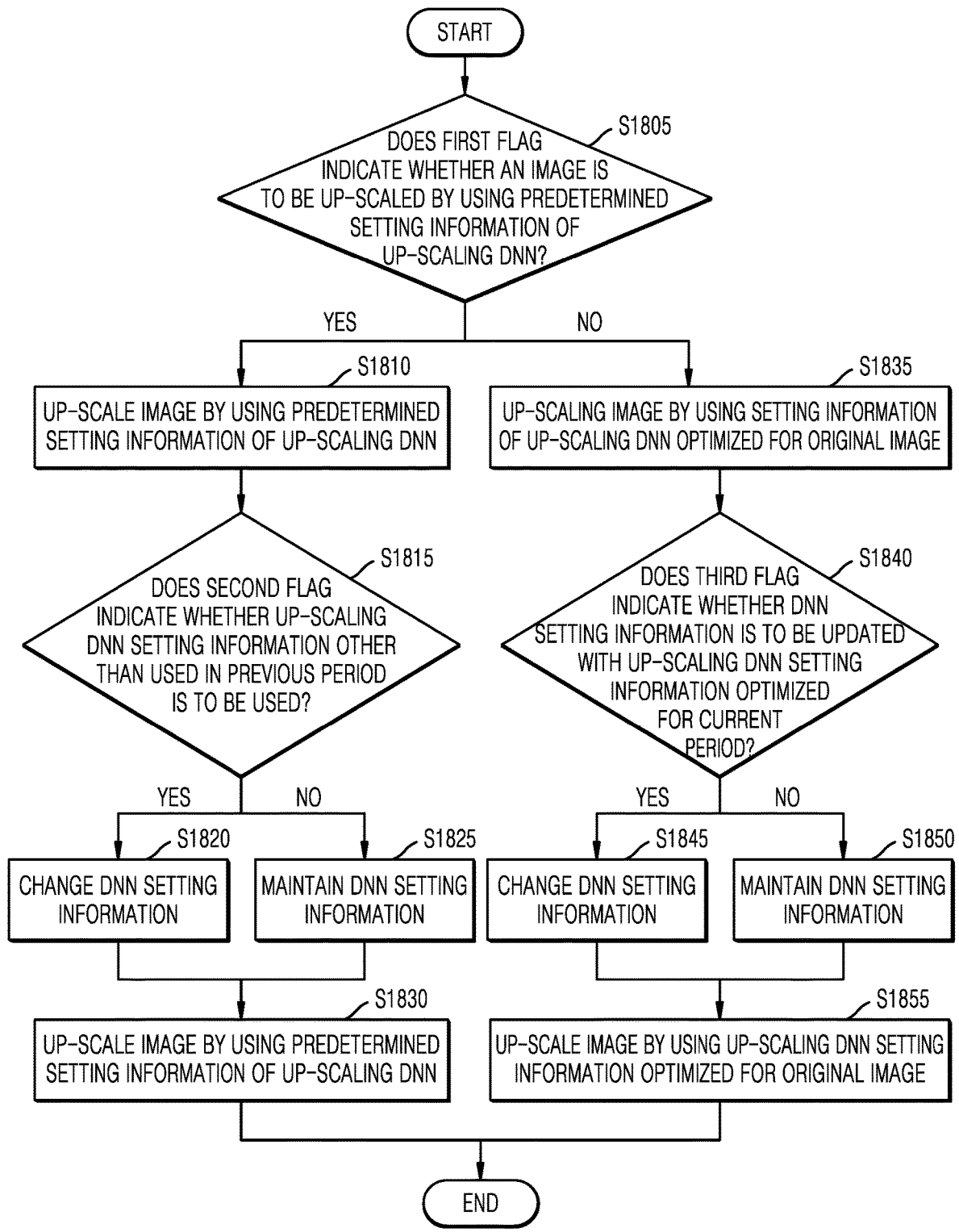
FIG. 18 is a flowchart of a process, performed by an AI decoding apparatus, of up-scaling a second image by updating DNN setting information of an up-scaling DNN, which is predetermined based on flags obtained from AI encoding data or of up-scaling the second image by updating DNN setting information of the up-scaling DNN, which is optimized for an original image, according to an embodiment of the disclosure.

FIG. 18 is a flowchart of a process, performed by the AI decoding apparatus 1300, of up-scaling a second image by updating DNN setting information of an up-scaling DNN, which is predetermined based on flags obtained from AI encoding data or of up-scaling the second image by updating DNN setting information of the up-scaling DNN, which is optimized for an original image, according to an embodiment of the disclosure.

Referring to FIG. 18, the AI decoding apparatus 1300 may determine, based on a value of a first flag, whether the first flag indicates whether to use predetermined DNN setting information of an up-scaling DNN (operation S1805).

When the first flag indicates that the predetermined DNN setting information of the up-scaling DNN is to be used, the AI decoding apparatus 1300 may up-scale an image by using the predetermined DNN setting information of the up-scaling DNN (operation S1810). In this case, the predetermined DNN setting information of the up-scaling DNN may be stored in the AI decoding apparatus 1300.

The AI decoding apparatus 1300 may periodically obtain a second flag and determine, based on a value of the second flag, whether the second flag indicates whether to use DNN setting information of the up-scaling DNN, other than previous DNN setting information among a plurality of pieces of predetermined DNN setting information of the up-scaling DNN (operation S1815).

When the second flag indicates that the DNN setting information of the up-scaling DNN, other than the previous DNN setting information among the plurality of pieces of predetermined DNN setting information of the up-scaling DNN, is to be used, the AI decoding apparatus 1300 may change DNN setting information to be used for the up-scaling DNN to DNN setting information of the up-scaling DNN, other than that used in a previous period among the plurality of pieces of predetermined DNN setting information (operation S1820).

When the second flag indicates that the DNN setting information of the up-scaling DNN, other than the previous DNN setting information among the plurality of pieces of predetermined DNN setting information of the up-scaling DNN, is not to be used, the AI decoding apparatus 1300 may determine that DNN setting information used in the previous period is maintained as DNN setting information to be used for the up-scaling DNN (operation S1825).

The AI decoding apparatus 1300 may up-scale the image by using predetermined DNN setting information of the up-scaling DNN (operation S1830). In this case, the predetermined DNN setting information of the up-scaling DNN may be the DNN setting information changed in operation S1820 or DNN setting information maintained in operation S1825.

When the first flag indicates that the predetermined DNN setting information of the up-scaling DNN is not to be used, the AI decoding apparatus 1300 may up-scale the image by using DNN setting information of the up-scaling DNN optimized for an original image (operation S1835). Descriptions with respect to the DNN setting information of the up-scaling DNN optimized for the original image are already provided above with reference to FIGS. 16A through 17B, and thus, a redundant description is not repeated below.

The AI decoding apparatus 1300 may periodically obtain a third flag and determine, based on a value of the third flag, whether the third flag indicates whether to update DNN setting information with DNN setting information of the up-scaling DNN optimized for a current period (operation S1840).

When the third flag indicates that the DNN setting information is to be updated, the AI decoding apparatus 1300 may change DNN setting information to be used for the up-scaling DNN to DNN setting information of the up-scaling DNN optimized for the current period of the original image (operation S1845).

When the third flag indicates that the DNN setting information is not to be updated, the AI decoding apparatus 1300 may determine to maintain DNN setting information of the up-scaling DNN used in a previous period (operation S1850). The AI decoding apparatus 1300 may up-scale the image by using the DNN setting information of the up-scaling DNN optimized for the original image (operation S1855). In this case, the DNN setting information optimized for the original image may be the DNN setting information changed in S1845 or DNN setting information maintained in S1850.

FIG. 19A illustrates examples of default weights and biases, weights and biases in an up-scaling DNN, which are optimized for an original image, and weight differences and bias differences in the up-scaling DNN, according to an embodiment of the disclosure.

Referring to FIG. 19A, the AI encoding apparatus 1200 may determine default weight matrices 1910 of size 3×3 and default bias matrices 1920 of size 1×1 of a filter kernel in a convolution layer of an up-scaling DNN. In this case, the default weight matrices 1910 and the default bias matrices 1920 may be weights and biases previously determined by using a separate training image in the AI encoding apparatus 1200, but the weights and biases are not limited thereto. The weights and biases may be weights and biases determined by using an original image as a training image in a immediately preceding period unit.

According to Equation 9 below, an output matrix $Y_{L,t, d\_out}$ may be generated using an input matrix $X_{L,t, d\_in}$, default weight matrices $W_{L,t,d\_in,d\_out}$ (e.g., 1910), and the default bias matrices $B_{L,t,d\_out}$ (e.g., 1920). In Equation 9, activation( ) and convolution( ) denote an activation function and a convolution operation function, respectively, L, d_in, and d_out denote a convolutional layer, an input channel (depth) of layer L, and an output channel of layer L, respectively, and t denotes the time.

$$Y_{L,t,d_{out}} = \text{activation}\left(\sum_{d_{in}} \text{convolution}(X_{L,t,d_{in}}, W_{L,t,d_{in},d_{out}}) + B_{L,t,d_{out}}\right) \quad \text{[Equation 9]}$$

Referring to FIG. 19A, the AI encoding apparatus 1200 may determine optimal weight matrices 1930 of size 3×3 and optimal bias matrices 1940 of size 1×1 by using a current original image as a training image. Values of elements in the optimal weight matrices 1930 and the optimal bias matrices 1940 may be different from those of elements of the default weight matrices 1910 and the default bias matrices 1920, respectively.

The AI encoding apparatus 1200 may entropy-encode the optimal weight matrices 1930 and the optimal bias matrices 1940 based on a context model for transmission.

The AI encoding apparatus 1200 may determine weight difference matrices 1950 of size 3×3 and bias difference matrices 1960 of size 1×1 based on the default weight matrices 1910, the default bias matrices 1920, the optimal weight matrices 1930, and the optimal bias matrices 1940.

A value of an element in each of the weight difference matrices 1950 may be a difference between a value of an element in a corresponding one of the default weight matrices 1910 and a value of an element in the corresponding optimal weight matrix 1930, and a value of an element of each of the bias difference matrices 1960 may be a difference between a value of an element in a corresponding one of the default bias matrices 1920 and a value of an element in the corresponding optimal bias matrix 1940.

The AI encoding apparatus 1200 may entropy-encode the weight difference matrices 1950 and the bias difference matrices 1960 for transmission.

FIG. 19B illustrates examples of weights and biases in an up-scaling DNN, which are optimized for an original image, and weights and biases in the up-scaling DNN, which are determined via quantization and pruning, according to an embodiment of the disclosure.

Referring to FIG. 19B, the AI encoding apparatus 1200 may determine optimal weight matrices 1970 of size 3×3 and optimal bias matrices 1975 of size 1×1 by using a current original image as a training image.

The AI encoding apparatus 1200 may determine weight matrices 1980 of size 3×3 by performing pruning on the optimal weight matrices 1970. In other words, referring to FIG. 19B, the AI encoding apparatus 1200 may determine the weight matrices 1980 by changing to zero all values of elements in the optimal weight matrices 1970 that are less than an absolute value of 0.02. However, an absolute value used to change a value of an element to zero is not limited to 0.02, and it will be understood by those of ordinary skill in the art that a value of an element that is less than a value close to 0 may be changed to 0.

The AI encoding apparatus 1200 may determine weight matrices 1990 of size 3×3 and bias matrices 1995 of size 1×1 by respectively performing quantization on the weight matrices 1980 and the optimal bias matrices 1975. In other words, referring to FIG. 19B, the AI encoding apparatus 1200 may determine the weight matrices 1990 by performing a multiplication operation in which values of elements in the weight matrices 1980 are multiplied element-wise by 128 and a rounding operation on the element-wise products and determine the bias matrices 1995 by performing a rounding operation on values of elements in the optimal bias matrices 1975. However, embodiments of the disclosure are not limited thereto, and those of ordinary skill in the art will appreciate that may understand that quantization of various embodiments of the disclosure may be performed on weight/bias matrices.

Figure 20A:
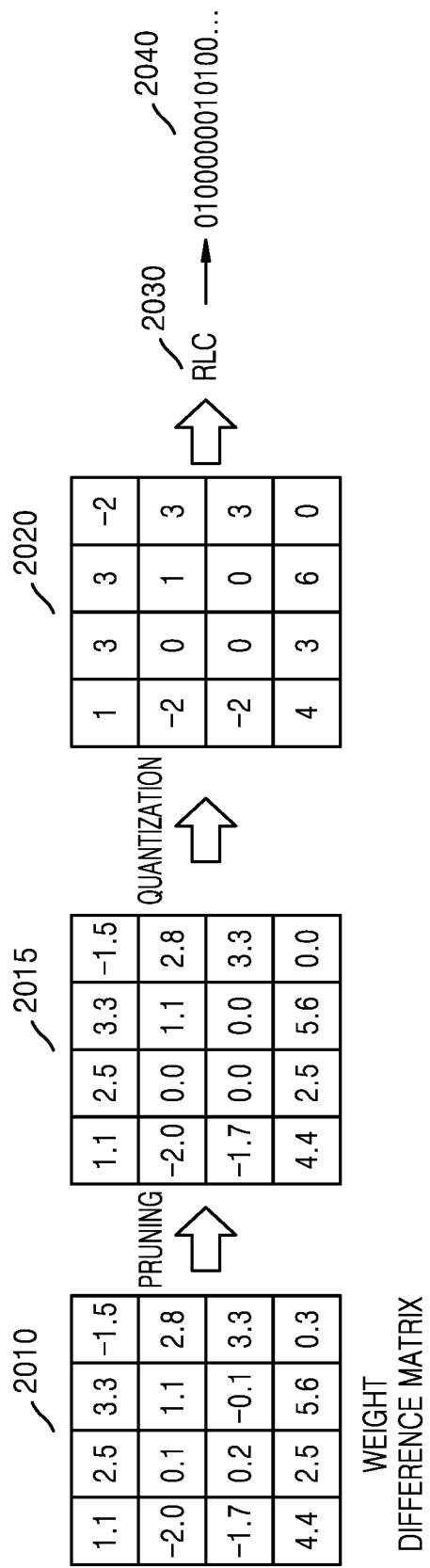
FIG. 20A is a diagram for describing a method of encoding weights in an up-scaling DNN, which are optimized for an original image, according to an embodiment of the disclosure.

FIG. 20A is a diagram for describing a method of encoding weights in an up-scaling DNN, which are optimized for an original image, according to an embodiment of the disclosure.

Referring to FIG. 20A, the AI encoding apparatus 1200 may determine a weight difference matrix 2010 of a 4λ4 filter kernel. In this case, weight difference values in the weight difference matrix 2010 are weight difference values in an up-scaling DNN, which are optimized for an original image, as described above with reference to FIG. 19A, and a detailed description thereof will be omitted below.

The AI encoding apparatus 1200 may determine a weight matrix 2015 by performing pruning on the weight difference matrix 2010 of the 4λ4 filter kernel.

The AI encoding apparatus 1200 may determine a weight matrix 2020 by performing quantization on the weight matrix 2015. Descriptions with respect to pruning and quantization are already provided above with reference to FIG. 19B, and thus, will not be repeated.

The AI encoding apparatus 1200 may then generate AI data 2040 by performing RLC 2030 on weights in the weight matrix 2020. In this case, the AI data 2040 may be represented in the form of a bitstream.

Figure 20B:
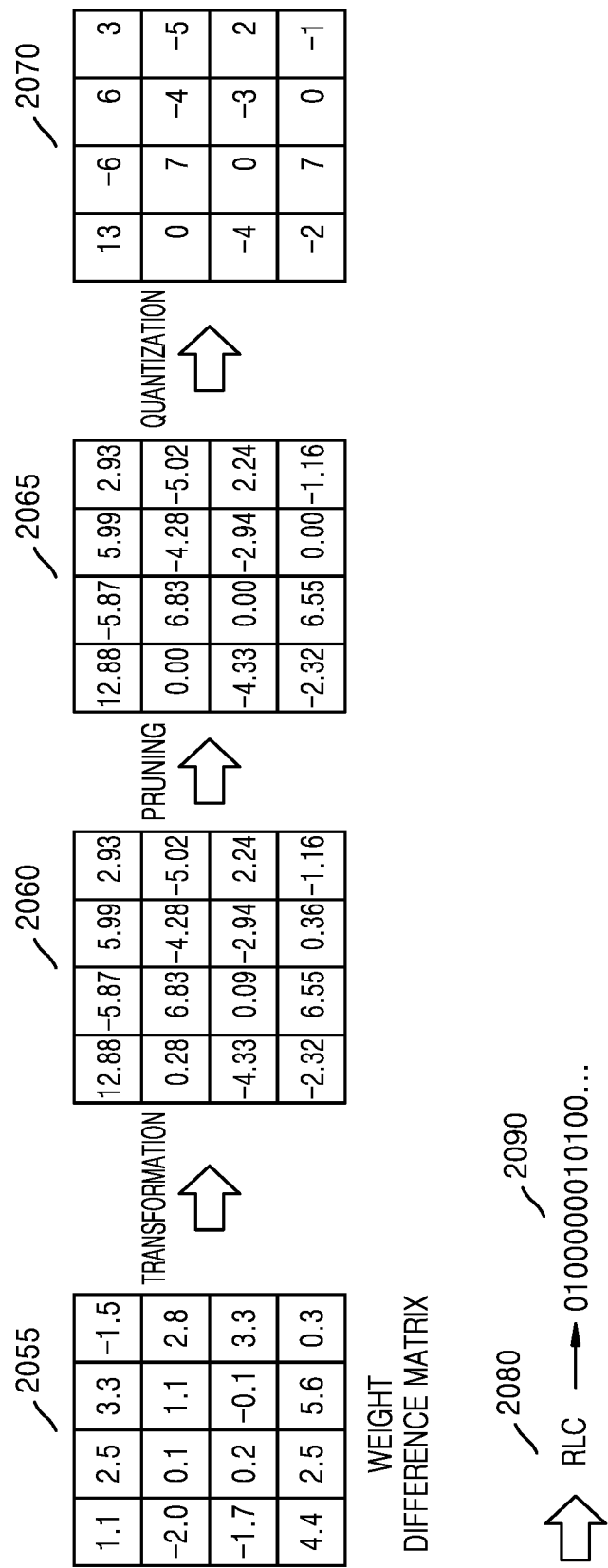
FIG. 20B is a diagram for describing a method of encoding weights in an up-scaling DNN, which are optimized for an original image, according to an embodiment of the disclosure.

FIG. 20B is a diagram for describing a method of encoding weights in an up-scaling DNN, which are optimized for an original image, according to another embodiment of the disclosure.

Referring to FIG. 20B, the AI encoding apparatus 1200 may determine a weight difference matrix 2055 of a 4λ4 filter kernel. In this case, weight difference values in the weight difference matrix 2055 are weight difference values in an up-scaling DNN, which are optimized for an original image, as described above with reference to FIG. 19A, and a redundant description thereof is omitted below.

The AI encoding apparatus 1200 may determine a weight matrix 2060 by performing transformation (e.g., discrete cosine transform) on the weight difference matrix 2055 of the 4λ4 filter kernel.

The AI encoding apparatus 1200 may determine a weight matrix 2065 by performing pruning on the weight matrix 2060.

The AI encoding apparatus 1200 may determine a weight matrix 2070 by performing quantization on the weight matrix 2065.

The AI encoding apparatus 1200 may generate AI data 2090 by performing RLC 2080 on the weights of the weight matrix 2070.

The AI decoding apparatus 1300 may perform run-length decoding on the AI data 2090 to generate a two-dimensional (2D) weight matrix, and restore a weight difference matrix via inverse quantization and inverse transformation. In this case, the restored weight difference matrix may be different from the weight difference matrix 2055. The mismatch is caused by data loss due to the pruning and quantization.

According to the method of FIG. 20B, the AI encoding apparatus 1200 may perform transformation on the weight difference matrix 2055 such that data values may concentrate at low frequencies while data values at high frequencies may be closer to zero. Thus, unnecessary information may be discarded more effectively during subsequent pruning and quantization than when using the method described with reference to FIG. 20A. The AI decoding apparatus 1300 may perform inverse transformation corresponding to the transformation performed by the AI encoding apparatus 1200.

In this case, the AI decoding apparatus 1300 may generate a 2D weight matrix by performing run-length decoding on the AI data 2090 and restore a weight difference matrix by performing inverse quantization and inverse transformation on the 2D weight matrix.

Figure 21A:
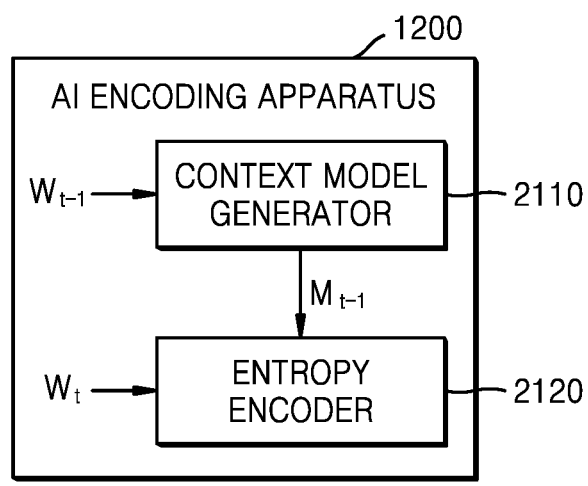
FIG. 21A is a diagram for describing a process, performed by an AI encoding apparatus, of entropy-encoding weight information of an up-scaling DNN, which is optimized for an original image, based on a context model, according to an embodiment of the disclosure.
Figure 21B:
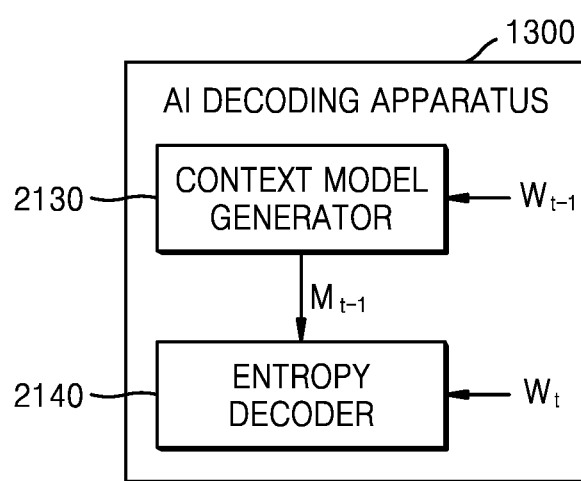
FIG. 21B is a diagram for describing a process, performed by an AI decoding apparatus, of entropy-decoding weight information of the up-scaling DNN, which is optimized for the original image, based on the context model, according to an embodiment of the disclosure.

FIG. 21A is a diagram for describing a process, performed by the AI encoding apparatus 1200 of entropy-encoding weight information of an up-scaling DNN, which is optimized for an original image, based on a context model, according to an embodiment of the disclosure, and FIG. 21B is a diagram for describing a process, performed by the AI decoding apparatus 1300, of entropy-decoding weight information of the up-scaling DNN, which is optimized for the original image, based on the context model, according to an embodiment of the disclosure.

Referring to FIG. 21A, in the AI encoding apparatus 1200, a context model generator 2110 may generate a context model $M_{t-1}$ based on a weight $w_{t-1}$ that is a weight of an image at a previous time $_{t-1}$, and an entropy encoder 2120 may generate weight information by entropy-encoding a weight $w_t$, which is a weight of an image at a current time t, based on the context model $M_{t-1}$. In this case, entropy encoding may be performed in combination with model compression techniques such as pruning and quantization. In this case, the image at the previous time t−1 may mean a frame immediately preceding a current frame at time t, but the time is not limited thereto, and the time may mean a period unit immediately preceding a current period unit including a frame at time t. In this case, the period unit may be one of a preset number of frames, frames in a GOP, frames in a sequence, and frames in an IRAP period, but is not limited thereto.

Referring to FIG. 21B, in the AI decoding apparatus 1300, a context model generator 2130 may generate a context model $M_{t-1}$ based on a weight $w_{t-1}$ that is a restored weight of an image at a previous time $_{t-1}$ in the same manner as in the AI encoding apparatus 1200, and an entropy decoder 2140 may obtain a weight $w_t$ that is a weight of an image at a current time t by entropy-decoding the weight information received from the AI encoding apparatus 1200 based on the context model $M_{t-1}$. In this case, when the entropy encoding is performed in combination with model compression techniques such as pruning and quantization, the AI decoding apparatus 1300 may perform an operation corresponding to the model compression techniques in combination with an entropy decoding operation. For example, when the entropy encoding is performed in combination with a quantization operation, the AI decoding apparatus 1300 may perform an inverse quantization operation in combination with an entropy decoding operation.

Moreover, image data and DNN setting information generated by the AI encoding apparatus 1200 and corresponding to at least one quality (e.g., a quality based on at least one of a resolution or a bitrate) and are provided to the AI decoding apparatus 1300 through a streaming system. The streaming system is a system including at least one server (e.g., a service server or a content server) and a terminal, and refers to a system in which according to a request from the terminal via a network, the server provides image-related data corresponding to the request. In this case, the generated image data and DNN setting information may be stored in a content server separate from a service server, and the terminal may receive location information of image data of at least one quality from the service server according to a request and then receive image data and DNN setting information from the content server corresponding to the location information of the image data of the at least one quality. In this case, the content server is a server for storing image data and DNN setting information and may be the AI encoding apparatus 1200, but the content server is not limited thereto. The content server may be separate from the AI encoding apparatus 1200, and in this case, the content server may receive the image data and the DNN setting information from the AI encoding apparatus 1200 for storage.

Meanwhile, the embodiments of the disclosure described above may be written as computer-executable programs or instructions that may be stored in a medium.

The medium may permanently store the computer-executable programs or instructions, or store the computer-executable programs or instructions for execution or downloading. Also, the medium may be any one of various recording media or storage media in which a single piece or plurality of pieces of hardware are combined, and the medium is not limited to a medium directly connected to a computer system, but may be distributed on a network. Examples of the medium include magnetic media, such as a hard disk, a floppy disk, and a magnetic tape, optical recording media, such as CD-ROM and DVD, magneto-optical media such as a floptical disk, and ROM, RAM, and a flash memory, which are configured to store program instructions. Other examples of the medium include recording media and storage media managed by application stores distributing applications or by websites, servers, and the like supplying or distributing other various types of software.

Meanwhile, a model related to the DNN described above may be implemented via software. When the DNN model is implemented via software (for example, a program module including instructions), the DNN model may be stored in a computer-readable recording medium.

Also, the DNN model may be a part of the AI decoding apparatus 200 or AI encoding apparatus 600 described above by being integrated in a form of a hardware chip. For example, the DNN model may be manufactured in a form of a dedicated hardware chip for AI, or may be manufactured as a part of an existing general-purpose processor (for example, CPU or application processor) or a graphic-dedicated processor (for example GPU).

Also, the DNN model may be provided in a form of downloadable software. A computer program product may include a product (for example, a downloadable application) in a form of a software program electronically distributed through a manufacturer or an electronic market. For electronic distribution, at least a part of the software program may be stored in a storage medium or may be temporarily generated. In this case, the storage medium may be a server of the manufacturer or electronic market, or a storage medium of a relay server.

According to an embodiment of the disclosure, a method and apparatus for performing AI encoding and AI decoding of an image are capable of processing the image at a low bitrate via AI-based image encoding and decoding.

Furthermore, according to an embodiment of the disclosure, the method and apparatus for performing AI encoding and AI decoding of an image may improve image quality by performing up-scaling after updating, periodically or whenever necessary, up-scaling DNN setting information optimized for an original image.

In addition, according to an embodiment of the disclosure, the method and apparatus for performing AI encoding and AI decoding of an image may effectively reduce the amount of information to be encoded and decoded by effectively signaling DNN setting information for updating DNN setting information of an up-scaling DNN, optimized for an original image, periodically or whenever necessary.

However, it will be appreciated by those of ordinary skill in the art that the effects that are achievable by the method and apparatus for performing AI encoding and AI decoding of an image according to an embodiment of the disclosure are not limited to those described hereinabove and other effects of the disclosure not described herein will be more clearly understood from the following description.

While one or more embodiments of the disclosure have been described with reference to the figures, it will be understood by those of ordinary skill in the art that various changes in form and details may be made therein without departing from the spirit and scope as defined by the following claims.

What is claimed is:

1. An electronic device for displaying an image by using an artificial intelligence (AI), the electronic device comprising:

a display; and
at least one processor configured to execute one or more instructions to:
obtain image data generated from performing first encoding on a first image and AI data related to AI down-scaling of at least one original image related to the first image;
obtain a second image corresponding to the first image by performing first decoding on the image data;
obtain, based on the AI data, neural network (NN) setting information for performing AI up-scaling of the second image;
identify whether to perform the AI up-scaling by using a filter kernel of a convolution layer in a predetermined NN or whether to perform the AI up-scaling by using a filter kernel of a convolution layer in a NN updated for performing the AI up-scaling of at least one second image corresponding to at least one original image via a joint training of an up-scaling NN and a down-scaling NN used for the AI down-scaling of the at least one original image, the joint training being performed using the at least original image; and
generate a third image by performing the AI up-scaling on the second image via the up-scaling NN operating according to the NN setting information based on the identifying.

2. The electronic device of claim 1, wherein the NN setting information includes weights and biases of filter kernels in at least one convolution layer of the up-scaling NN.

3. The electronic device of claim 1, wherein the processor is further configured to:
generate a first training image via the down-scaling NN by using the at least one original image,
generate a second training image via the up-scaling NN by using the first training image, and
update the up-scaling NN and the down-scaling NN based on first loss information and third loss information, the first loss information and the third loss information corresponding to a result of comparing the second training image with an original image that has not undergone the AI down-scaling among the at least one original image, and second loss information generated based on the first training image.

4. The electronic device of claim 3, wherein the first loss information is generated based on a result of comparing a quality parameter of the second training image with a quality parameter of the at least one original image.

5. The electronic device of claim 4, wherein the third loss information is generated based on a result of comparing a feature-related parameter of the second training image with a feature-related parameter of the at least one original image.

6. The electronic device of claim 4, wherein the second loss information is related to a spatial complexity of the first training image.

7. The electronic device of claim 1, wherein the processor is further configured to:
generate a first training image via the down-scaling NN by using the at least one original image,
perform first encoding on the first training image,
generate a second training image via the up-scaling NN by using the first training image that has undergone the first encoding, and
update the up-scaling NN based on first loss information and third loss information, the first loss information and the third loss information corresponding to a result of comparing the second training image with an original image that has not undergone the AI down-scaling among the at least one original image.

8. The electronic device of claim 1, wherein the NN setting information updated for performing the AI up-scaling further includes weight residual information and bias residual information indicating a difference between a weight and a bias of all or some of filter kernels in all or some of convolution layers in the up-scaling NN before the weight and the bias are updated and a weight and a bias of the all or some of the filter kernels in the all or some of the convolution layers in the up-scaling NN after the weight and the bias are updated when the flag information indicates to perform the AI up-scaling by using a filter kernel of a convolution layer in the updated NN.

9. The electronic device of claim 8, wherein the weight residual information and the bias residual information are information encoded using one of differential pulse code modulation (DPCM), run-length coding (RLC), and Huffman coding schemes.

10. The electronic device of claim 8, wherein the weight residual information and the bias residual information are information about a weight residual and a bias residual generated via model compression.

11. The electronic device of claim 10, wherein the model compression comprises at least one of pruning or quantization.

12. The electronic device of claim 1, wherein the NN setting information updated for performing the AI up-scaling further includes information about a weight residual and a bias residual obtained by performing frequency transformation when the flag information indicates to perform the AI up-scaling by using a filter kernel of a convolution layer in the updated NN, the information about the weight residual and the bias residual indicating a difference between a weight and a bias of all or some of filter kernels in all or some of convolution layers in the up-scaling NN before the weight and the bias are updated and a weight and a bias of the all or some of the filter kernels in the all or some of the convolution layers in the up-scaling NN after the weight and the bias are updated.

13. The electronic device of claim 1, wherein the NN setting information updated for performing the AI up-scaling further includes information obtained by entropy-encoding a weight and a bias of all or some of filter kernels in all or some of convolution layers in the up-scaling NN after the weight and the bias are updated, based on context model information regarding a weight and a bias of the all or some of the filter kernels in the all or some of the convolution layers in the up-scaling NN before the weight and the bias are updated when the flag information indicates to perform the AI up-scaling by using a filter kernel of a convolution layer in the updated NN.

14. The electronic device of claim 1, wherein the NN setting information includes NN information updated for performing the AI up-scaling of the at least one second image corresponding to the at least one original image via joint training of the up-scaling NN and the down-scaling NN used for the AI down-scaling of the at least one original image.

15. A method of displaying an image by an electronic device configured to use an artificial intelligence (AI), the method comprising:
obtaining image data generated from performing first encoding on a first image and AI data related to AI down-scaling of at least one original image related to the first image;

obtaining a second image corresponding to the first image by performing first decoding on the image data;

obtaining, based on the AI data, neural network (NN) setting information for performing AI up-scaling of the second image;

identifying whether to perform the AI up-scaling by using a filter kernel of a convolution layer in a predetermined NN or whether to perform the AI up-scaling by using a filter kernel of a convolution layer in a NN updated for performing the AI up-scaling of at least one second image corresponding to at least one original image via a joint training of an up-scaling NN and a down-scaling NN used for the AI down-scaling of the at least one original image, the joint training being performed using the at least original image; and generating a third image by performing the AI up-scaling on the second image via an up-scaling NN operating according to the NN setting information based on the identifying.

16. A non-transitory computer-readable recording medium having recorded thereon a program for executing the method of claim 15.

\* \* \* \* \*